(12) United States Patent
Okegawa et al.

(10) Patent No.: US 8,672,230 B2
(45) Date of Patent: *Mar. 18, 2014

(54) RFID TAG

(75) Inventors: Hirokatsu Okegawa, Tokyo (JP); Hideo Enomoto, Tokyo (JP); Yohei Nokami, Tokyo (JP); Kimihiro Kaneko, Tokyo (JP); Takashi Iwakura, Tokyo (JP); Hirofumi Ryoki, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 944 days.

This patent is subject to a terminal disclaimer.

(21) Appl. No.: 12/664,851

(22) PCT Filed: Aug. 20, 2008

(86) PCT No.: PCT/JP2008/002250
§ 371 (c)(1),
(2), (4) Date: Dec. 15, 2009

(87) PCT Pub. No.: WO2009/031267
PCT Pub. Date: Dec. 3, 2009

(65) Prior Publication Data
US 2010/0181379 A1    Jul. 22, 2010

(30) Foreign Application Priority Data

Sep. 4, 2007 (JP) .................................. 2007-228929
Sep. 5, 2007 (JP) .................................. 2007-230037

(51) Int. Cl.
*G06K 19/02* (2006.01)

(52) U.S. Cl.
USPC ......................................... 235/488; 235/492

(58) Field of Classification Search
USPC .......................................................... 235/488
See application file for complete search history.

(56) References Cited

U.S. PATENT DOCUMENTS 5,032,542 A * 7/1991 Kazami et al. ................... 29/827
6,607,135 B1   8/2003 Hirai et al.
(Continued)

FOREIGN PATENT DOCUMENTS

EP    0 919 950 A1   6/1999
EP    1 970 952 A2   9/2008
(Continued)

OTHER PUBLICATIONS

Office Action issued Dec. 14, 2010 in Japan Application No. 2007-230037 (With English Translation).

(Continued)

*Primary Examiner* — Seung Lee
*Assistant Examiner* — Tae Kim
(74) *Attorney, Agent, or Firm* — Oblon, Spivak, McClelland, Maier & Neustadt, L.L.P.

(57) ABSTRACT

An RFID tag characterized in including: a dielectric substrate having a hole formed in one main surface thereof; a ground conductive pattern disposed on another main surface of this dielectric substrate; a conductive pattern disposed on the one main surface of the above-mentioned dielectric substrate in such a way as to be placed in an inner portion of the dielectric substrate at a predetermined distance from each of edges of the above-mentioned dielectric substrate, a slot being formed in this conductive pattern; and an IC chip electrically connected to the above-mentioned conductive pattern via this slot, and inserted into the above-mentioned hole of the above-mentioned dielectric substrate.

21 Claims, 30 Drawing Sheets

(56) References Cited

U.S. PATENT DOCUMENTS

| | | | |
|---|---|---|---|
| 6,906,414 B2 * | 6/2005 | Zhao et al. | 257/707 |
| 7,365,686 B2 * | 4/2008 | Sakama et al. | 343/700 MS |
| 2005/0134408 A1 | 6/2005 | Hirabayashi | |
| 2006/0032926 A1 | 2/2006 | Baba et al. | |
| 2006/0202206 A1 | 9/2006 | Koyama et al. | |
| 2008/0224940 A1 | 9/2008 | Sugiyama et al. | |
| 2008/0252425 A1 * | 10/2008 | Okegawa et al. | 340/10.1 |
| 2009/0140947 A1 * | 6/2009 | Sasagawa et al. | 343/845 |
| 2010/0096181 A1 * | 4/2010 | Nakamura et al. | 174/394 |
| 2011/0024853 A1 | 2/2011 | Sugiyama et al. | |

FOREIGN PATENT DOCUMENTS

| | | |
|---|---|---|
| EP | 1 970 952 A3 | 9/2008 |
| EP | 1 993 170 A1 | 11/2008 |
| JP | 63-214492 | 9/1988 |
| JP | 4 44404 | 2/1992 |
| JP | 4-122105 | 4/1992 |
| JP | 6-196911 | 7/1994 |
| JP | 6 350 324 | 12/1994 |
| JP | 2000 113151 | 4/2000 |
| JP | 2000 332523 | 11/2000 |
| JP | 2001 60809 | 3/2001 |
| JP | 2002-42090 | 2/2002 |
| JP | 2002 197434 | 7/2002 |
| JP | 2002 358494 | 12/2002 |
| JP | 2003 85538 | 3/2003 |
| JP | 2003-218488 | 7/2003 |
| JP | 2003 223626 | 8/2003 |
| JP | 2005-519557 | 6/2005 |
| JP | 2006 53833 | 2/2006 |
| JP | 2006-174151 | 6/2006 |
| JP | 2006 237674 | 9/2006 |
| JP | 2006 261749 | 9/2006 |
| JP | 2006 270077 | 10/2006 |
| JP | 2006-311372 | 11/2006 |
| JP | 2007011836 A * | 1/2007 |
| WO | 2006 049068 | 5/2006 |
| WO | WO 2007102360 A1 * | 9/2007 |

OTHER PUBLICATIONS

Extended Supplementary European Search Report issued on Sep. 26, 2011 in corresponding European Application No. 08 82 9156.

* cited by examiner (a)

RFID Tag Surface (b)

(a)

(b)

(a)

(b)

(a)

(b)

RFID TAG

FIELD OF THE INVENTION

The present invention relates to an RFID (Radio Frequency Identification) tag that receives a command signal transmitted from a reader/writer to update tag information stored in a memory thereof according to information shown by the command signal or additionally write information in the tag information, or transmits the tag information to the RFID reader/writer as a read signal, and that is used for entrance/exit control, physical distribution management, or the like of living bodies or products.

BACKGROUND OF THE INVENTION

An RFID system enables radio communications to be carried out between an RFID tag equipped with an IC chip and an RFID reader/writer. RFID tags include an active-type tag in which a battery is mounted and runs from the electric power of the battery, and a passive-type tag that receives electric power from a reader/writer and runs from this electric power. Because an active-type tag is equipped with a battery, it has merits in view of a communication range, communicative stability, etc., compared with a passive-type tag, while because an active-type tag has a complicated structure, it has demerits of being upsized, increasing in cost, and so on. Recent improvements in semiconductor technologies advance the downsizing of IC chips used for passive-type tags and the enhancement of their performance, and there occurs a situation in which the use of passive-type tags in a broad field is expected from extension of their communication ranges, improvements in the communicative stability, etc.

In an electromagnetic-induction-type RFID tag included in passive-type RFID tags and having a frequency band which is a low or high one, a voltage is induced in the RFID tag through an electromagnetic induction action between the transmission antenna coil of a reader/writer and the antenna coil of the RFID tag and the IC chip of this tag starts from this voltage, so that communications can be carried out. Therefore, the RFID tag operates only within the induction field caused by the RFID reader/writer, and its communication range is of the order of about tens of centimeters. Furthermore, in an RFID tag having a high frequency band, such as a UHF band or a microwave band, because a radio frequency communication method is applied and electric power is furnished to the IC chip of the RFID tag by using an electric wave, its communication range is greatly improved by up to about 1 to 8 meters. Therefore, an RFID system using RFID tags having a high frequency band, such as a UHF band or a microwave band, can carry out batch reading of plural RFID tags, reading of an RFID tag which is moving, etc., which are difficult for an RFID system having a low frequency band or a high frequency band and having a short communication range to implement, and it is considered that the use area of such an RFID system using RFID tags having a high frequency band, such as a UHF band or a microwave band, will widen greatly from now on. As passive-type tags having a high frequency band, such as a UHF band or a microwave band, there have been provided some tags described in, for example, patent references 1 to 6.

In FIG. 3 of patent reference 1, there is disclosed a conventional RFID tag including a ½-wave microstrip line resonator 13, a dielectric substrate 14, and a ground conductive plate 15, which can be mounted and secured onto a metal body (a conductor) with the radiation characteristic of the antenna being hardly affected even if the metal body (the conductor) is placed on a side of the ground conductive plate 15 because an IC chip is connected between the ½-wave microstrip line resonator 13 and the ground conductive plate 15. In FIG. 17 of patent reference 1, there is disclosed the details of the IC chip in which an IC 106 is placed in such a way as to be buried in a dielectric material on the rear surface of a ground conductive line 104 connected to a central section of an antenna conductor 100 on a side of a ground conductor by using a technology such as wire bonding. Similarly, in FIGS. 18 to 21 of patent reference 1, there is disclosed a tag in which an IC 121 is placed in such a way as to be buried into a dielectric material on a side of a ground conductor. In paragraph number 0028 of patent reference 1, there is a description showing that, when the IC 121 has an IC structure in which a ground surface can be formed opposite to a surface on which a connection pad is formed, one bonding wire 122, among bonding wires 122, 12, and 2, can be eliminated.

In FIG. 1 of patent reference 2, there is disclosed an RFID tag provided with a terminal portion 3 formed on a front surface of a substrate 1, and an IC chip 6 that is placed in an IC chip placement area 9 formed in a part of the substrate 1 and is connected to the terminal portion 3. The patent reference then discloses that because it is not necessary to connect the IC chip 6 with wire bonding, it is not necessary to embed the IC chip 6 into the inside of the substrate 1, and therefore the IC chip 6 can be mounted on an antenna upper surface, the RFID tag having the simple structure can be manufactured through only machining of the front surface of the substrate 1, and reduction of the yield and reduction of the manufacturing cost can be achieved.

In FIG. 19 of patent reference 3, there is disclosed an RFID tag 5 equipped with a dielectric member 10, an recessed portion 10*b* for IC chip, a film base 20, an antenna pattern 30, and an IC chip 40, in which the recessed portion 10*b* for IC chip in which the IC chip 40 can be buried is formed in the dielectric member 10 and the IC chip 40 is buried in this recessed portion 10*b* for IC chip, and the film base 20 is wound around the dielectric member 10 in such a way that the antenna pattern 30 formed on an inner surface of the film base 20 is electrically connected to the IC chip 40, so that reduction of its communication range even in a vicinity of a wave absorber can be suppressed by a loop antenna constructed of the antenna pattern 30.

In FIGS. 1 and 2 of patent reference 4, there is disclosed an RFID tag in which an IC chip 21 is fitted into a recessed portion 15 of a base material 11 (a substrate), and the both ends of an antenna pattern 13 formed with screen stencil using a conductive ink are electrically connected to the IC chip 21. Furthermore, in FIG. 4 of patent reference 4, there is disclosed an RFID tag having a pair of two antenna patterns 13A and 13B.

In FIG. 4 of patent reference 5, there is disclosed an RFID tag in which an opening 31 through which a part of a dielectric substance 20 is exposed is formed in an antenna surface 30, the opening has a pair of first slits 31*a* extending opposite to each other in parallel, the pair of slits 31*a*, and a second slit 31*b* connecting the pair of slits 31*a*, and the above-mentioned second slit 31*b* is positioned in a midpoint portion of the above-mentioned pair of first slits 31*a*. In a transmitting and receiving element (an IC chip), first and second feeding points are connected to 41 and 42 respectively.

In FIGS. 1 and 2 of patent reference 6, there is disclosed an RFID tag in which an IC chip 13 is mounted in a slot antenna 10 which is constructed in such a way that a slot 12 is disposed in a central portion of a rectangular conductive plate 11 with respect to a direction of the length of the rectangular conductive plate.

[Patent reference 1] JP,2000-332523,A (FIGS. 3 and 17 to 21)
[Patent reference 2] JP,2002-197434,A (FIG. 1)
[Patent reference 3] JP,2006-53833,A (FIG. 19)
[Patent reference 4] JP,2003-223626,A (FIGS. 1, 2 and 4)
[Patent reference 5] JP,2006-237674,A (FIG. 4)
[Patent reference 6] JP,2002-358494,A (FIGS. 1 and 2)

The RFID tag disclosed by patent reference 1 can be mounted onto a metal body (a conductor). However, because the RFID tag is constructed in such a way that the IC chip is connected between the ½-wave microstrip line resonator and the ground conductive plate, it is necessary to connect the IC chip with wire bonding and to embed the IC chip into the inside of the dielectric substrate. Therefore, although there is a low possibility that the IC chip is damaged by a shock or the like, a problem is that the structure of the RFID tag is complicated and the manufacture (mass production) of the RFID tag becomes difficult.

In the RFID tag disclosed by patent reference 2, the thickness of the IC chip is large compared with the thickness of the antenna pattern and that of the conductor of the terminal portion even if the downsizing of the IC chip proceeds, and a projection appears on the front surface of the RFID tag because the IC chip is mounted on the surface of the base material. Therefore, as described in paragraph number 0023 of patent reference 2, it is necessary to cover and protect the whole or a part of the mounted portion of the IC chip to make the front surface of the RFID tag flat. That is, a problem is that when mounting the antenna pattern and the IC chip on the base material, there is a possibility that the IC chip is damaged by a shock or the like, and it is therefore difficult to print a label directly on the front surface (the upper surface) of the RFID tag by using a label printer. Furthermore, even in a case in which a film on which the antenna pattern and the IC chip are mounted is bonded onto the base material, the problem as mentioned above arises because a bulge (a projection) occurs in the film due to the mounting of the IC chip.

A problem with the RFID tag disclosed by patent reference 3 is that although a bulge (a projection) hardly occurs in the film (the film base) due to the mounting of the IC chip, in a case in which the RFID tag is attached to a conductive object (a conductor) such as a metal body or is mounted in a vicinity of a conductive object, the loop antenna stops operating under the influence of the conductive object, and the communication range drops extremely.

A problem with the RFID tag disclosed by patent reference 4 is that although a bulge (a projection) hardly occurs in the film due to the mounting of the IC chip, in a case in which the RFID tag is attached to a conductive object (a conductor) such as a metal body or is mounted in a vicinity of a conductive object, the loop antenna or dipole antenna stops operating under the influence of the conductive object, and the communication range drops extremely, as in the case of RFID tag disclosed by patent reference 3.

The RFID tag disclosed by patent reference 5 can be mounted onto a metal body (a conductor), like the RFID tag disclosed by patent reference 1. However, because the IC chip is disposed outside the dielectric substance 20, the thickness of the IC chip is large compared with the thickness of the antenna pattern and that of the conductor of the terminal portion even if the downsizing of the IC chip proceeds, and a projection appears on the front surface of the RFID tag because the IC chip is mounted on the surface of the base material. For this reason, as in the case of the RFID tag disclosed by patent reference 2, a problem is that there is a possibility that the IC chip is damaged by a shock or the like, and it is therefore difficult to print a label directly on the front surface (the upper surface) of the RFID tag by using a label printer. Furthermore, in a case in which a film on which the antenna pattern and the IC chip are mounted is bonded onto the base material, the problem as mentioned above arises because a bulge (a projection) occurs in the film due to the mounting of the IC chip. In addition, because the opening has the pair of first slits 31a extending opposite to each other in parallel, the pair of slits 31a, and the second slit 31b connecting the pair of slits 31a, and this opening 31 is constructed in such a way that regions 36 and 37 on the antenna surface 30 which are limited by the dielectric substance 20 exposed via the opening 31 forms a matching circuit used for the transmitting and receiving element, the pair of slits 31a has a horizontally-oriented shape with respect to the lateral direction which is the feed direction and an electric field of cross polarization in the longitudinal direction also occurs in the pair of slits 31a in addition to an electric field of correct polarization in the lateral direction occurring in the second slit 31b, and therefore the gain of the correct polarization component is reduced.

A further problem is that because the cross polarization component occurring is radiated in a direction different from the direction which is intended originally for the correct polarization, there is a case in which the tag communicates with the reader/writer even though the tag is placed at a location where the reader/writer does not desire to communicate with the tag, so that the implementation of the mounting method of mounting the tag and the managing method of managing the tag becomes difficult. In addition, a problem with the patch antenna of the RFID tag disclosed by patent reference 5 is that although the feeding points 41 and 42 are located in a vicinity of the center of the antenna face 30, the pattern of the correct polarization wave also becomes asymmetrical and therefore affects the symmetry of the radiation pattern of the antenna because the patch antenna is based on the placement of the slit at a position shifted from the center of the antenna face 30. It can be seen from these problems that the patch antenna disclosed by patent reference 5 is focused on the establishment of the matching between the regions 36 and 37 and the transmitting and receiving element (the IC chip).

A problem with the RFID tag described in FIGS. 1 and 2 of patent reference 6 in which the slot antenna having a slot formed within the conductive pattern is applied is that in a case in which the RFID tag is attached to a conductive object (a conductor) such as a metal body or is mounted in a vicinity of a conductive object, the loop antenna or dipole antenna stops operating under the influence of the conductive object, and the communication range drops extremely, as in the case of RFID tag disclosed by patent reference 3. In addition, a problem is that because a magnetic field occurs in a direction of the length of the slot shown in FIG. 1 of patent reference 5, and the RFID tag is resonated and radiates an electric wave with this length, the slot has to have a length of the order of about λ/2 in order that the RFID tag radiates an electric wave with a high degree of efficiency, and the downsizing of the RFID tag becomes difficult.

The present invention is made in order to solve the above-mentioned problems, and it is therefore an object of the present invention to provide an RFID tag that can be mounted to an object regardless of whether the object is a conductive one or a non-conductive one without shortening its communication range, and a new RFID tag that, in addition to the above-mentioned capability, can reduce the possibility of an IC chip being damaged due to a shock or the like because the RFID tag does not have any projection on any surface thereof due to the mounting of the IC chip thereto, and that is easy to be subjected to post-machining (adjustment) after the RFID tag is manufactured.

It is another object of the present invention to provide a new RFID tag that can be mounted to a flat or curved mounting surface of an object regardless of whether the object is a conductive one or a non-conductive one without shortening its communication range, that can reduce the possibility of an IC chip being damaged due to a shock or the like because the RFID tag does not have any projection on any surface thereof due to the mounting of the IC chip thereto.

DISCLOSURE OF THE INVENTION

In accordance with the present invention, there is provided an RFID tag characterized in including: a dielectric substrate having a hole formed in one main surface thereof; a ground conductive pattern disposed on another main surface of the above-mentioned dielectric substrate; a conductive pattern disposed on an inner portion of the one main surface of the above-mentioned dielectric substrate in such a way as to be at a predetermined distance from each of edges of the above-mentioned dielectric substrate, a slot being formed in this conductive pattern; and an IC chip electrically connected to the above-mentioned conductive pattern via this slot, and inserted into the above-mentioned hole of the above-mentioned dielectric substrate.

In accordance with the present invention, there is provided an RFID tag characterized in including: a dielectric substrate having a hole formed in one main surface thereof; a ground conductive pattern disposed on another main surface of the above-mentioned dielectric substrate; a conductive pattern disposed on an inner portion of the one main surface of the above-mentioned dielectric substrate in such a way as to be at a predetermined distance from each of edges of the above-mentioned dielectric substrate, a long narrow slot being formed in this conductive pattern; and an IC chip electrically connected to the above-mentioned conductive pattern via this slot, and inserted into the above-mentioned hole of the above-mentioned dielectric substrate.

In accordance with the present invention, there is provided an RFID tag characterized in including: a dielectric substrate having a hole formed in one main surface thereof; a ground conductive pattern disposed on another main surface of the above-mentioned dielectric substrate; a conductive pattern disposed on an inner portion of the one main surface of the above-mentioned dielectric substrate in such a way as to be at a predetermined distance from each of edges of the above-mentioned dielectric substrate, a slot being formed in this conductive pattern; electrical connecting portions extending respectively from both sides of this slot toward an inner portion of the above-mentioned slot; and an IC chip electrically connected to these electrical connecting portions, and inserted into the above-mentioned hole of the above-mentioned dielectric substrate.

In accordance with the present invention, there is provided an RFID tag characterized in including: a dielectric substrate having a hole formed in one main surface thereof; a ground conductive pattern disposed on another main surface of the above-mentioned dielectric substrate; a conductive pattern disposed on an inner portion of the one main surface of the above-mentioned dielectric substrate in such a way as to be at a predetermined distance from each of edges of the above-mentioned dielectric substrate, a long narrow slot being formed in this conductive pattern; electrical connecting portions extending respectively from both sides of this slot which are opposite to each other in a direction of a width of the slot toward an inner portion of the above-mentioned slot; and an IC chip electrically connected to these electrical connecting portions, and inserted into the above-mentioned hole of the above-mentioned dielectric substrate.

In accordance with the present invention, there is provided an RFID tag that can be mounted on a curved surface having a predetermined curvature, and that is characterized in including: a dielectric substrate having a hole formed in a central part of one main surface thereof, and having a degree of hardness which enables the above-mentioned dielectric substrate itself to bend with at least the above-mentioned predetermined curvature; a ground conductive pattern disposed on another main surface of this dielectric substrate; a conductive pattern disposed on an inner portion of the above-mentioned dielectric substrate in such away as to be at a predetermined distance from each of edges of the above-mentioned dielectric substrate, a long narrow slot being formed in this conductive pattern; and an IC chip electrically connected to the above-mentioned conductive pattern via this slot, and inserted into the above-mentioned hole of the above-mentioned dielectric substrate.

In accordance with the present invention, there is provided an RFID tag that can be mounted on a curved surface having a predetermined curvature, and that is characterized in including: a dielectric substrate having a hole formed in a central part of one main surface thereof, and having a degree of hardness which enables the above-mentioned dielectric substrate itself to bend with at least the above-mentioned predetermined curvature; a ground conductive pattern disposed on another main surface of this dielectric substrate; a film base; a conductive pattern disposed on this film base in such a way as to be placed in an inner portion of the above-mentioned film base at a predetermined distance from an edge of the above-mentioned film base, a long narrow slot being formed in this conductive pattern; and an IC chip electrically connected to the above-mentioned conductive pattern via this slot, and inserted into the above-mentioned hole of the above-mentioned dielectric substrate.

In the dielectric substrate of the RFID tag according to the present invention, a portion in a vicinity of the above-mentioned IC chip has a higher degree of hardness than any other portion other than the portion in the vicinity of the above-mentioned IC chip.

In accordance with the present invention, there is provided an RFID tag that can be mounted on a curved surface having a predetermined curvature, and that is characterized in including: a first dielectric substrate having a recessed portion formed in a central part of one main surface thereof, and having a degree of hardness which enables the above-mentioned dielectric substrate itself to bend with at least the above-mentioned predetermined curvature; a second dielectric substrate disposed inside the above-mentioned recessed portion, having a hole formed on a side of the one main surface of the above-mentioned first dielectric substrate, and having a degree of hardness higher than that of the above-mentioned first dielectric substrate; a ground conductive pattern disposed on another main surface of this dielectric substrate; a conductive pattern disposed on the above-mentioned first and second dielectric substrates in such a way as to be placed in an inner portion of the above-mentioned first dielectric substrate at a predetermined distance from each of edges of the above-mentioned first dielectric substrate, a long narrow slot being formed in this conductive pattern; and an IC chip electrically connected to the above-mentioned conductive pattern via this slot, and inserted into the above-mentioned hole of the above-mentioned second dielectric substrate.

In accordance with the present invention, there is provided an RFID tag that can be mounted on a curved surface having a predetermined curvature, and that is characterized in including: a first dielectric substrate having a recessed portion formed in a central part of one main surface thereof, and having a degree of hardness which enables the above-mentioned dielectric substrate itself to bend with at least the above-mentioned predetermined curvature; a second dielectric substrate disposed inside the above-mentioned recessed portion, having a hole formed on a side of the one main surface of the above-mentioned first dielectric substrate, and having a degree of hardness higher than that of the above-mentioned first dielectric substrate; a ground conductive pattern disposed on another main surface of this dielectric substrate; a film base; a conductive pattern disposed on this film base in such a way as to be placed in an inner portion of the above-mentioned film base at a predetermined distance from each of edges of the above-mentioned film base, a long narrow slot being formed in this conductive pattern; and an IC chip electrically connected to the above-mentioned conductive pattern via this slot, and inserted into the above-mentioned hole of the above-mentioned second dielectric substrate.

In accordance with the present invention, there is provided an RFID tag that can be mounted on a curved surface having a predetermined curvature, and that is characterized in including: a first dielectric substrate having a penetrating hole formed in a central part thereof and penetrating from one main surface thereof to another main surface thereof, and having a degree of hardness which enables the above-mentioned dielectric substrate itself to bend with at least the above-mentioned predetermined curvature; a second dielectric substrate disposed inside the above-mentioned penetrating hole, having a hole formed on a side of the one main surface of the above-mentioned first dielectric substrate, and having a degree of hardness higher than that of the above-mentioned first dielectric substrate; a ground conductive pattern disposed on the other main surface of this dielectric substrate; a conductive pattern disposed on the above-mentioned first and second dielectric substrates in such a way as to be placed in an inner portion of the above-mentioned first dielectric substrate at a predetermined distance from each of edges of the above-mentioned first dielectric substrate, a long narrow slot being formed in this conductive pattern; and an IC chip electrically connected to the above-mentioned conductive pattern via this slot, and inserted into the above-mentioned hole of the above-mentioned second dielectric substrate.

In accordance with the present invention, there is provided an RFID tag that can be mounted on a curved surface having a predetermined curvature, and that is characterized in including: a first dielectric substrate having a penetrating hole formed in a central part thereof and penetrating from one main surface thereof to another main surface thereof, and having a degree of hardness which enables the above-mentioned dielectric substrate itself to bend with at least the above-mentioned predetermined curvature; a second dielectric substrate disposed inside the above-mentioned penetrating hole, having a hole formed on a side of the one main surface of the above-mentioned first dielectric substrate, and having a degree of hardness higher than that of the above-mentioned first dielectric substrate; a ground conductive pattern disposed on the other main surface of the above-mentioned first dielectric substrate; a film base; a conductive pattern disposed on this film base in such a way as to be placed in an inner portion of the above-mentioned film base, a long narrow slot being formed in this conductive pattern; and an IC chip electrically connected to the above-mentioned conductive pattern via this slot, and inserted into the above-mentioned hole of the above-mentioned second dielectric substrate.

In accordance with the present invention, there is provided an RFID tag that can be mounted on a curved surface having a predetermined curvature, and that is characterized in including: a first dielectric substrate having a penetrating hole formed in a central part thereof and penetrating from one main surface thereof to another main surface thereof, and having a degree of hardness which enables the above-mentioned dielectric substrate itself to bend with at least the above-mentioned predetermined curvature; a second dielectric substrate disposed inside the above-mentioned penetrating hole, having a hole formed on a side of the one main surface of the above-mentioned first dielectric substrate, and having a degree of hardness higher than that of the above-mentioned first dielectric substrate; a ground conductive pattern disposed on the other main surface of the above-mentioned first dielectric substrate and also disposed on the above-mentioned second dielectric substrate on a side of the other main surface of the above-mentioned first dielectric substrate; a conductive pattern disposed on the above-mentioned first and second dielectric substrates in such a way as to be placed in an inner portion of the above-mentioned first dielectric substrate at a predetermined distance from each of edges of the above-mentioned first dielectric substrate, a long narrow slot being formed in this conductive pattern; and an IC chip electrically connected to the above-mentioned conductive pattern via this slot, and inserted into the above-mentioned hole of the above-mentioned second dielectric substrate.

In accordance with the present invention, there is provided an RFID tag that can be mounted on a curved surface having a predetermined curvature, and that is characterized in including: a first dielectric substrate having a penetrating hole formed in a central part thereof and penetrating from one main surface thereof to another main surface thereof, and having a degree of hardness which enables the above-mentioned dielectric substrate itself to bend with at least the above-mentioned predetermined curvature; a second dielectric substrate disposed inside the above-mentioned penetrating hole, having a hole formed on a side of the one main surface of the above-mentioned first dielectric substrate, and having a degree of hardness higher than that of the above-mentioned first dielectric substrate; a ground conductive pattern disposed on the other main surface of the above-mentioned first dielectric substrate and also disposed on the above-mentioned second dielectric substrate on a side of the other main surface of the above-mentioned first dielectric substrate; a film base; a conductive pattern disposed on this film base in such a way as to be placed in an inner portion of the above-mentioned film base at a predetermined distance from each of edges of the above-mentioned film base, a long narrow slot being formed in this conductive pattern; and an IC chip electrically connected to the above-mentioned conductive pattern via this slot, and inserted into the above-mentioned hole of the above-mentioned second dielectric substrate.

The RFID tag in accordance with the present invention has a fixing means for fixing the above-mentioned conductive pattern formed on the above-mentioned film base to the one main surface of the above-mentioned dielectric substrate.

In the RFID tag in accordance with the present invention, the above-mentioned recessed portion or the above-mentioned penetrating hole is shaped like a circle or a polygon.

In the RFID tag in accordance with the present invention, the above-mentioned second dielectric substrate is made from a solidified mold material.

In the RFID tag in accordance with the present invention, at least one of the above-mentioned conductive pattern and the above-mentioned ground conductive pattern is made from a metal fiber sheet.

In the RFID tag in accordance with the present invention, the above-mentioned ground conductive pattern has a cutout portion in which a part thereof is cut out.

In the RFID tag in accordance with the present invention, the above-mentioned ground conductive pattern is shaped like a grid-shaped pattern or a meander pattern.

In the RFID tag in accordance with claim 16, the above-mentioned IC chip is electrically connected to electrical connecting portions extending respectively from both sides of the above-mentioned slot in a direction of a width of the above-mentioned slot toward an inner side of the above-mentioned slot.

According to the present invention, because the direction of the electric field occurring in the slot matches the direction of the electric field of the patch antenna, the cross-polarization component can be reduced substantially. Furthermore, because the conductive pattern which constructs the slot acts as the radiant portion of the patch antenna, the antenna radiation characteristics of the RFID tag are hardly affected not only in a case in which the RFID tag is mounted to a nonconductive object, but also in a case in which the RFID tag is mounted to a conductive object. In addition, because the RFID tag is constructed in such a way that the IC chip are electrically connected to the electric conductive pattern via the slot, there is provided an advantage of being able to reduce the electric supply loss, thereby preventing the range in which the RFID tag can carry out communications from being shortened. In addition, because the RFID tag is constructed in such a way that the IC chip is inserted into the hole of the dielectric substrate, that is, the IC chip is accommodated inside the dielectric substrate, no bulge occurs due to the mounting of the IC chip. Therefore, there is provided an advantage of reducing the occurrence of a break in the IC chip due to a shock or the like, and also reducing the occurrence of a break in the IC chip due to the IC chip being caught in a roller or a drum when the IC chip is printed with a label printer.

Furthermore, according to the present invention, in the case in which the RFID tag is constructed without using any film base, the thickness of the whole RFID tag can be reduced. Because a part of the conductor corresponding to the slot is exposed, the adjustment of the size of the slot can be easily performed. That is, the adjustment of the impedance can be easily performed. Furthermore, because any film base is not used, there is also provided an advantage of reducing the cost of the RFID tag.

In addition, according to the present invention, because the dielectric substrate having a degree of hardness which enables the dielectric substrate itself to bend with the predetermined curvature is used as the material of the substrate of the RFID tag and the IC chip is placed in a vicinity of the center of the RFID tag, there is provided an advantage of mounting the RFID tag not only on a plane but also on a curved mounting surface having the predetermined curvature.

PREFERRED EMBODIMENTS OF THE INVENTION

Hereafter, in order to explain this invention in greater detail, the preferred embodiments of the present invention will be described with reference to the accompanying drawings.

Embodiment 1

Figure 1:
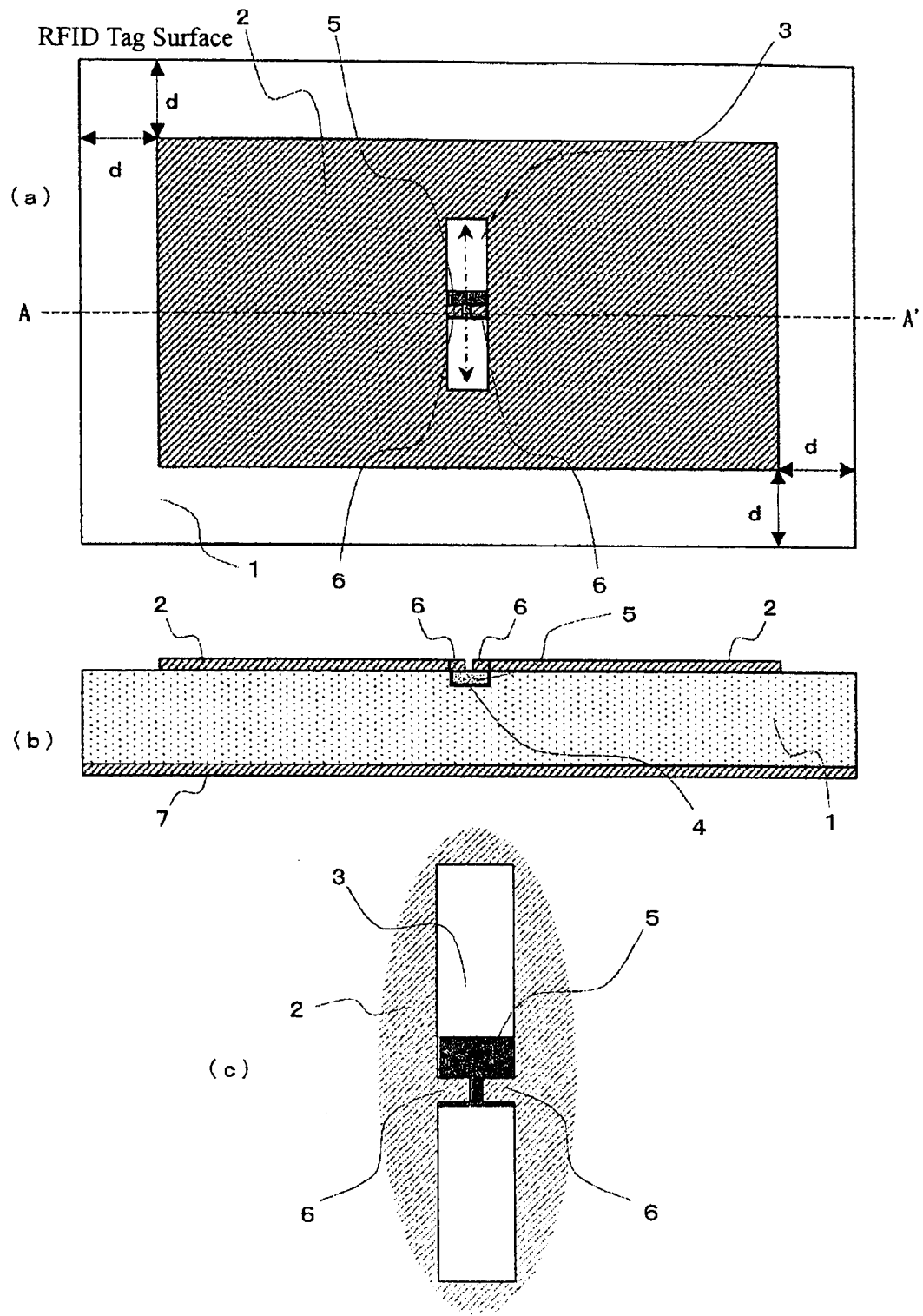
FIG. 1 is a configuration diagram of an RFID tag in accordance with Embodiment 1 of the present invention.

Embodiment 1 of the present invention will be explained hereafter. FIG. 1 is a configuration diagram of an RFID tag in accordance with this Embodiment 1. FIG. 1(a) is a plan view of the RFID tag, FIG. 1(b) is a cross-sectional view taken along the A-A' line shown in FIG. 1(a), and FIG. 1(c) is a plan view showing an enlarged part in a vicinity of a slot of the RFID tag shown in FIG. 1(a). In these figures FIGS. 1(a) to 1(c), a conductive pattern 2 is disposed on one main surface (a front surface) of a dielectric substrate 1. As shown in FIG. 1(a), the conductive pattern 2 is formed in an inner portion of the dielectric substrate 1 in such a way as to be at a distance d from each of vertical edges and horizontal edges of the dielectric substrate 1. As shown in FIG. 1(a), a long narrow slot 3 is formed in a central portion of the conductive pattern 2. This slot 3 can be formed by making the conductive pattern 2 be subjected to an etching process, a milling process, vapor deposition, printing, or the like. The length and the width of this slot 3 can be determined according to the use frequency of the RFID tag. A hole (a recessed portion) 4 is formed in the one main surface of the dielectric substrate 1. An IC chip 5 is comprised of a memory and so on which will be mentioned below. This IC chip 5 is electrically connected to the conductive pattern 2 via the slot 3. In the figures, the same reference numerals denote the same components or like components, and therefore the detailed explanation about them will be omitted hereafter.

Hereafter, a connecting structure for connecting the IC chip 5 and the conductive pattern 2 will be explained. As shown in FIGS. 1(a) and 1(b), electrical connecting portions 6 and 6 of projecting shape are extending respectively from both sides of the slot 3 which are opposite to each other in a direction of the width of the slot, toward an inner portion of the slot 3, and are connected continuously and electrically to the conductive pattern 2 and 2 on the both sides of the slot 3 respectively. These electrical connecting portions 6 and 6 can be simply formed at the same time when the conductive pattern 2 is formed. Two terminals (not shown) of the IC chip 5 are connected to those electrical connecting portions 6 and 6. In a case in which the size of the IC chip 5 is substantially the same as or smaller than the width of the slot 3, the IC chip 5 can be accommodated within the width of the slot 3. At this time, the two terminals (not shown) of the IC chip 5 are connected to the electrical connecting portions 6 and 6. However, in a case in which the size of the IC chip 5 is larger than the width of the slot 3, what is necessary is only to electrically connect the terminals (not shown) of the IC chip to portions of the conductive pattern 2 close to the slot 3 through the slot. Therefore, in this case, it is not necessary to dispose the electrical connecting portions 6 and 6 as described above.

Furthermore, in FIG. 1(a), the IC chip 5 is placed in the center of the slot 3 with respect to the direction of the length of the slot 3. The IC chip 5 can be placed, instead of being placed in the center of the slot 3, in an edge portion of the slot 3 in the direction of the length of the slot which is away from the central portion along an arrow given to the slot 3 of FIG. 1(a). Because the hole 4 of the dielectric substrate 1 is formed so that the IC chip 5 is inserted into the hole, the hole has a depth and a width corresponding to the size of the IC chip. However, in a case in which either a mold material or an adhesive bond is used in order to secure the IC chip to the dielectric substrate, it is necessary to consider their volumes. As a matter of course, the position at which the hole 4 is formed is determined according to at which position of the slot 3 the IC chip 5 is placed. Anyway, it is necessary to make the shape and size of the slot 3 match the number and the characteristic impedance of the electrical connecting portions 6 which are connected to the IC chip 5 mounted to the dielectric substrate. For example, in a case in which the number of legs of the connecting terminals of the IC chip 5 is two, in order to match the impedance of the IC chip 5 with that of the slot, what is necessary is only to form two electrical connecting portions 6 each having a width which can establish the impedance matching in addition to a fine adjustment of the shape of the slot 3. Furthermore, a ground conductive pattern 7 is disposed on another main surface (a rear surface) of the dielectric substrate 1.

Figure 2:
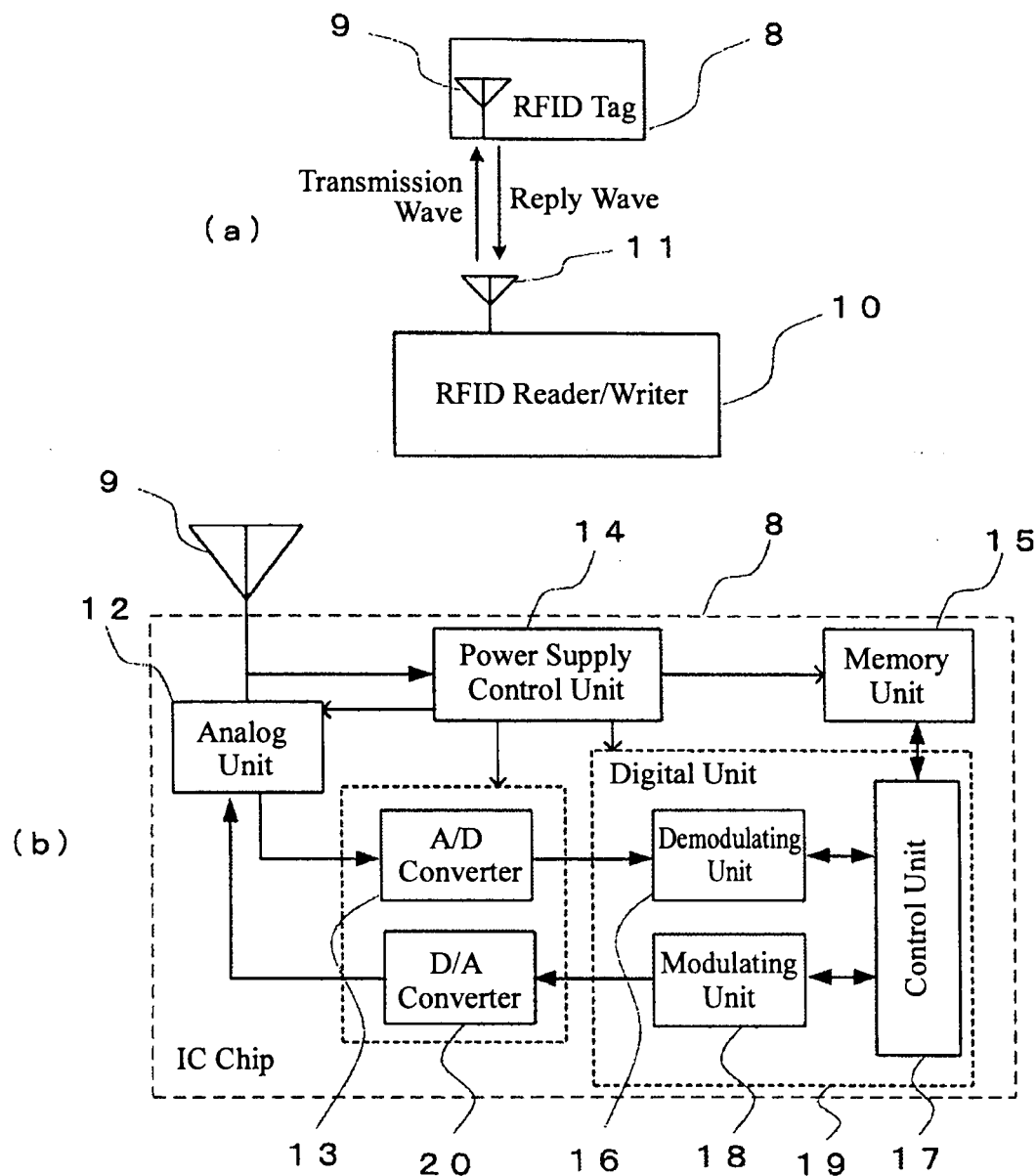
FIG. 2 is a bock diagram showing the basic structure of an RFID system in accordance with the present invention.

FIG. 2 is a basic configuration diagram of an RFID system, and FIG. 2(a) is a conceptual diagram schematically showing a state in which transmission and reception are carried out between the RFID tag and a RFID reader/writer. FIG. 2(b) is a diagram showing the structure of the RFID tag, and particularly shows a block diagram showing functionally the internal structure of the IC chip 5. In FIGS. 2(a) and (b), the RFID tag 8 has the structure shown in FIG. 1. An antenna portion 9 disposed in this RFID tag 8 corresponds to the conductive pattern 2, as shown in FIG. 1, in which the slot 3 is formed. Because, as shown in FIG. 1 mentioned above, the conductive pattern 2 having the slot 3 formed in the one main surface (the front surface) of the dielectric substrate 1 is disposed as the antenna portion 9 of the RFID tag 8, and the ground conductive pattern 7 is disposed on the other main surface (the rear face) of the dielectric substrate 1, the RFID tag 8 functions as a patch antenna. More specifically, the conductive pattern 2 having the slot 3 functions as an antenna pattern (a radiant portion). The use frequency of the RFID system is adjusted and the impedance matching between the conductive pattern 2 and the slot 3, and IC chip 5 is achieved so that the conductive pattern 2 and the slot 3 are excited. Because this adjustment is also associated with the thickness and specific inductive capacity of the dielectric substrate 1 greatly, a desired radiation pattern and a desired gain can be acquired by making the adjustment and designing the RFID tag by also taking these requirements into consideration. Furthermore, the slot 3 is formed in the central portion of the conductive pattern 2 as mentioned above so that the conductive pattern 2 generates a good radiation pattern. By making the adjustment and designing the RFID tag by further taking this requirement into consideration, the RFID tag 8 can provide a desired radiation pattern and a desired gain, and can have a communication range of, e.g., about 1 to 8 m without upsizing the RFID tag 8 itself, i.e., the dielectric substrate 1.

Furthermore, an antenna unit 11 is disposed in the RFID reader/writer 10, and performs radio communications with the antenna portion 9 of the RFID tag 8. The IC chip 5 is as explained with reference to FIG. 1, and has a concrete structure as shown in FIG. 2(*b*). An analog unit 12 receives a transmission wave from the RFID reader/writer 10 by way of the antenna unit 9 of the RFID tag 8, and outputs the transmission wave to a next-stage digital unit 19. An A/D converter 13 performs A/D conversion on the transmission wave. A power supply control unit 14 smoothes the transmission wave received by the antenna unit 9 by using a rectification circuit to generate electric power, and performs electric supply and power control on each circuit of the RFID tag 8. A memory unit 15 is mounted in the RFID tag 8, and stores tag information, such as individual identification information. A demodulating unit 16 demodulates the transmission wave, and a control unit 17 controls circuits included in the IC chip 5 including the memory unit 15 by using the transmission wave demodulated by the demodulating unit 16. A modulating unit 18 modulates information which is retrieved from the memory unit 15 by the control unit 17. The digital unit 19 is comprised of the demodulating unit 15, the control unit 16, and the modulating unit 17. A D/A converter 20 performs D/A conversion on the signal transmitted from the modulating unit 18, and outputs the D/A-converted signal to the analog unit 12. In the figures, the same reference numerals denote the same components or like components, and therefore the detailed explanation about them will be omitted hereafter.

Hereafter, the basic operation of the RFID system constructed as above will be explained. According to the use of this RFID system (entrance/exit control or physical distribution management of living bodies or products), tag information about a living body or product is stored in the memory unit 15 of the RFID tag 8, and the RFID reader/writer 10 can update the tag information or write information in the RFID tag, or can read the tag information from the RFID tag when the RFID tag 8 is existing in or moving through its transmission and reception area (with the RFID tag being attached to the living body or product which is a target for entrance/exit control or physical distribution management). The RFID reader/writer 10 transmits, as a transmission wave, a command signal for instructing the RFID tag 8 to perform an update or writing, or reading or the like to the antenna portion 9 of the RFID tag 8 from the antenna unit 11 of the RFID reader/writer 10. The antenna unit 9 of the RFID tag 8 receives the transmission wave, and the power supply control unit 14 performs detection and accumulation of electricity (smoothing) on the transmission wave to generate operation power for the RFID tag 8 and furnish the operation power to each of the circuits of the RFID tag 8. The demodulating unit 16 demodulates the transmission wave to acquire the command signal. The control unit 17 carries out data processing according to the description of the command shown by the command signal which the demodulating unit has acquired to demodulate the transmission wave, and provides either an instruction for updating or writing tag information or an instruction for reading the tag information, or both of them to the memory unit 15. A reply wave which the modulating unit 18 acquires by modulating a read signal which the memory unit 15 outputs according to this instruction from the control unit 17 passes through the analog unit 12, and is transmitted to the antenna unit 11 of the RFID reader/writer 10 from the antenna portion 9, and the RFID reader/writer 10 then receives the read signal to acquire desired information. In the figures, the same reference numerals denote the same components or like components, and therefore the detailed explanation about them will be omitted hereafter.

Furthermore, the operation of the RFID system using the RFID tag in accordance with Embodiment 1 will be explained hereafter in detail. The RFID reader/writer 10 transmits, as a transmission wave, a command signal for instructing the RFID tag 8 to perform an update or writing, or reading or the like to the antenna portion 9 of the RFID tag 8 from the antenna unit 11 of the RFID reader/writer 10. When the conductive pattern 2 which is the radiant portion for radiating an electric wave of the dielectric substrate 1 which constructs the RFID tag 8 receives the transmission wave, a potential difference occurs between the opposing sides of the slot 3 and the transmission wave is furnished to the IC chip 5. As mentioned above, the power supply control unit 14 performs detection and accumulation of electricity (smoothing) on the transmission wave furnished to the IC chip 5 to generate operation power for the RFID tag 8. When the operation power is furnished to each of the circuits (the IC chip 5) of the RFID tag 8, the transmission wave is demodulated to produce the command signal, and the control unit provides either an instruction for updating or writing tag information or an instruction for reading the tag information, or both of them to the memory unit 15 according to the description of the command shown by the command signal which has been acquired by demodulating the transmission wave. A read signal outputted from the memory unit 15 passes along the same route as that along which the transmission wave has been furnished to the IC chip 5, as a reply wave, and this reply wave is transmitted from the conductive pattern 2 which is the radiant portion to the RFID reader/writer 10. The antenna unit 11 of the RFID reader/writer 10 receives the reply wave to acquire desired information. The description of data which are radio-communicated by the RFID system can be the same as that of data radio-communicated by a conventional RFID system, or can be newly defined. Furthermore, because the ground conductive pattern 7 is formed on the rear surface of the dielectric substrate 1, the RFID tag can be mounted onto an object onto which the RFID tag is to be mounted regardless of whether the object is a conductor or a non-conductor by orienting the rear surface of the dielectric substrate 1 toward the object onto which the RFID tag is to be mounted. Furthermore, the RFID tag having such a simple structure can be manufactured at a low cost. Therefore, the RFID tag can be used in broad fields, such as physical distribution management, warehouse control, equipment management, entrance and exit management of cars, etc., which require a lot of RFID tags, and the RFID tag can be mounted onto an object onto which the RFID tag is to be mounted regardless of whether the object or the object's mounting surface is a conductor or a non-conductor.

Figure 3:
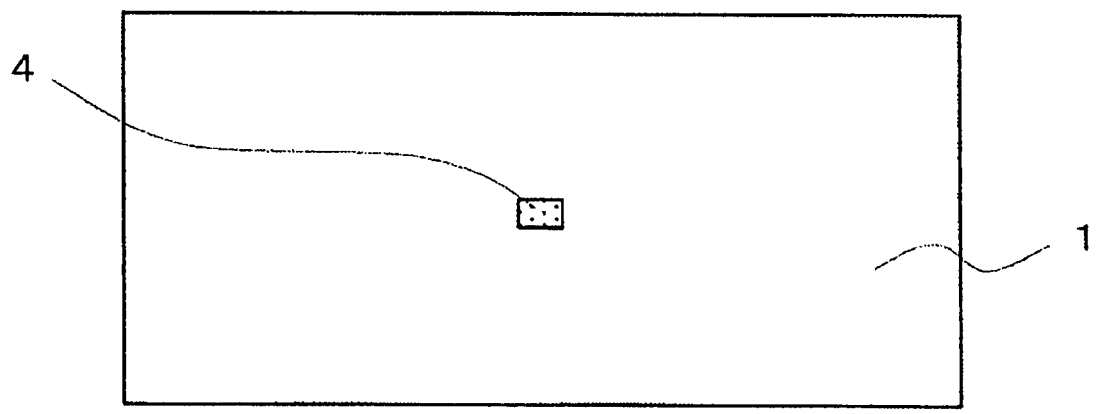
FIG. 3 is a configuration diagram of a dielectric substrate in accordance with the present invention in which a hole is formed.
Figure 4:
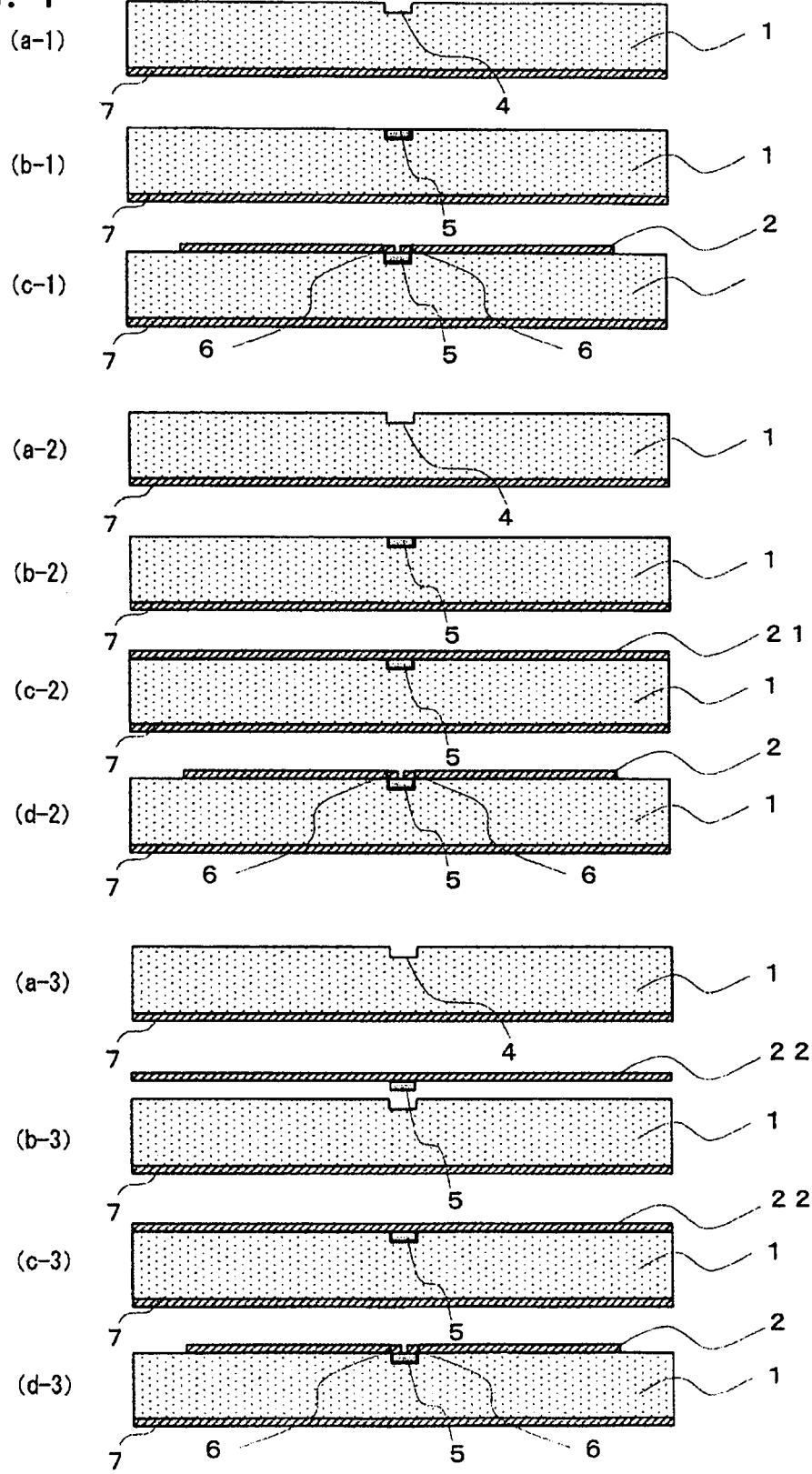
FIG. 4 is a view showing processes of manufacturing the RFID tag in accordance with the present invention.

A method of manufacturing the RFID tag in accordance with Embodiment 1 can be a general method of manufacturing an RFID tag as described in either of above-mentioned patent references 1 to 5 (except a manufacturing method disclosed by patent reference 6 because this method includes a step of forming a slot in a conductive plate). Examples of the manufacturing method will be briefly explained with reference to FIGS. 3 and 4. FIG. 3 is a plan view of the dielectric substrate 1 in which the hole 4 into which the IC chip 5 is inserted is formed in the one main surface of the dielectric substrate 1 (a configuration diagram of the dielectric substrate 1 in which the hole is formed). It can be considered that this hole 4 is formed in the substrate through cutting or the like, or, in a case in which the substrate is formed by using an injection molding method, the hole is formed at the time when the substrate is molded. FIG. 4 is a diagram showing manufacturing processes of three classified examples of the RFID tag manufacturing method in accordance with Embodiment 1 (a-1) to (c-1), (a-2) to (d-2), and (a-3) to (d-3). In these three examples of the manufacturing method, FIGS. 4(*a*-1), 4(*a*-2), and 4(*a*-3) show initial stages of the three examples of the manufacturing method respectively, and the structures of the RFID tags manufactured by using the three examples are the same. In these figures, a state in which the hole 4 is formed in the one main surface (the front surface) of the dielectric substrate 1, and the ground conductive pattern 7 is formed in the other main surface (the rear face) of the dielectric substrate 1 is shown. As a formation method of forming the ground conductive pattern 7, a general method of manufacturing a substrate should just be used. Like FIG. 1(*b*), FIG. 4 show cross-sectional views, taken along the A-A' line of FIG. 1(*a*), of finished RFID tags corresponding to the RFID tag shown in FIG. 1(*b*). In the figures, the same reference numerals denote the same components or like components, and therefore the detailed explanation about them will be omitted hereafter.

The manufacturing method shown in FIGS. 4(*a*-1) to 4(*c*-1) will be explained. The IC chip 5 is placed in the hole 4 of the dielectric substrate 1 in the state as shown in above-mentioned FIG. 4(*a*-1), i.e., in the initial state, so that the dielectric substrate 1 is placed in a state as shown in FIG. 4(*b*-1). Next, the conductive pattern 2 (including the slot 3 and the electrical connecting portions 6) is formed on the front surface of the dielectric substrate 1 through printing or vapor deposition. When the conductive pattern 2 is formed on the front surface of the dielectric substrate, the two terminals (not shown) of the IC chip 5 are connected to the electrical connecting portions 6 and 6 of the conductive pattern respectively. By doing in this way, the RFID tag as shown in FIG. 4(*c*-1) is completed. Next, the manufacturing method shown in FIGS. 4(*a*-2) to 4(*d*-2) will be explained. In accordance with this method, after the IC chip 5 is placed in the hole 4 of the dielectric substrate 1 and the dielectric substrate 1 is then placed in a state as shown in FIG. 4(*b*-2), a conductive layer 21 is formed on the front surface of the dielectric substrate 1 (FIG. 4(*c*-2)), and the conductive pattern 2 (including the slot 3 and the electrical connecting portions 6) formed in the dielectric substrate 1 by etching or milling the conductive layer 21. By doing in this way, the RFID tag as shown in FIG. 4(*d*-2) is completed. When the conductive pattern 2 is formed on the front surface of the dielectric substrate, the terminals (not shown) of the IC chip 5 are connected respectively to portions of the conductive layer 21 where the electrical connecting portions 6 and 6 will be finally formed.

Next, the manufacturing method shown in FIGS. 4(*a*-3) to 4(*d*-3) will be explained. In this method, as compared with the above-mentioned method as shown in FIGS. 4(*a*-2) to 4(*d*-2), because the processes (*d*-2) and (*d*-3) are almost the same as each other, processes (*b*-3) and (*c*-3) different from those as mentioned above will be explained. First, a conductive foil 22 is placed in such a way as to face the front surface of the dielectric substrate 1 (FIG. 4(*b*-3)). In this case, the IC chip 5 is mounted on the conductive foil 22, and the terminals (not shown) of the IC chip 5 are connected respectively to corresponding portions of the conductive foil 22 where the electrical connecting portions 6 and 6 will be finally formed. The conductive foil 22 is then placed on the front surface of the dielectric substrate 1 with the hole 4 being aligned with the IC chip 5 (FIG. 4(*c*-3)). As the method of manufacturing the RFID tag, another method other than the general method of machining a substrate and the exemplary RFID tag manufacturing methods as method above can be used, and any constraints are not imposed on the manufacturing method as long as the structure of the RFID tag in accordance with Embodiment 1 can be implemented.

As mentioned above, because the RFID tag in accordance with Embodiment 1 is constructed in such away that the IC chip 5 is inserted into the hole 4 formed in the one main surface of the dielectric substrate 1, and the IC chip 5 is electrically connected to the conductive pattern 2 through chip bonding. Therefore, even when a shock or the like is applied to the RFID tag, the rate of occurrence of failures, such as a breakage of the IC chip 5, poor electrical contact between the IC chip 5 and the electrical connecting portions 6, and disconnection between them, can be reduced greatly. Furthermore, the size of the hole of the dielectric substrate 1 has only to be determined in consideration of the yield at the time of inserting the IC chip 5 into the hole 4 with respect to the volume of the IC chip 5.

Figure 5:
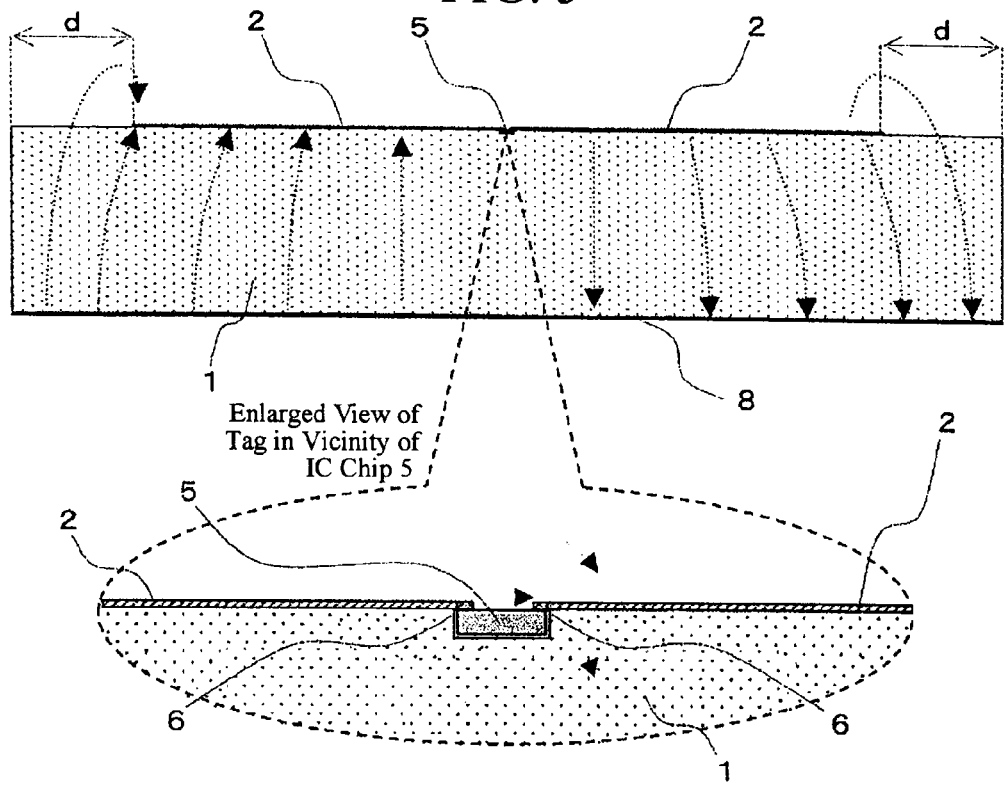
FIG. 5 is a graphical representation of electric field intensity showing an electric field occurring in the RFID tag in accordance with the present invention.

FIG. 5 is a graphical representation of electric field intensity showing an electric field (shown by arrows) occurring in the RFID tag in accordance with Embodiment 1. In FIG. 5, a partly enlarged view of the RFID tag in a vicinity of the IC chip 5 is also shown, and the appearance of the electric field is shown by arrows in the partly enlarged view. The arrows shown in FIG. 5 show the electric field occurring between the ground conductive pattern 7 and the conductive pattern 2, and the electric field runs between the opposing sides of the slot 3 and a potential difference occurs between them because the electric field is formed between the conductors. The position where the intensity of the electric field in the direction of the thickness of the dielectric substrate 1 is zero is made to serve as the feeding point of the IC chip. As shown in FIG. 5, because the electric fields on the both sides of the dielectric substrate 1 cancel each other out inside the dielectric substrate 1, the intensity of the electric field become zero at a position along the axis of the slot 3 extending in the direction of the length of the slot (in the depth direction in FIG. 5). If the electrical connecting portions 6 connected to the IC chip 5 are placed at this position, the electric supply loss can be reduced greatly. Therefore, because the direction of the electric field occurring in the slot 3 matches the direction of the electric field of the patch antenna in the case in which the RFID tag is constructed in this way, the cross-polarization component can be reduced substantially. In addition, because the RFID tag is based on the formation of the slot 3 in the center of the patch antenna (the conductive pattern 2), the pattern of the correct-polarization component also becomes left-right symmetrical and therefore the radiation pattern of the antenna (the RFID tag) can be made to have good symmetry. Thus, the present embodiment offers an advantage of providing an RFID tag that can greatly widen the range in which the RFID tag can communicate with an RFID tag reader/writer while reducing the influence on the symmetry of the radiation pattern of the conductive pattern 2, and that can improve its performance greatly even if it has a simple structure. In the figures, the same reference numerals denote the same components or like components, and therefore the detailed explanation about them will be omitted hereafter.

Figure 6:
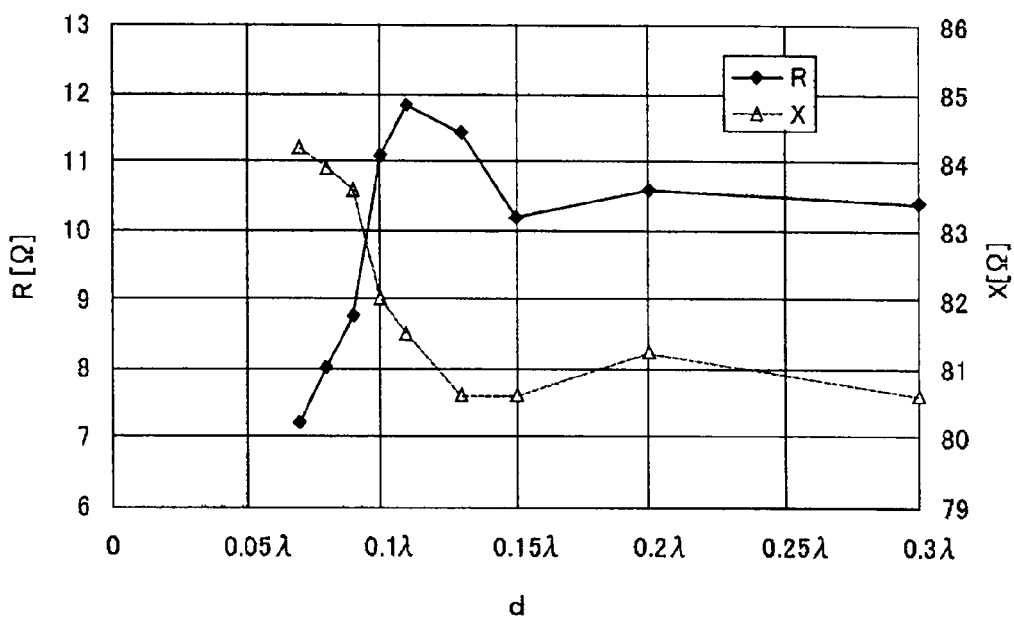
FIG. 6 is a characteristic diagram showing changes of the characteristic impedance in the RFID tag in accordance with the present invention.

FIG. 6 is a characteristic diagram showing changes of the characteristic impedance in the RFID tag in accordance with Embodiment 1. As mentioned above, the conductive pattern 2 is formed in such a way as to be at the predetermined distance d from each of the edges of the dielectric substrate 1. It can be said from this description that because the ground conductive pattern 7 is formed over the whole of the other main surface of the dielectric substrate 1, the predetermined distance d is the difference in dimension between the conductive pattern 2 and the ground conductive pattern 7 at each of their four corners, as shown in FIG. 5. When the predetermined distance d is defined in this way, even in a case in which the ground conductive pattern 7 is not formed over the whole of the other main surface of the dielectric substrate 1, it can be similarly considered that the predetermined distance d is the difference in dimension between the conductive pattern 2 and the ground conductive pattern 7 at each of their four corners. In FIG. 6, the horizontal axis shows the predetermined distance or the above-mentioned difference d in dimension using a ratio of the wavelength at the use frequency of the RIFD tag, and the vertical axes R [Ω] and X [Ω] show the real part and the imaginary part of the characteristic impedance respectively, where λ in the horizontal axis is the wavelength at the use frequency. As can be seen from the characteristic diagram of FIG. 6, when the predetermined distance d is equal to or larger than 0.13λ, the characteristic impedance of the RFID tag 8 is nearly constant. Therefore, by setting the predetermined distance d to be equal to or larger than 0.13λ, because the characteristic impedance of the RFID tag can be made to be nearly constant regardless of whether an object onto which the RFID tag is to be mounted is a conductor or a non-conductor and even if the RFID tag is staying in a state in which it is floated in the air, the RFID tag can carry out radio communications with an RFID reader/writer 10 without reducing the performance of the RFID. In addition, because the intensity of the electric field is zero at the position of the hole 4 of the dielectric substrate 1, it can be said that an RFID tag without the hole 4, i.e., an RFID tag in a state in which no IC chip 5 is inserted into the dielectric substrate 1 exhibits the nearly same characteristic impedance change as an RFID tag in which a conductive pattern which is the radiant portion of a patch antenna has the same shape as the conductive pattern 2.

Embodiment 2

Figure 7:
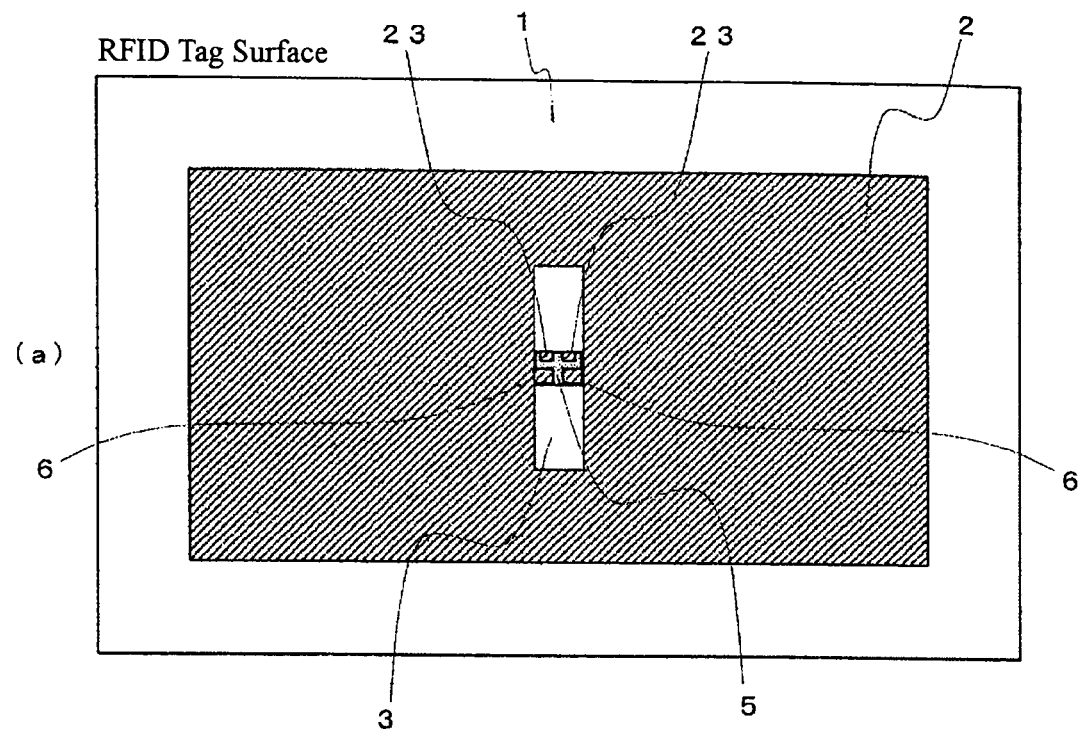
FIG. 7 is a plan view showing the structure of an RFID tag in accordance with Embodiment 2 of the present invention.
Figure 7:
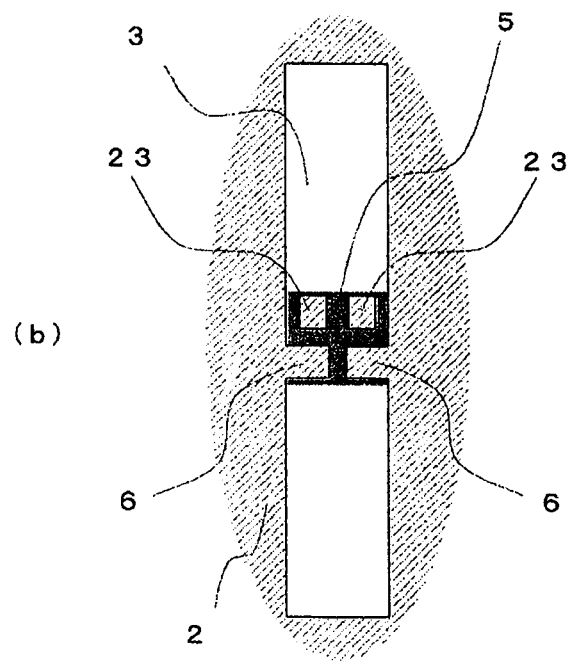

Embodiment 2 of the present invention will be explained with reference to FIG. 7. FIG. 7 is a plan view showing the structure of an RFID tag in accordance with Embodiment 2, FIG. 7(a) is a plan view of the RFID tag, and FIG. 7(b) is a plan view showing an enlarged part in a vicinity of a slot of the RFID tag shown in FIG. 7(a). In the figures, the same reference numerals denote the same components or like components, and therefore the detailed explanation about them will be omitted hereafter. In Embodiment 1, the case in which the number of terminals (not shown) of the IC chip 5 is two, i.e., the IC chip having two legs is used is explained. In contrast, in this embodiment, an IC chip 5 having four terminals is mounted, and, in addition to electrical connecting portions 6 and 6 as explained in Embodiment 1, two dummy pads 23 and 23 are disposed inside the slot 3 in a vicinity of the electrical connecting portions 6 and 6. In a formation method of forming these dummy pads 23 and 23, they are formed at the same time when the electrical connecting portions 6 and 6 are formed. The dummy pads 23 and 23 serve as simple dummies which are not electrically connected to a conductive pattern 2 and the electrical connecting portions 6 and 6. Because the RFID tag can be thus constructed in such a way as to flexibly respond to a change in the specifications of the IC chip 5 to be mounted in the RFID tag, the RFID tag having a simple structure can be manufactured at a low cost. The number of the dummy pads 23 is not limited to two. In following Embodiment 3, an explanation using an RFID tag having dummy pads 23 will be made.

Embodiment 3

Figure 8:
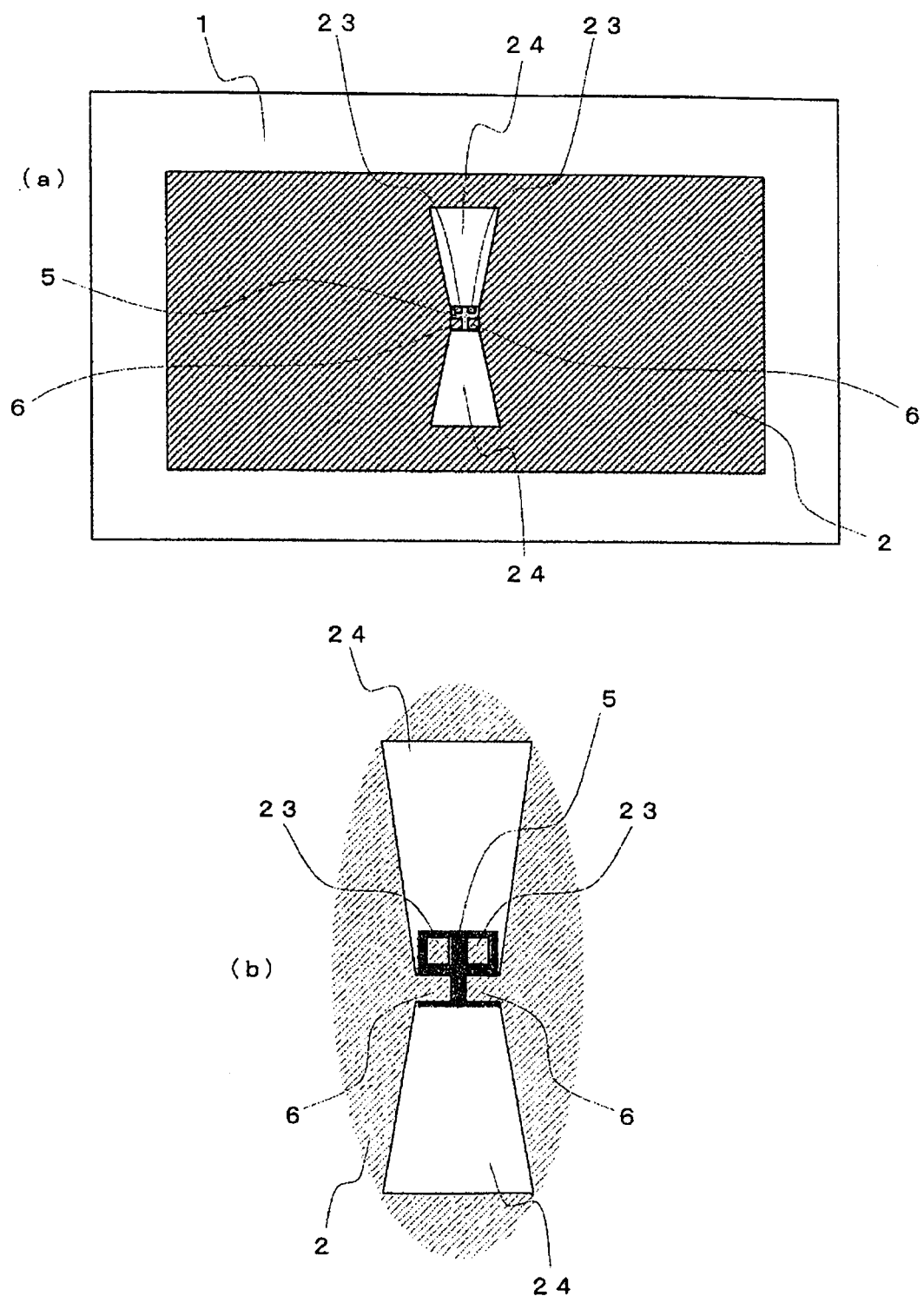
FIG. 8 is a plan view showing the structure of an RFID tag in accordance with Embodiment 3 of the present invention.
Figure 9:
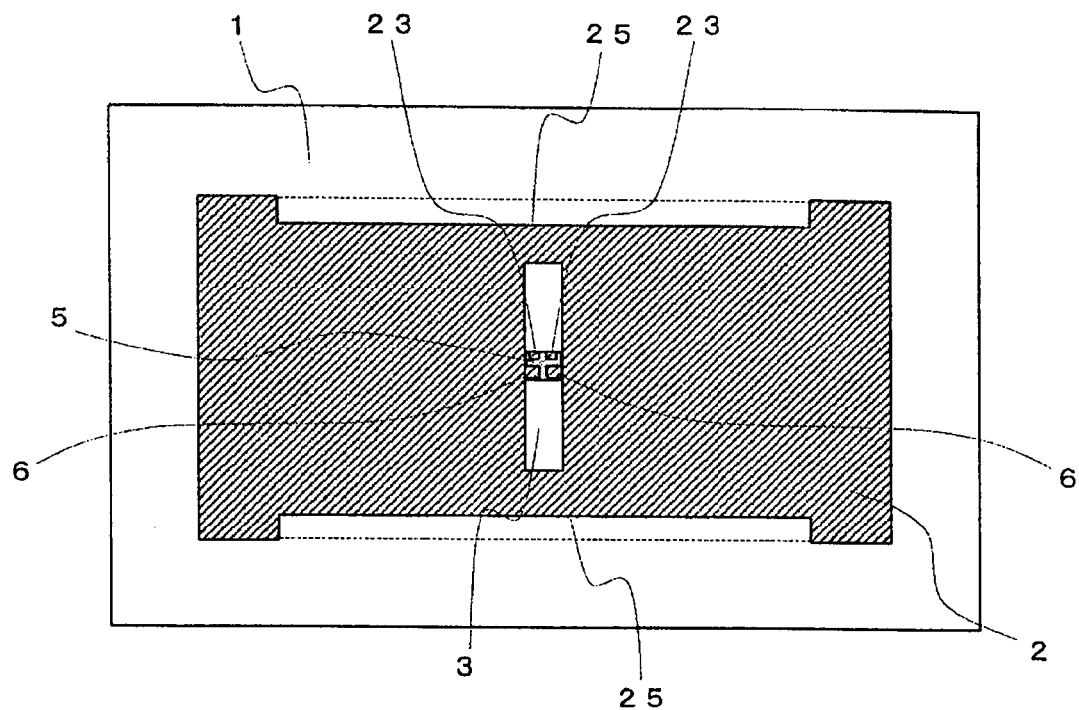
FIG. 9 is a plan view showing the structure of an RFID tag in accordance with Embodiment 3 of the present invention.
Figure 10:
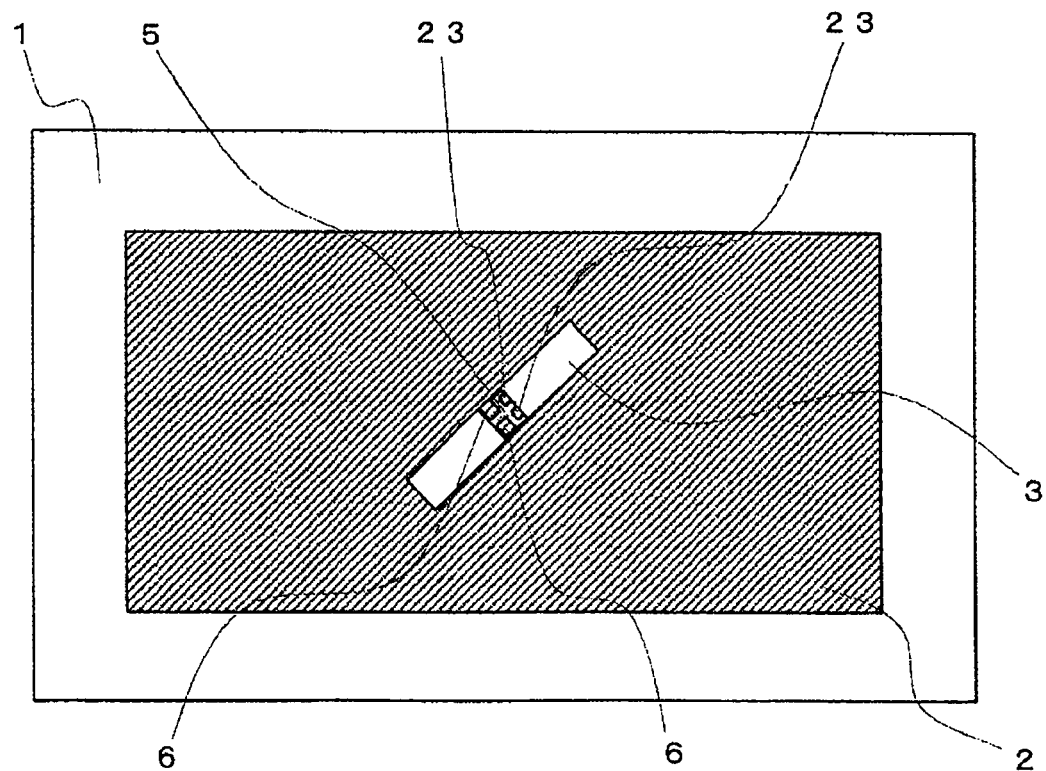
FIG. 10 is a plan view showing the structure of an RFID tag in accordance with Embodiment 3 of the present invention.

Embodiment 3 of the present invention will be explained with reference to FIGS. 8 to 10. FIG. 8 is a configuration diagram showing the structure of an RFID tag in accordance with Embodiment 3, FIG. 8(a) is a plan view of the RFID tag, FIG. 8(b) is an enlarged view of a slot of the RFID tag in accordance with Embodiment 3, FIG. 9 is a configuration diagram showing the structure of an RFID tag in accordance with Embodiment 3, and FIG. 10 is a configuration diagram showing the structure of an RFID tag in accordance with Embodiment 3. In FIGS. 8 to 10, a taper-shaped slot 24 is formed in such a way as to widen along each of opposing directions of its length with distance from the position at which an IC chip 5 is placed, and an electric length adjusting unit 25 is formed in each of edge portions of a conductive pattern 2 in such a way as to be shaped like a cutout portion. A slot 26 is formed in such a way as to have an angle with respect to the sides of a conductive pattern 2, and a degeneration separation method is applied to the conductive pattern 2 so that the slot 26 radiates an electric wave of circular polarization. In the figures, the same reference numerals denote the same components or like components, and therefore the detailed explanation about them will be omitted hereafter. Hereafter, the structure and operation of each of the RFID tags in accordance with Embodiment 3 will be explained with reference to FIGS. 8 to 10. In Embodiment 3, an explanation about transmission and reception of an electric wave of circular polarization using broadening the band of the RFID tag, an electric length adjustment method, and degeneration separation will be made, though the basic structures of the RFID tags and the advantages provided by this invention are the same as those shown in Embodiments 1 and 2.

FIGS. 8(a) and (b) are related with the broadening of the band of the RFID tag, and the slot 24 is tapered in such a way as to widen along each of opposing directions of its length with distance from the position at which the IC chip 5 is placed. As compared with the slot 3 of FIG. 1 in which the opposing sides of the slot 3 are formed in such a way that the slot, except parts corresponding to the electrical connecting portions 6, has a constant width along each of opposing directions of its length, because the slot 24 has a tapered shape as mentioned above, the band broadening of the use frequency of the RFID tag can be implemented and its band can be selected by adjusting the rate at which the width of the tapered slot increases. Therefore, because the communication available frequency range of the RFID system can be broadened, the impedance matching can be easily established, and not only a yield drop due to manufacturing errors can be reduced, but the RFID tag can be made to have a strong environmental resistance against an impedance change even if a waterdrop or a dirt from an environment around the position where the RFID tag is mounted is adhered to the RFID tag. There may be a case in which there is no necessity to provide the dummy pads 23 according to the number of the legs of the terminals disposed in the IC chip 5.

FIG. 9 is related with the electric length adjustment method of adjusting the electric length of the RFID tag, and this RFID tag differs largely from the RFID tag of FIG. 1 in that it has the conductive pattern 2 in which a cutout shape electric length adjusting portion 25 is formed in each of the sides of the conductive pattern 2, as shown in the figure. Because each of the electric length adjusting portions 25 is formed at a position perpendicular to the slot 3, the effective electric length of the conductive pattern 2 becomes longer than its apparent length, and the size of the conductive pattern 2 can be reduced even if the use frequency of the RFID system is fixed. Therefore, the size of the whole RFID tag 8 can be reduced. Because the length of each of the electric length adjusting portions 25 can be changed as long as the length of each of the electric length adjusting portions is shorter than that of the conductive pattern 2, by adjusting and designing the length of each of the electric length adjusting portions and the width of each part cut out from the conductive pattern, the whole RFID tag 8 can be made to have a size equal to a business card size or a size suited for an object onto which the RFID tag is to be mounted within a certain limit. Because the flexibility of the size and shape of the tag is thus increased (in other words, the constraints on the tag can reduced), the flexibility of the mounting location can be expanded to more than the previous one. Because in addition to the adjustment of the electric length adjusting portions 25, the thickness and specific inductive capacity of the dielectric substrate 1, the size of the conductive pattern 2, the size of the slot 3, and soon are greatly related with the size and matching of the RFID tag 8, as in the case of Embodiment 1, by making the adjustment and designing the RFID tag by further taking these requirements into consideration, the RFID tag 8 can have a desired size and provide a desired radiation pattern and a desired gain. Furthermore, one of the electric length adjusting portions can be formed only in one of the sides of the conductive pattern 2.

FIG. 10 is related with the transmission and reception of an electric wave of circular polarization using the degeneration separation of the RFID tag. This RFID tag largely differs from the RFID tag of FIG. 1 in that the slot 26 is disposed in such a way as to be inclined with respect to the conductive pattern 2, as shown in FIG. 10. As compared with the slot 3 of FIG. 1, the slot 26 is formed in such a way as to be inclined about 45 degrees around the IC chip 5 (the direction in which the slot is inclined is determined according to whether an electric wave transmitted and received has either dextrorotatory or levorotatory). Because the slot is formed in the position inclined as above, the slot 26 operates as a degeneration separation element (a perturbation element) of the conductive pattern 2. That is, because the RFID tag can approximately transmit and receive a electric wave of circular polarization having a radiation pattern close to a radiation pattern in which on the radiation pattern of the RFID tag of FIG. 1, the same radiation pattern whose phase is shifted by pi/2 is superimposed, the RFID tag can be used in the RFID system even when the RFID system uses electric waves of circular polarization to carry out radio communications with the RFID tag. Typically, the degeneration separation element is formed in such a way as to be inclined about 45 degrees with respect to the conductive pattern 2, though in order to provide a good radiation pattern under the influence of the feeding point, instead of adjusting the inclined angle of the degeneration separation element to about 45 degrees, it is necessary to perform a fine adjustment on the inclined angle of the degeneration separation element. However, in accordance with the present invention, because the feeding point (the IC chip 5) is disposed at the position where the electric field is zero, the region of the fine adjustment is relatively narrow and the adjustment can be easily carried out. In addition, a combination of some of the electric length adjustment method, the band broadening, and the transmission and reception of an electric wave of circular polarization using the degeneration separation of the RFID tag in accordance with Embodiment 3 can be carried out.

Embodiment 4

Figure 11:
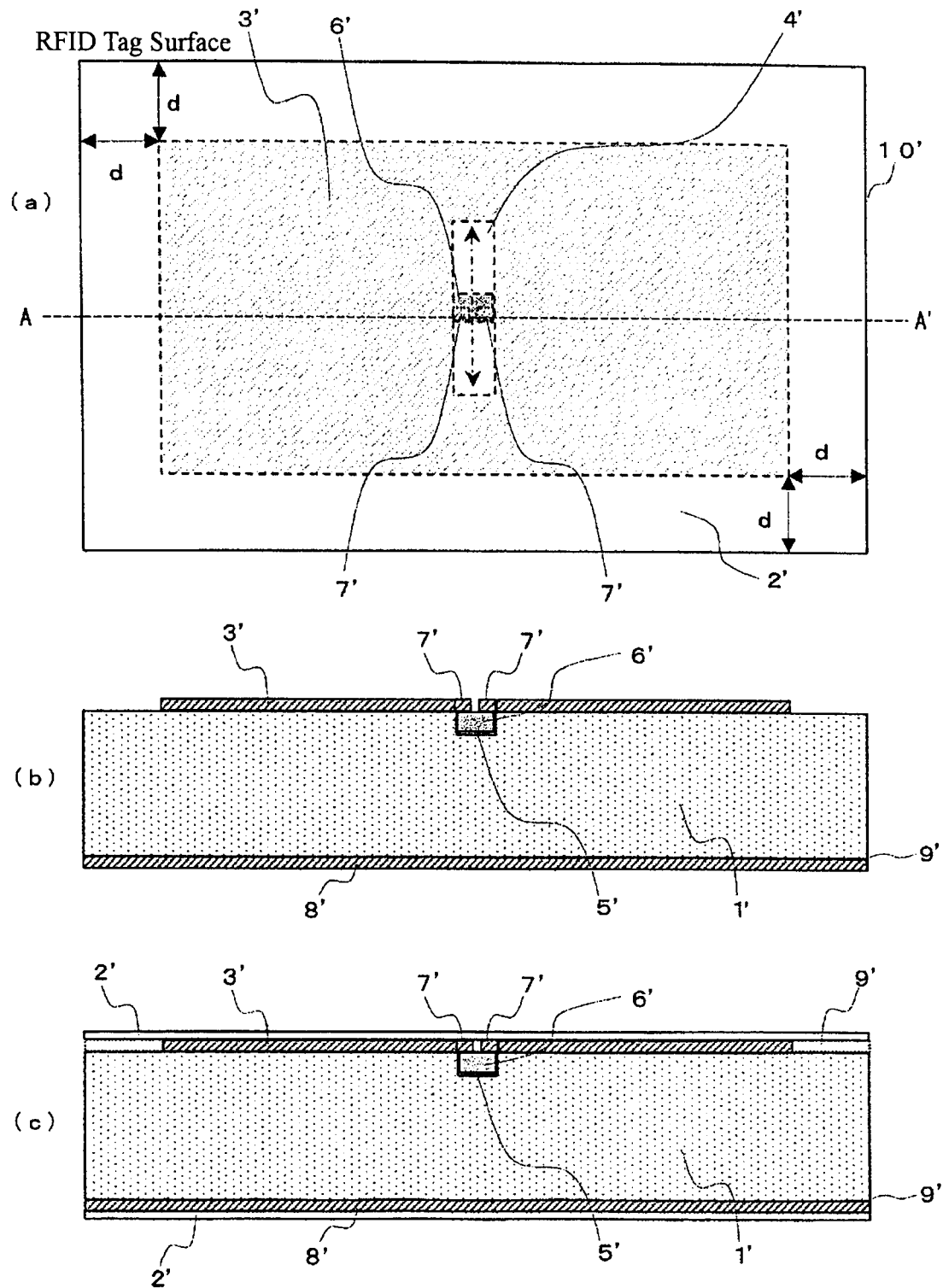
FIG. 11 is a configuration diagram of an RFID tag in accordance with Embodiment 4 of the present invention.

FIG. 11 is a configuration diagram of an RFID tag in accordance with this Embodiment 4. FIG. 11(a) is a plan view of the RFID tag, FIG. 11(b) is a cross-sectional view, taken along the A-A' line of FIG. 11(a), of the RFID tag (in a state in which no film base is disposed on each of a conductive pattern and a ground conductive pattern), and FIG. 11(c) is a cross-sectional view taken along the A-A' line of FIG. 11(a). In these FIGS. 11(a) to 11(c), a dielectric substrate 1' is constructed of, for example, an olefin thermoplastic elastomer having a low degree of hardness (e.g., JIS-A55). The melted fluid resin does not have to be a melted organic substance which is plastic or the like, and has only to be an inorganic or reactive fluid or the like using thixotropy provided by a Magnesium alloy or the like. As the melted fluid resin, a material having a low degree of hardness which enables the dielectric substrate itself to bend according to the curvature of a curved surface on which the RFID tag is to be mounted is selected. It is needless to say that the curvature of a curved surface on which the RFID tag can be mounted has a limit. That is, the limit depends on an upper limit of the curvature (a predetermined curvature) with which the used material having a low degree of hardness can be bent. A film base 2' is disposed on each of a conductive pattern 3' disposed on one main surface (a front surface) of the dielectric substrate 1', and a ground conductive pattern 8' disposed on another main surface (a rear surface) of the dielectric substrate 1' which will be mentioned below.

As this film base 2', film polyethylene terephthalate (PET), polyimide, polyethylenenaphthalate, polyvinyl chloride, or the like can be used. The conductive pattern 3' or the ground conductive pattern 8' is formed by using a vacuum evaporation technique, an electroplating method, a printing method, or the like. As an alternative, the film base 2' can be made from another material having pliability or can be a so-called substrate which is not a material having pliability. Furthermore, the film base 2' can be transparent or colored and semi-transparent. Furthermore, as shown in FIG. 11(b), instead of respectively forming the conductive pattern 3' and the ground conductive pattern 8' on the film bases 2', the conductive pattern 3' and the ground conductive pattern 8' can be formed directly on the dielectric substrate 1' by using printing or the like. FIG. 11(a) shows a case in which the film base 2' is transparent, and the dielectric substrate 1' can be seen through the film base 2'. Hereafter, an explanation will be made with reference to a drawing showing a case of using the film base 2' only for formation of the conductive pattern 3', though the present invention (Embodiments 4 and 5) can also be applied to an RFID tag in which the conductive pattern 3' not having any film base 2' and the ground conductive pattern 8' not having any film base 2' are formed, and an RFID tag in which the film base 2' is formed for formation of the ground conductive pattern 8'.

In this case, the film bases 2' and the dielectric substrate 1' have the same size when viewed from one plane. The conductive pattern 3' is disposed on one of the film base 2'. As shown in FIG. 11(a), the conductive pattern 3' is formed in an inner portion of the film base 2' in such a way as to be at a distance d from each of the vertical edges and horizontal edges of the film base 2'. In this case, it can also be said that the conductive pattern 3' is formed in such a way as to be at the distance d from each of the vertical edges and horizontal edges of the dielectric substrate 1'. As an alternative, the film base 2' can be placed on the one main surface of the dielectric substrate 1' in such a way as to be at the distance d from each of the vertical edges and horizontal edges of the dielectric substrate 1'. In this case, the conductive pattern 3' can be formed over the whole upper surface of the film base 2'. As shown in FIG. 11(a), a long narrow slot 4' is formed in a central portion of the conductive pattern 3'. This slot 4' can be formed by performing a etching process or a milling process on the conductive pattern 3'. It is needless to say that the slot 4' can be formed at the same time when the conductive pattern 3' is formed by using an etching process, a vacuum evaporation technique, an electroplating method, a printing method, or the like. The length and width of this slot 4' can be determined according to the use frequency. A hole 5' is formed in the one main surface of the dielectric substrate 1'. An IC chip 6' is comprised of a memory and so on which will be mentioned later. This IC chip 6' is electrically connected to the conductive pattern 3' via the slot 4'.

Hereafter, the connection between the IC chip 6' and the conductive pattern 3' will be explained. As shown in FIGS. 11(*a*) and 11(*b*), electrical connecting portions 7' and 7' of projecting shape are extending respectively from both sides of the slot 4' which are opposite to each other in a direction of the width of the slot, toward an inner portion of the slot 4', and are connected continuously and electrically to the conductive pattern 3' and 3' on the both sides of the slot 4' respectively. These electrical connecting portions 7' and 7' can be simply formed by using etching at the same time when the conductive pattern 3' is formed. Terminals (not shown) of the IC chip 6' are connected to those electrical connecting portions 7' and 7'. In a case in which the size of the IC chip 6' is substantially the same as or smaller than the width of the slot 4', the IC chip 6' can be accommodated within the width of the slot 4'. At this time, the terminals (not shown) of the IC chip 6' are connected to the electrical connecting portions 7' and 7'. However, in a case in which the size of the IC chip 6' is larger than the width of the slot 4', what is necessary is only to electrically connect the terminals (not shown) of the IC chip to portions of the conductive pattern 3' close to the slot 4' through the slot. Therefore, in this case, it is not necessary to dispose the electrical connecting portions 7' and 7' as described above.

Furthermore, in FIG. 11(*a*), the IC chip 6' is placed in the center of the slot 4' with respect to the direction of the length of the slot 4'. Even though the IC chip 6' is placed, instead of being placed in the center, in an edge portion of the slot 4' in the direction of the length of the slot which is away from the central portion along an arrow given to the slot 4' of FIG. 11(*a*), no problem arises because, in a case in which the RFID tag is valley or peak folded along a line running in the direction of the length of the slot 4', a tensile stress exerted upon the conductive pattern 3' (the IC chip 6') which is caused by a bend of the dielectric substrate 1' increases with distance from the line running in the direction of the length of the slot 4' toward an edge of the RFID tag, that is, the tensile stress exerted upon the IC chip 6' is small. However, in a case in which the RFID tag is valley or peak folded along either a line running in the direction of the width of the slot 4' or an arbitrary line other than any line running in the direction of the length of the slot, the tensile stress exerted upon the conductive pattern 3' (the IC chip 6') which is caused by a bend of the dielectric substrate 1' increases with distance from either the line running in the direction of the width of the slot 4' or an arbitrary line other than any line running in the direction of the length of the slot toward an edge of the RFID tag. Therefore, there is a possibility that the reliability of the connection between the IC chip 6' and the conductive pattern 3' is reduced due to the tensile stress as the position at which the IC chip 6' is mounted is distant from the central portion of the RFID tag.

Because the hole 5' of the dielectric substrate 1' is formed so that the IC chip 6' is inserted into the hole, the hole has a depth and a width corresponding to the size of the IC chip. Of course, in a case in which a mold material is arranged in an area surrounding the IC chip 6', the hole 5' has outer dimensions larger than those of the IC chip 6' inevitably. As a matter of course, the position at which the hole 5' is formed is determined according to at which position of the slot 4' the IC chip 6' is placed. Anyway, it is necessary to make the shape and size of the slot 4' match the number and the characteristic impedance of the electrical connecting portions 7' connected to the IC chip 6' mounted to the dielectric substrate. For example, in a case in which the number of legs of the connecting terminals of the IC chip 6' is two, in order to match the impedance of the IC chip 6' with that of the slot 4', what is necessary is only to form two electrical connecting portions 7' each having a width which can establish the impedance matching in addition to a fine adjustment of the shape of the slot 4'. Furthermore, a ground conductive pattern 8' is disposed on another main surface (a rear surface) of the dielectric substrate 1. An adhesive sheet 9' bonds the dielectric substrate 1' and the film base 2' on which either the conductive pattern 3' or the ground conductive pattern 8' is formed together. On the front surface (the one main surface) of the dielectric substrate 1' on which the conductive pattern 3' is to be formed, the adhesive sheet 9' is disposed in a portion corresponding to a portion excluding the IC chip 6' (the hole 5'), and the dielectric substrate 1' and the film base 2' can be bonded together and secured to each other. Another adhesion method other than the method of using the adhesive sheet 9' can be used.

Figure 12:
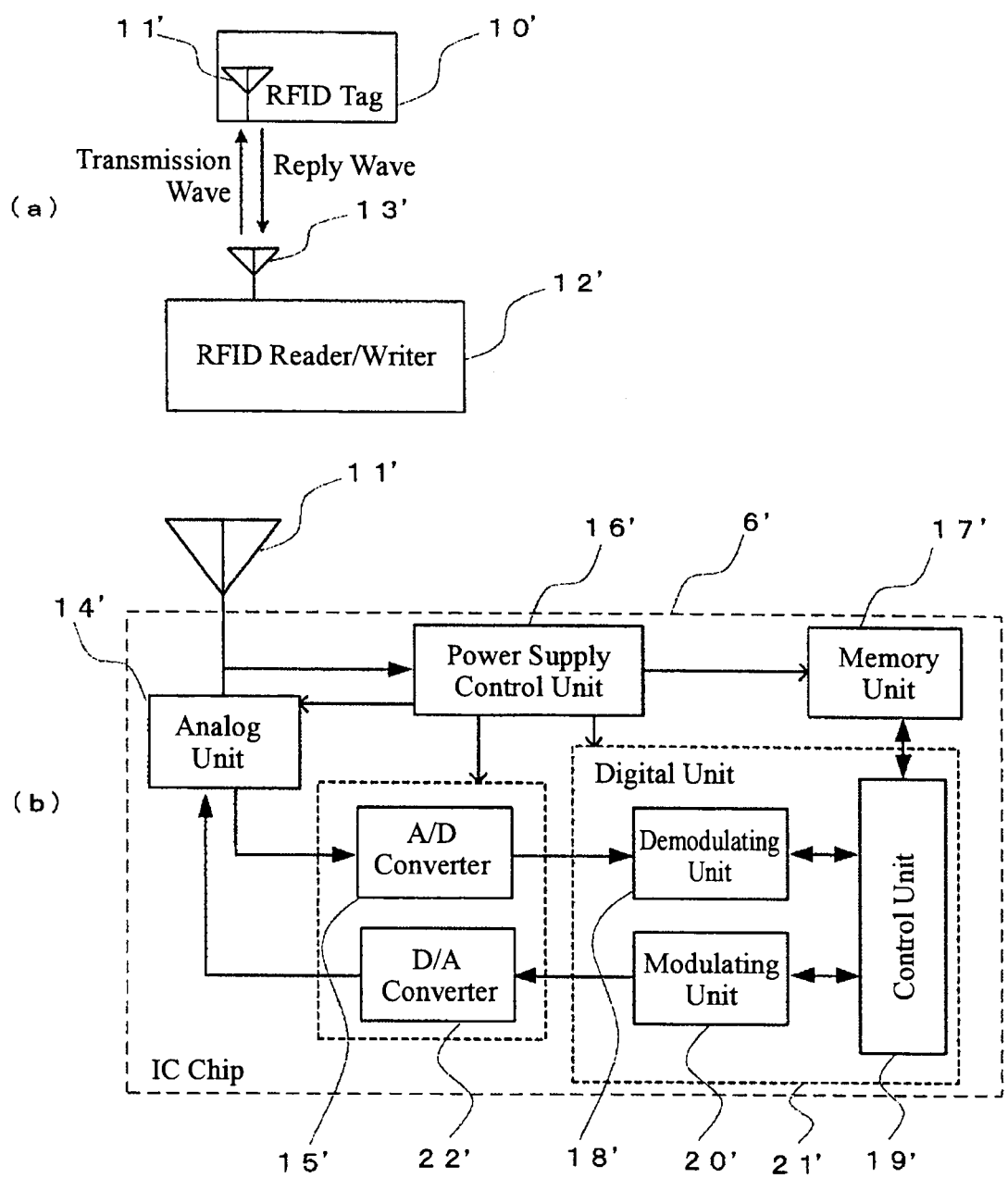
FIG. 12 is a bock diagram showing the basic structure of an RFID system.

FIG. 12(*a*) is a conceptual diagram schematically showing a state in which transmission and reception are carried out between the RFID tag and an RFID reader/writer. FIG. 12(*b*) is a diagram showing the structure of the RFID tag, and particularly shows a block diagram functionally showing the internal structure of the IC chip 6. In FIGS. 12(*a*) and 12(*b*), the RFID tag 10' has the structure shown in FIG. 11. An antenna portion 11' disposed in the RFID tag 10' corresponds to the conductive pattern 3', as shown in FIG. 11, in which the slot 4' is formed. Because, as shown in FIGS. 11(*a*) and 11(*b*) mentioned above, the conductive pattern 3' having the slot 4' formed in the one main surface (the front surface) of the dielectric substrate 1' is disposed as the antenna portion 11' of the RFID tag 10', and the ground conductive pattern 8' is disposed on the other main surface (the rear face) of the dielectric substrate 1', the RFID tag 10' functions as a patch antenna. More specifically, the conductive pattern 3' having the slot 4' functions as an antenna pattern (a radiant portion). The use frequency of the RFID system is adjusted and the impedance matching between the conductive pattern 3' and the slot 4', and the IC chip 6' is adjusted so that the conductive pattern 3' and the slot 4' are excited. Because this adjustment is also associated with the thickness and specific inductive capacity of the dielectric substrate 1' greatly, a desired radiation pattern and a desired gain can be acquired by making the adjustment and designing the RFID tag by also taking these requirements into consideration. Furthermore, the slot 4' is formed in the central portion of the conductive pattern 3' as mentioned above so that the conductive pattern 3' generates a good radiation pattern. By making the adjustment and designing the RFID tag by further taking this requirement into consideration, the RFID tag 10' can provide a desired radiation pattern and a desired gain, and can have a communication range of, e.g., about 1 to 8 m without upsizing the RFID tag 10' itself, i.e., the dielectric substrate 1'.

Furthermore, an antenna unit 13' is disposed in the RFID reader/writer 12', and performs radio communications with the antenna portion 11' of the RFID tag 10'. The IC chip 6' is as explained with reference to FIG. 11, and has a concrete structure as shown in FIG. 12(*b*). An analog unit 14' receives a transmission wave from the RFID reader/writer 12' by way of the antenna unit 11' of the RFID tag 10', and outputs the transmission wave to a next-stage digital unit 21'. An A/D converter 15' performs A/D conversion on the transmission wave. A power supply control unit 16' smooths the transmission wave received by the antenna unit 11' by using a rectification circuit to generate electric power, and performs electric supply and power control on each of the circuits of the RFID tag 10'. A memory unit 17' is mounted in the RFID tag 10', and stores tag information, such as individual identification information. A demodulating unit 18' demodulates the transmission wave, and a control unit 19' controls circuits included in the IC chip 6' including the memory unit 17' by using the transmission wave demodulated by the demodulating unit 18'. A modulating unit 20' modulates information which is retrieved from the memory unit 17' by the control unit 19'. The digital unit 21' is comprised of the demodulating unit 18', the control unit 19', and the modulating unit 20'. A D/A converter 22' performs D/A conversion on the signal transmitted from the modulating unit 20', and outputs the D/A-converted signal to the analog unit 14'.

Hereafter, the basic operation of the RFID system constructed as above will be explained. According to the use of this RFID system (entrance/exit control or physical distribution management of living bodies or products), tag information about a living body or product is stored in the memory unit 17' of the RFID tag 10', and the RFID reader/writer 12' can update the tag information or write information in the RFID tag, or can read the tag information from the RFID tag when the RFID tag 10' is existing in or moving through its transmission and reception area (with the RFID tag being attached to the living body or product which is a target for entrance/exit control or physical distribution management). The RFID reader/writer 12' transmits, as a transmission wave, a command signal for instructing the RFID tag 10' to perform an update or writing, or reading or the like to the antenna portion 11' of the RFID tag 10' from the antenna unit 13' of the RFID reader/writer 12'. The antenna unit 11' of the RFID tag 10' receives the transmission wave, and the power supply control unit 16' performs detection and accumulation of electricity (smoothing) on the transmission wave to generate operation power for the RFID tag 10' and furnish the operation power to each of the circuits of the RFID tag 10'. The demodulating unit 18' demodulates the transmission wave to acquire the command signal. The control unit 19' carries out data processing according to the description of the command shown by the command signal which the demodulating unit has acquired to demodulate the transmission wave, and provides either an instruction for updating or writing tag information or an instruction for reading the tag information, or both of them to the memory unit 17'. A reply wave which the modulating unit 20' acquires by modulating a read signal which the memory unit 17' outputs according to this instruction from the control unit 19' passes through the analog unit 14', and is transmitted to the antenna unit 13' of the RFID reader/writer 12' from the antenna portion 11', and the RFID reader/writer 12' receives the read signal to acquire desired information.

Furthermore, the operation of the RFID system using the RFID tag in accordance with Embodiment 4 will be explained hereafter in detail. The RFID reader/writer 12' transmits, as a transmission wave, a command signal for instructing the RFID tag 10' to perform an update or writing, or reading or the like to the antenna portion 11' of the RFID tag 10' from the antenna unit 13' of the RFID reader/writer 12'. When the conductive pattern 3' which is the radiant portion for radiating an electric wave of the dielectric substrate 1' which constructs the RFID tag 10' receives the transmission wave, a potential difference occurs between the opposing sides of the slot 4' and the transmission wave is furnished to the IC chip 6'. As mentioned above, the power supply control unit 16' performs detection and accumulation of electricity (smoothing) on the transmission wave furnished to the IC chip 6' to generate operation power for the RFID tag 10'. When the operation power is furnished to each of the circuits (the IC chip 6') of the RFID tag 10', the transmission wave is demodulated to produce the command signal, and the control unit provides either an instruction for updating or writing tag information or an instruction for reading the tag information, or both of them to the memory unit 17' according to the description of the command shown by the command signal which has been acquired by demodulating the transmission wave. A read signal outputted from the memory unit 17' passes along the same route as that along which the transmission wave has been furnished to the IC chip 6', as a reply wave, and this reply wave is transmitted from the conductive pattern 3' which is the radiant portion to the RFID reader/writer 12'. The antenna unit 13' of the RFID reader/writer 12' receives the reply wave to acquire desired information. The descriptions of data which are radio-communicated by the RFID system can be the same as those of data radio-communicated by a conventional RFID system, or can be newly defined. Furthermore, because the ground conductive pattern 8' is formed on the rear surface of the dielectric substrate 1', the RFID tag can be mounted onto an object onto which the RFID tag is to be mounted regardless of whether the object is a conductor or a non-conductor by orienting the rear surface of the dielectric substrate 1' toward the object onto which the RFID tag is to be mounted. Furthermore, the RFID tag having such a simple structure can be manufactured at a low cost. Therefore, the RFID tag can be used in broad fields, such as physical distribution management, warehouse control, equipment management, entrance and exit management of cars, etc., which require a lot of RFID tags, and the RFID tag can be mounted onto an object onto which the RFID tag is to be mounted regardless of whether the object or the object's mounting surface is a conductor or a non-conductor.

Figure 13:
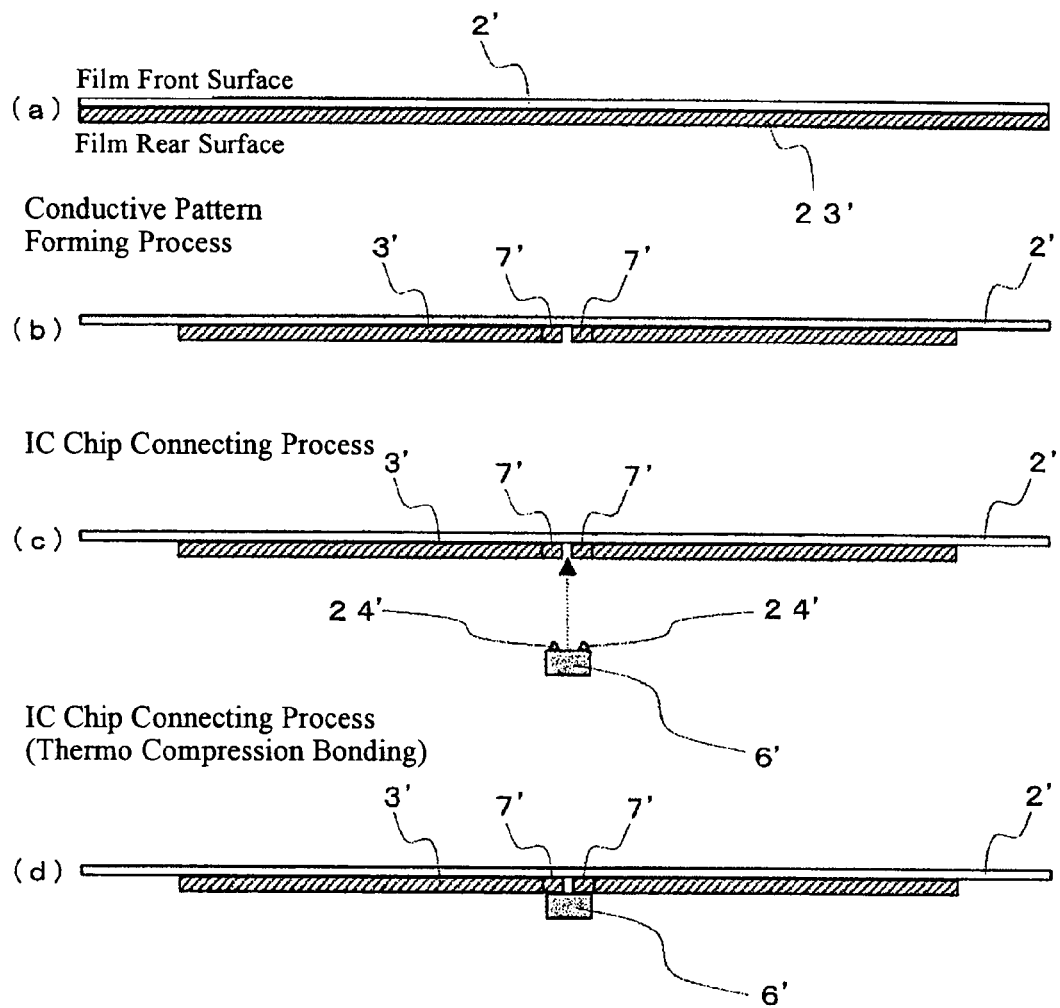
FIG. 13 is a view showing processes of manufacturing an RFID tag by using a method of manufacturing an RFID tag in accordance with the present invention.

Referring next to cross-sectional views of FIGS. 13(*a*) to 13(*d*), each of manufacturing processes of a method of forming the conductive pattern 3' and then mounting the IC chip 6', which is included in a method of manufacturing an RFID tag in accordance with this Embodiment will be explained. In FIG. 13(*a*), a conductive layer forming process of forming a conductive layer 23' on the film base 2' (on a rear surface of the film base 2') is shown. Then, in a conductive pattern forming process as shown in FIG. 13(*b*), a region in which the conductive pattern 3' is to be formed and a region in which the electrical connecting portions 7' and 7' are to be formed inside the slot 4' are masked, the conductive pattern 3' and the electrical connecting portion 7' and 7 are simultaneously formed by using etching or the like. Instead of performing the conductive layer forming process on the film base 2', the conductive pattern can be formed on the film base. As shown in FIGS. 13(*c*) and 13(*d*), in an IC chip connecting process, connecting terminals 24' and 24' of the IC chip 6' are electrically connected to the electrical connecting portions 7' and 7' with soldering respectively. Thermo compression bonding with reflow is typically used as this electrically connecting method, though the connecting terminals of the IC chip can be electrically connected to the electrical connecting portions by using another method. In the figures, the same reference numerals denote the same components or like components, and therefore the detailed explanation about them will be omitted hereafter.

Figure 14:
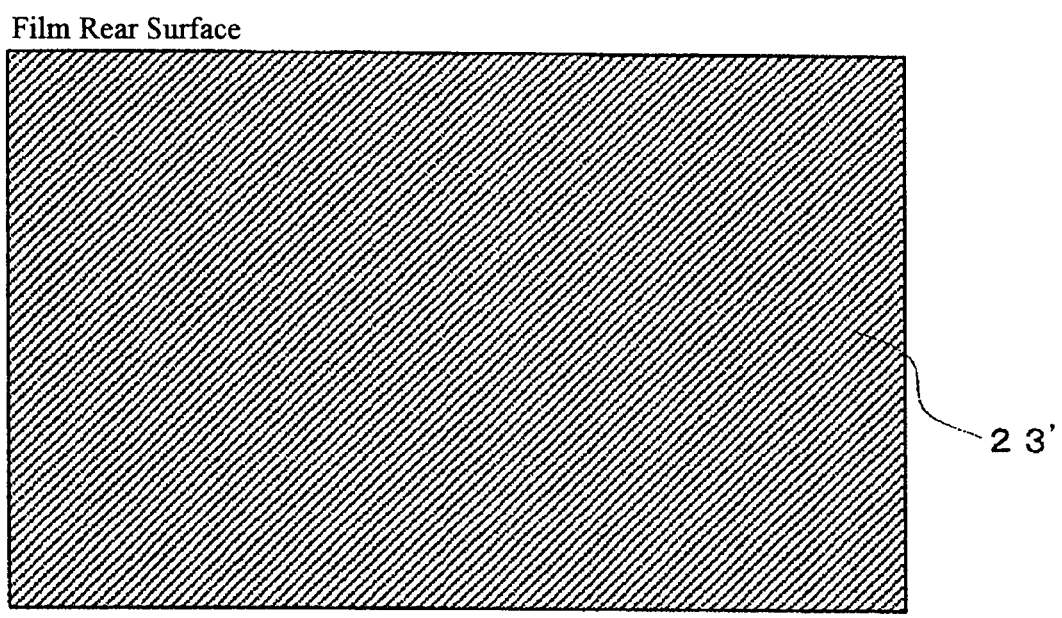
FIG. 14 is a configuration diagram of a film base in accordance with the present invention.
Figure 15:
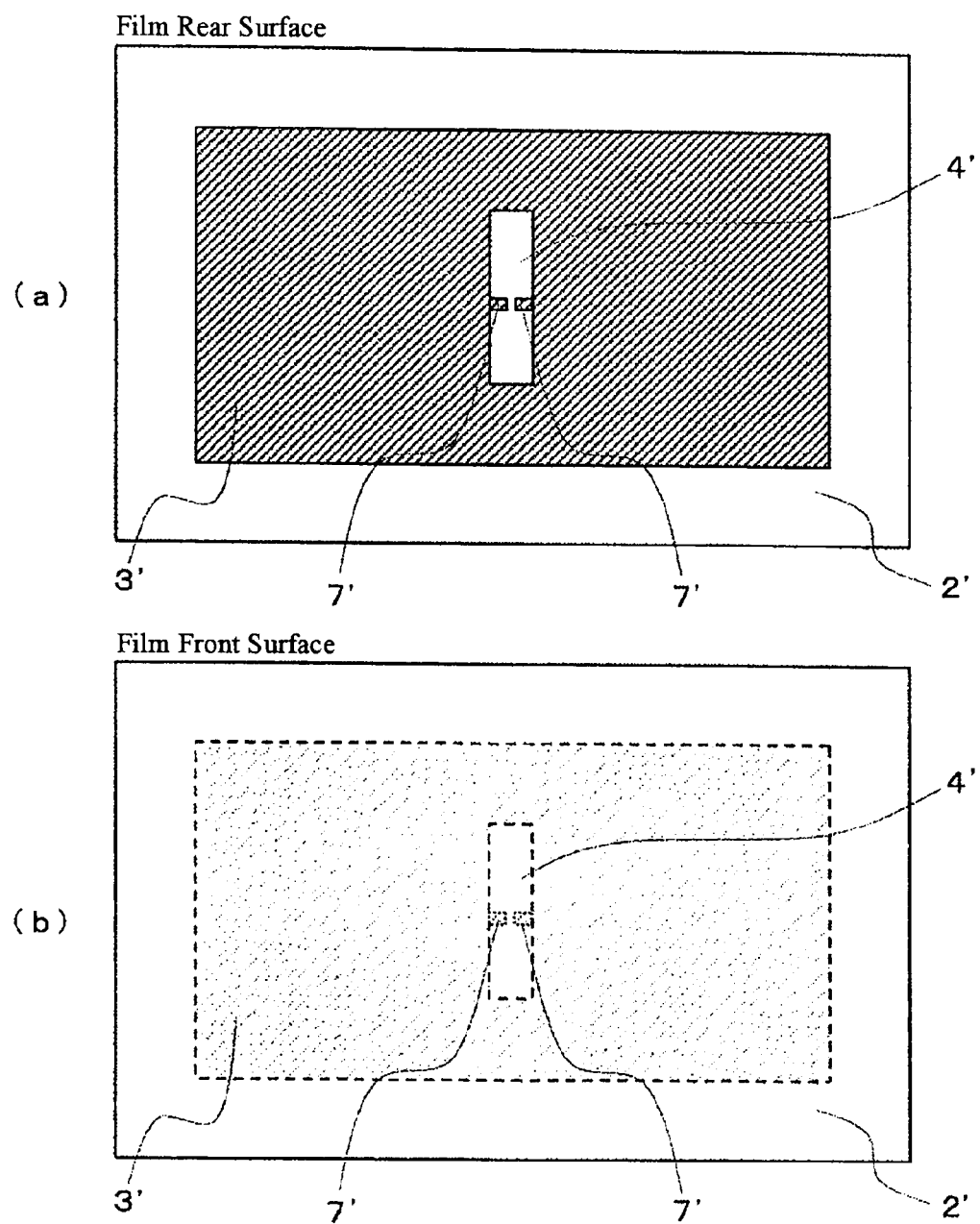
FIG. 15 is a view showing a conductive pattern formed on the film base in accordance with the present invention.
Figure 16:
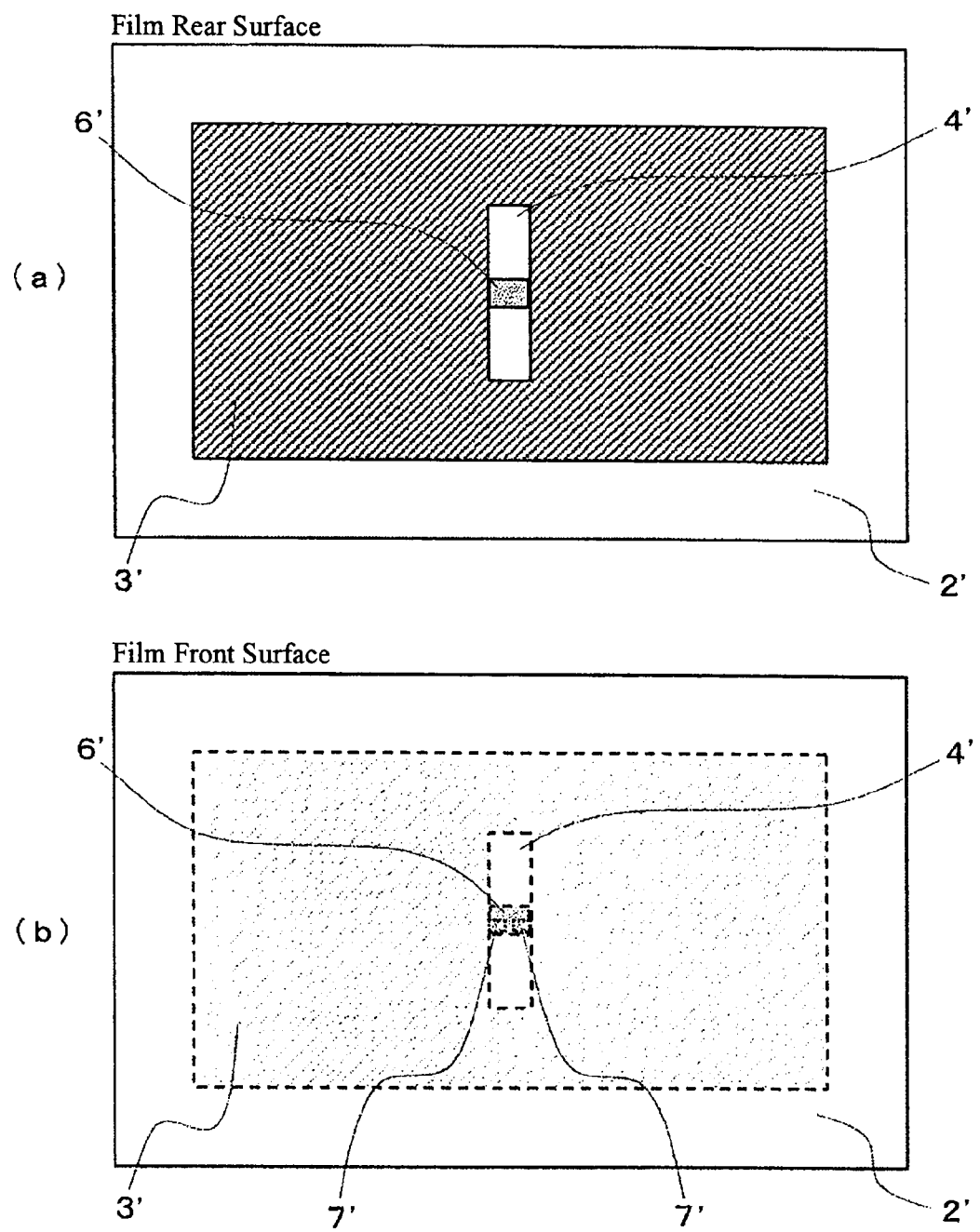
FIG. 16 is a view showing a conductive pattern formed on the film base in accordance with the present invention (connected to an IC chip)
Figure 17:
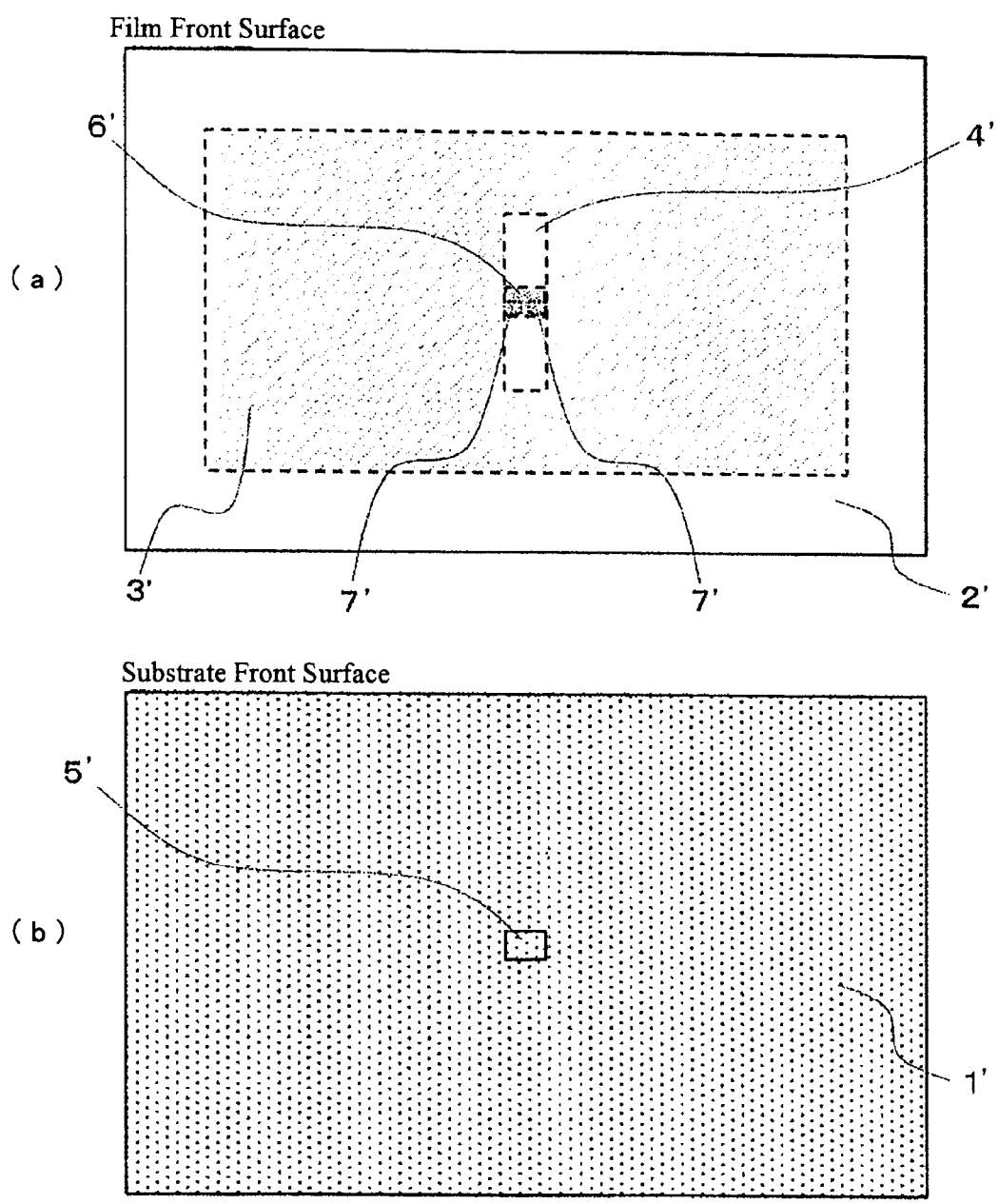
FIG. 17 is the configuration diagram of a dielectric substrate in accordance with the present invention in which a hole is formed.

FIG. 14 is a plan view showing a state in which the conductive layer is formed all over the film base. FIG. 15(*a*) is a view showing the rear surface of the film base 2' after the conductive pattern 3' and slot 4' are formed on the rear surface. In this figure, a state in which a portion of the conductive layer corresponding to a peripheral portion having a width equal to a predetermined distance d from the edges of the film base 2' (the dielectric substrate 1'), and a portion of the conductive layer corresponding to the slot 4' except the electrical connecting portions 7' and 7' are removed through, for example, an etching process in the state, as shown in FIG. 14, in which the conductive layer 23' is formed all over the rear surface of the film base 2' is shown. The structure of the film base 2' when viewed from the front surface of the film base 2 at this time is shown in FIG. 15(*b*). In this case, the film base 2' is transparent or semi-transparent. FIG. 16(*a*) is a view showing the rear surface of the film base 2' in a state in which the IC chip 6' is mounted within the slot 4' formed on the film base 2'. FIG. 16(*b*) is a view showing a state in which the IC chip is attached to the film base 2' when viewed from the front surface of the film base 2'. In this figure, the electrical connecting portions 7' and 7' and the IC chip 6' can be seen through the transparent or semi-transparent film base 2'. The film base 2' which is manufactured in this way is bonded to the dielectric substrate 1' (at the time of injection molding, a projecting portion corresponding to the hole 5' can be disposed in an injection molding mold so as to form the hole 5') in which the hole 5' is formed by using etching, milling, or the like, as shown in FIG. 17, so that the RFID tag is manufactured. FIG. 17 is a surface view (a top plan view) of the dielectric substrate having the hole. This figure shows the dielectric substrate 1' in which the hole 5' for inserting the IC chip 6' is formed in the one main surface of the dielectric substrate 1'. In the figures, the same reference numerals denote the same components or like components, and therefore the detailed explanation about them will be omitted hereafter.

Instead of using the film base 2', in order to form the conductive pattern 3' on the dielectric substrate 1', after the IC chip 6' is placed in the hole 5' of the dielectric substrate 1', the conductive pattern 3' can be disposed in the one main surface of the dielectric substrate 1' with printing, vapor deposition, or the like. Furthermore, after the IC chip 6' is mounted in a conductive thin film such as a copper foil, the conductive thin film can be fixed to the one main surface of the dielectric substrate 1', and the conductive pattern 3' can be formed by etching the conductive thin film. In this case, it is needless to say that the IC chip 6' has to be mounted at a position where a part of the conductive thin film is finally formed into the slot 4' (the electrical connecting portions 7') by using etching or the like. By providing a process of removing the film base 2' from the RFID tag after the RFID tag is completed, the RFID tag having no film base 2' can be manufactured without having to use the above-mentioned method.

Figure 18:
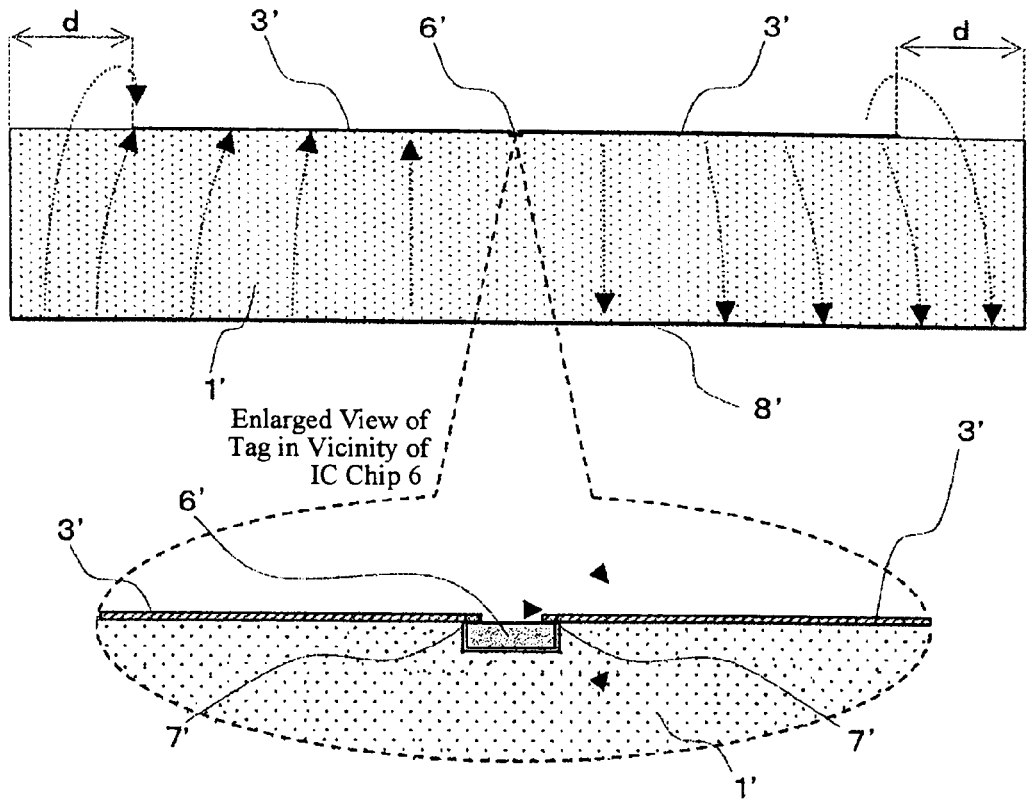
FIG. 18 is a view showing an electric field occurring in an RFID tag in accordance with the present invention.

FIG. 18 is a graphical representation of electric field intensity showing an electric field occurring in the RFID tag in accordance with this Embodiment (shown by arrows). In FIG. 18, a partly enlarged view of the RFID tag in a vicinity of the IC chip 6' is also shown, and the appearance of the electric field is shown by arrows in the partly enlarged view. In the figure, the same reference numerals denote the same components or like components, and therefore the detailed explanation about them will be omitted hereafter. The arrows shown in FIG. 18 show the electric field occurring between the ground conductive pattern 8' and the conductive pattern 3', and the electric field runs between the opposing sides of the slot 4' and a potential difference occurs between them because the electric field is formed between the conductors. The position where the intensity of the electric field in the direction of the thickness of the dielectric substrate 1' is zero is made to serve as the feeding point of the IC chip. As shown in FIG. 18, because the electric fields on the both sides of the dielectric substrate 1' cancel each other out inside the dielectric substrate 1', the intensity of the electric field become zero at a position along the axis of the slot 4' extending in the direction of the length of the slot (in the depth direction in FIG. 18). When the electrical connecting portions 7' connected to the IC chip 6' are placed at this position, the electric supply loss can be reduced greatly. Thus, in the case in which the RFID tag is constructed in this way, the present embodiment offers an advantage of providing an RFID tag that can greatly widen the region in which the RFID tag can communicate with an RFID tag reader/writer while reducing the influence on the symmetry of the radiation pattern of the conductive pattern 3', and that can improve its performance greatly even if it has a simple structure.

Figure 19:
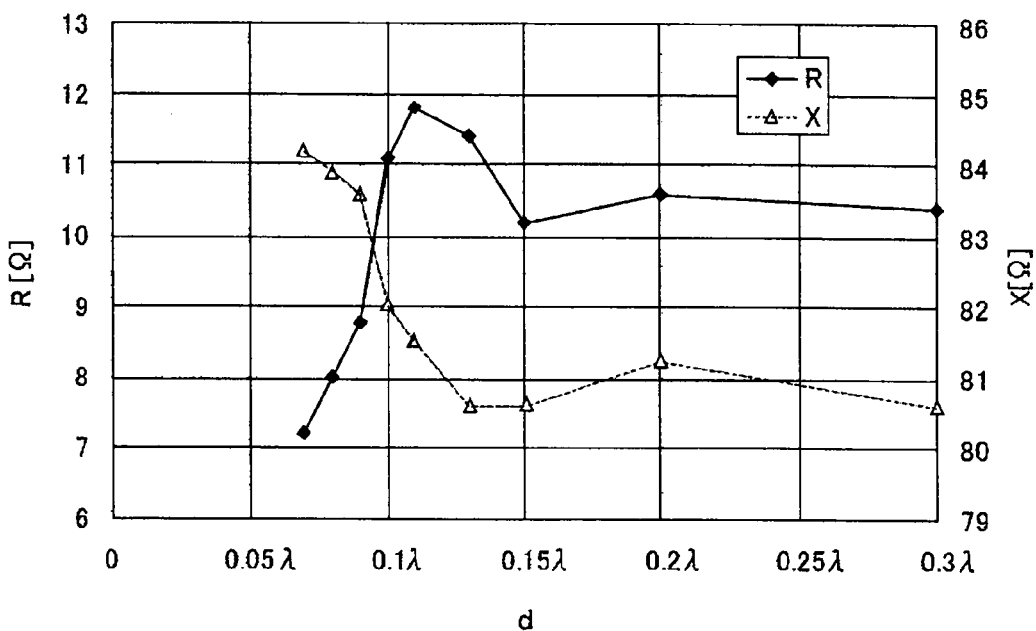
FIG. 19 is a view showing the characteristic impedance of the RFID tag in accordance with the present invention.

FIG. 19 is a characteristic diagram showing changes of the characteristic impedance in the RFID tag in accordance with this Embodiment. In the figures, the same reference numerals denote the same components or like components, and therefore the detailed explanation about them will be omitted hereafter. As mentioned above, the conductive pattern 3' is formed in such a way as to be at the predetermined distance d from each of the edges of the film base 2'. It can be said from this description that because the ground conductive pattern 8' is formed over the whole of the other main surface of the dielectric substrate 1', the predetermined distance d is the difference in dimension between the conductive pattern 3' and the ground conductive pattern 8' at each of their four corners, as shown in FIG. 18. When the predetermined distance d is defined in this way, even in a case in which the ground conductive pattern 8' is not formed over the whole of the other main surface of the dielectric substrate 1', it can be similarly considered that the predetermined distance d is the difference in dimension between the conductive pattern 3' and the ground conductive pattern 8' at each of their four corners. Therefore, in FIG. 19, the horizontal axis shows the predetermined distance or the above-mentioned difference d in dimension using a ratio of the wavelength at the use frequency of the RIFD tag, and the vertical axes R [Ω] and X [Ω] show the real part and the imaginary part of the characteristic impedance respectively, where λ in the horizontal axis is the wavelength at the use frequency. As can be seen from the characteristic diagram of FIG. 19, when the predetermined distance d is equal to or larger than 0.13λ, the characteristic impedance of the RFID tag 10' is nearly constant. Therefore, by setting the predetermined distance d to be equal to or larger than 0.13λ, because the characteristic impedance of the RFID tag can be made to be nearly constant regardless of whether an object onto which the RFID tag is to be mounted is a conductor or a non-conductor and even if the RFID tag is staying in a state in which it is floated in the air, the RFID tag can carry out radio communications with the RFID reader/writer 12' without reducing the performance of the RFID tag. In addition, because the intensity of the electric field is zero at the position of the hole 5' of the dielectric substrate 1', it can be said that the RFID tag has the nearly same characteristic impedance change as an RFID tag without the hole 5'.

Figure 20:
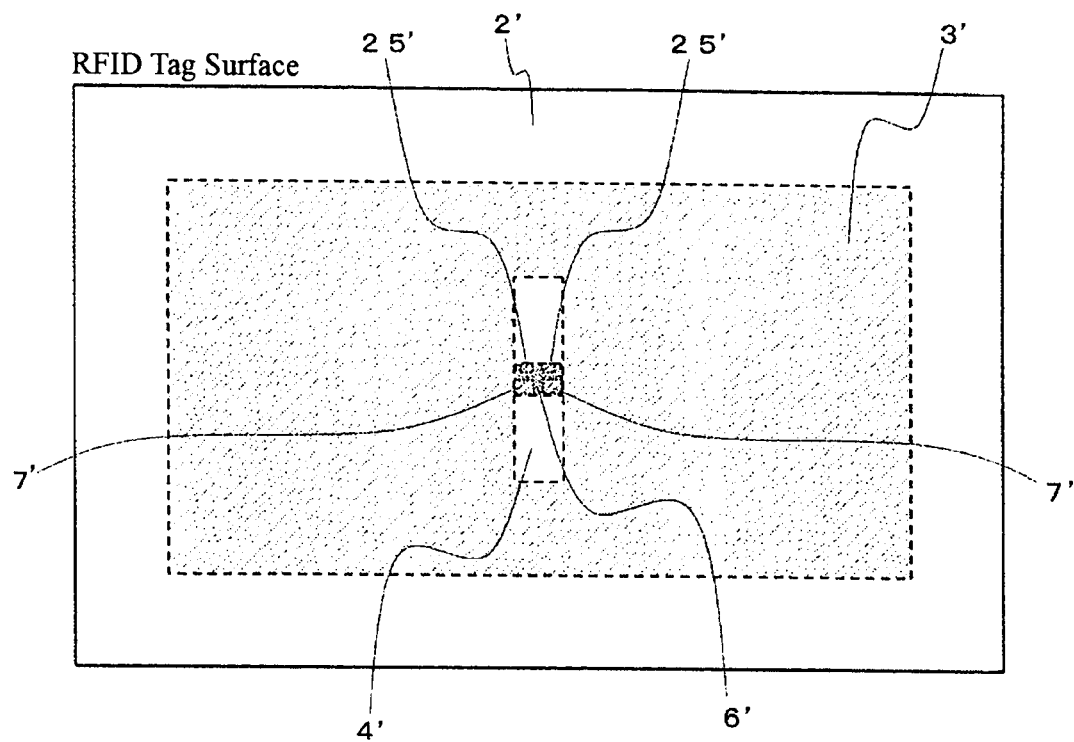
FIG. 20 is a configuration diagram of an RFID tag (with dummy pads) which is manufactured by using a method of manufacturing an RFID tag in accordance with Embodiment 4 of the present invention.
Figure 21:
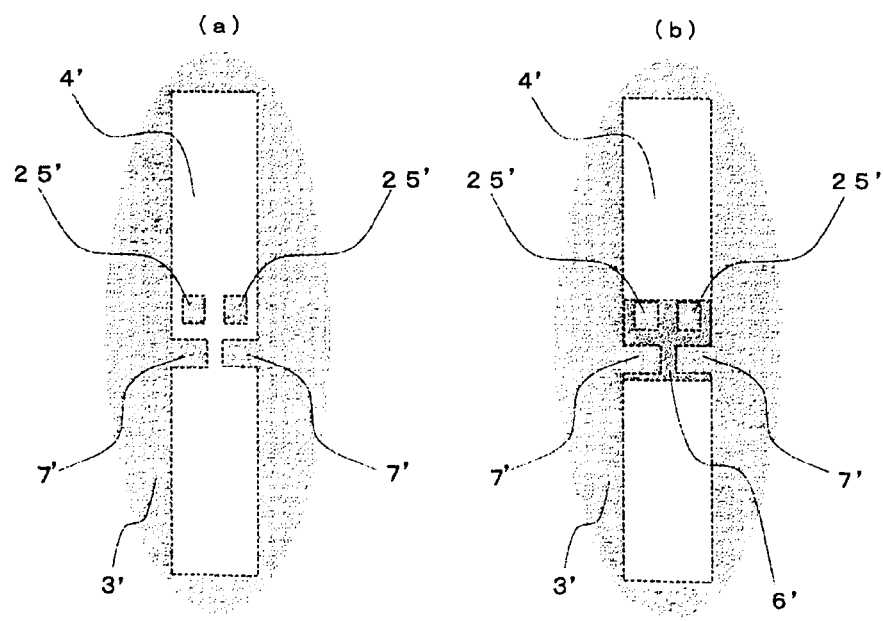
FIG. 21 is an enlarged view of an area surrounding a slot of the RFID tag (with the dummy pads) in accordance with Embodiment 4 of the present invention.

FIG. 20 is a plan view showing the structure of the RFID tag in accordance with Embodiment 4, and FIG. 21 is a plan view showing an enlarged part in a vicinity of a slot of the RFID tag shown in FIG. 20. FIG. 21(*a*) is a plan view in a case in which the IC chip has not been mounted, and FIG. 21(*b*) is a plan view in a case in which the IC chip has been mounted. Previously, the case in which the number of connecting terminals 24' of the IC chip is two, i.e., the IC chip having two legs is used is explained. In contrast, in a case in which an IC chip having four connecting terminals 24' is mounted, two dummy pads 25' and 25' are disposed inside the slot 4' in a vicinity of the connecting terminals in addition to the electrical connecting portions 7' and 7'. In a formation method of forming these dummy pads 25' and 25', they are formed at the same time when the electrical connecting portions 7' and 7' are formed. The dummy pads 25' and 25', which can be seen through the film base 2' in FIGS. 20 and 21, serve as simply dummies which are not electrically connected to the conductive pattern 3' and the electrical connecting portions 7' and 7'. Because the RFID tag can be thus constructed in such a way as to flexibly respond to a change in the specifications of the IC chip 6' to be mounted in the RFID tag, the RFID tag having a simple structure can be manufactured at a low cost. The number of the dummy pads 25' is not limited to two. In the figures, the same reference numerals denote the same components or like components, and therefore the detailed explanation about them will be omitted hereafter.

Figure 22:
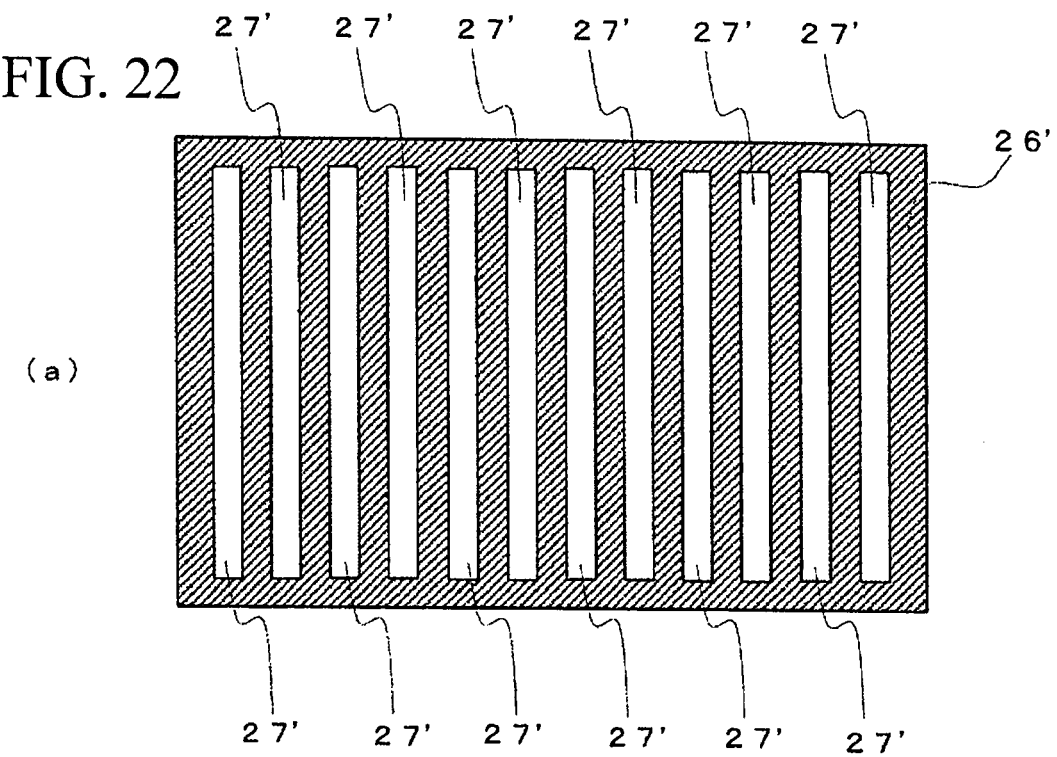
FIG. 22 is a view showing shape of a ground conductive pattern of the RFID tag in accordance with Embodiment 4 of the present invention.
Figure 22:
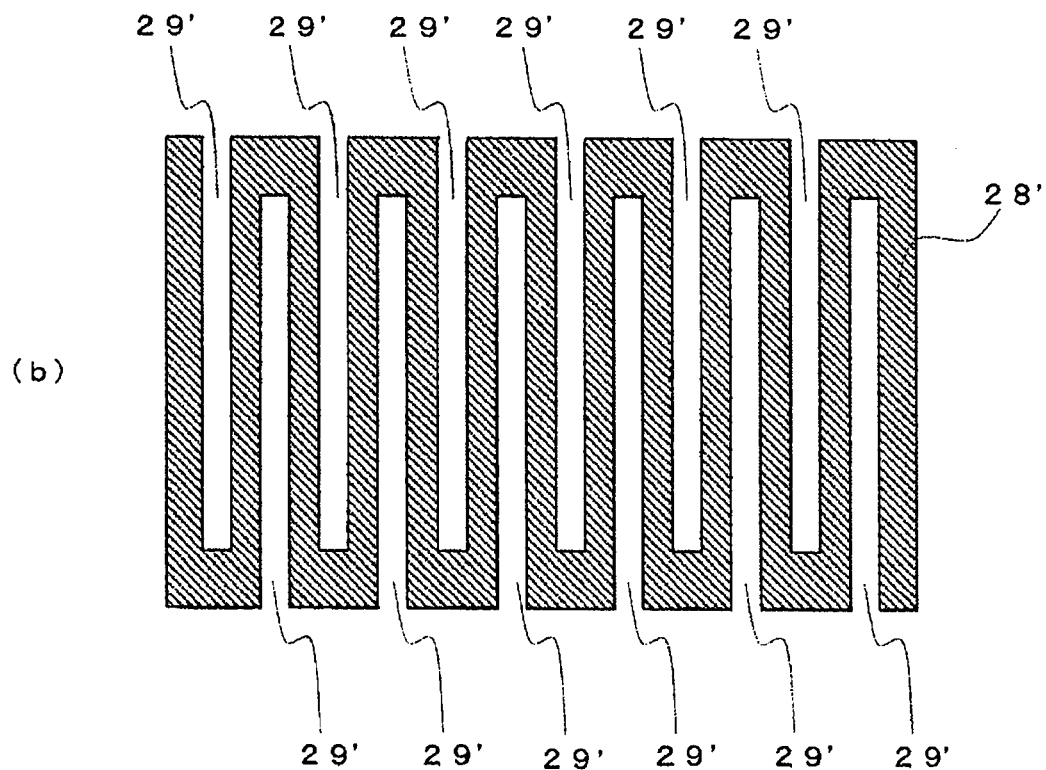
Figure 23:
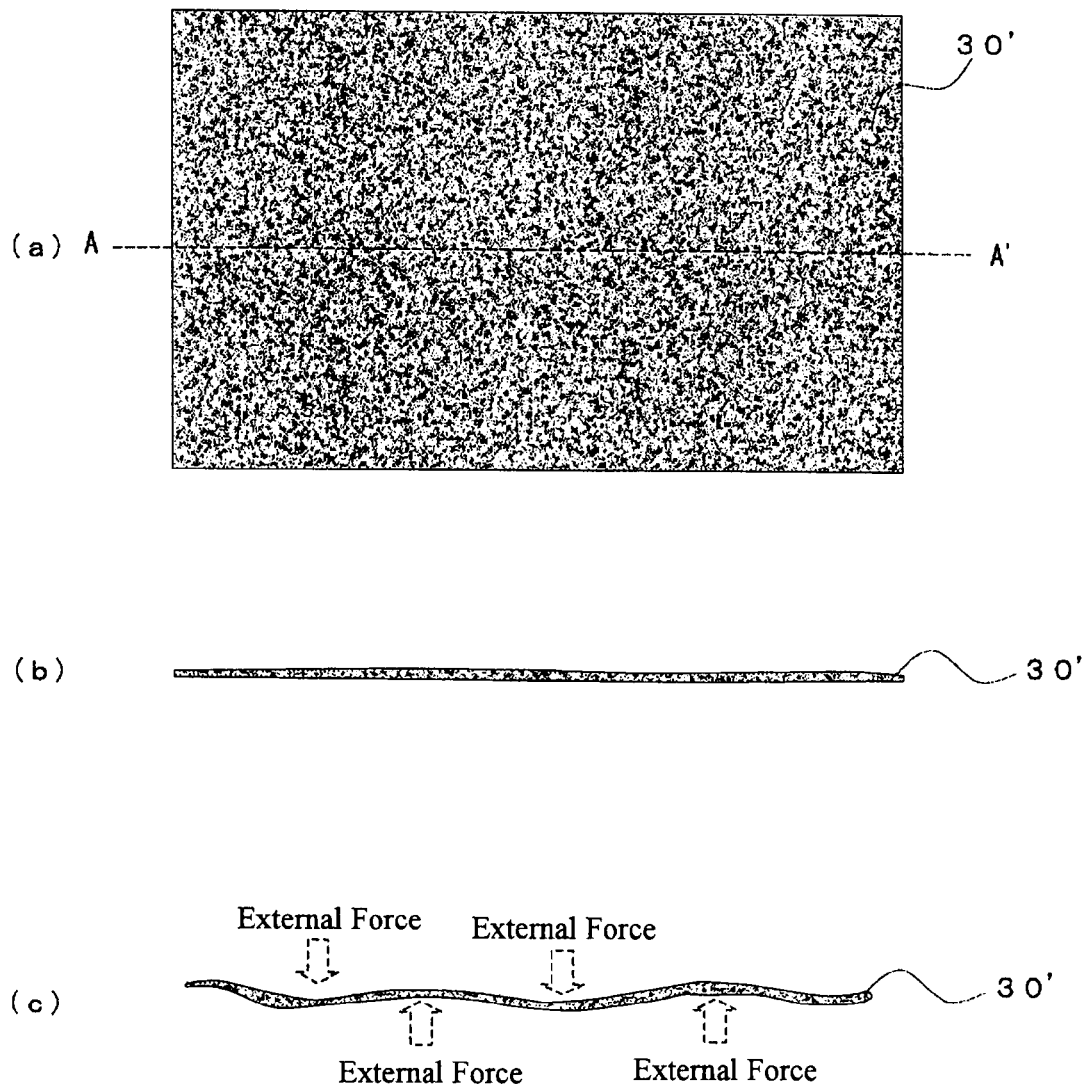
FIG. 23 is a view showing the shape of a metal fiber sheet for the ground conductive pattern of the RFID tag in accordance with Embodiment 4 of the present invention.
Figure 24:
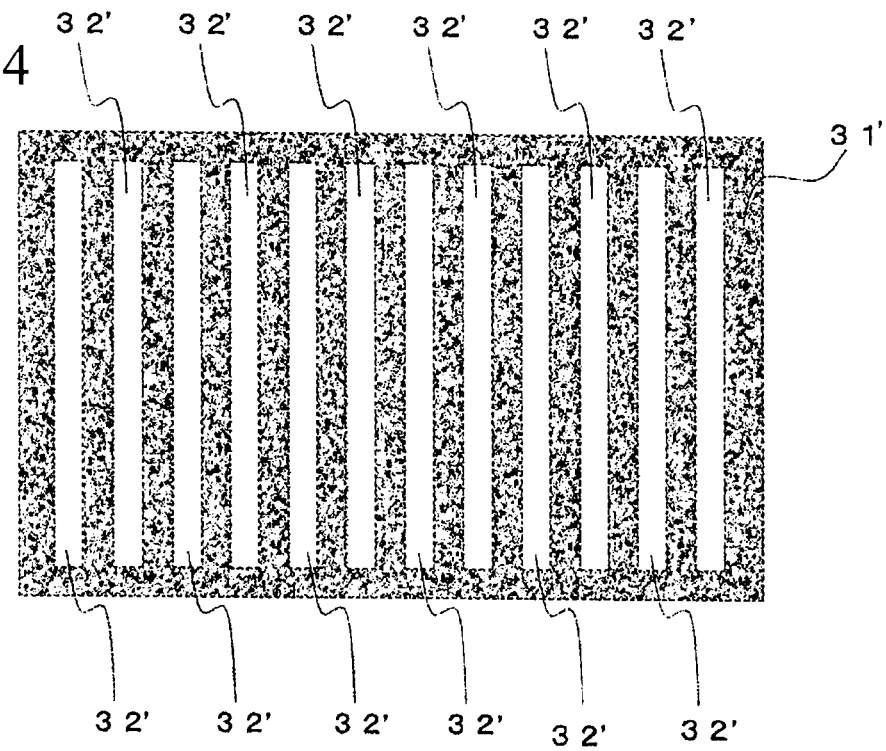
FIG. 24 is a view showing the shape of a metal fiber sheet for the ground conductive pattern of the RFID tag in accordance with Embodiment 4 of the present invention.
Figure 24:
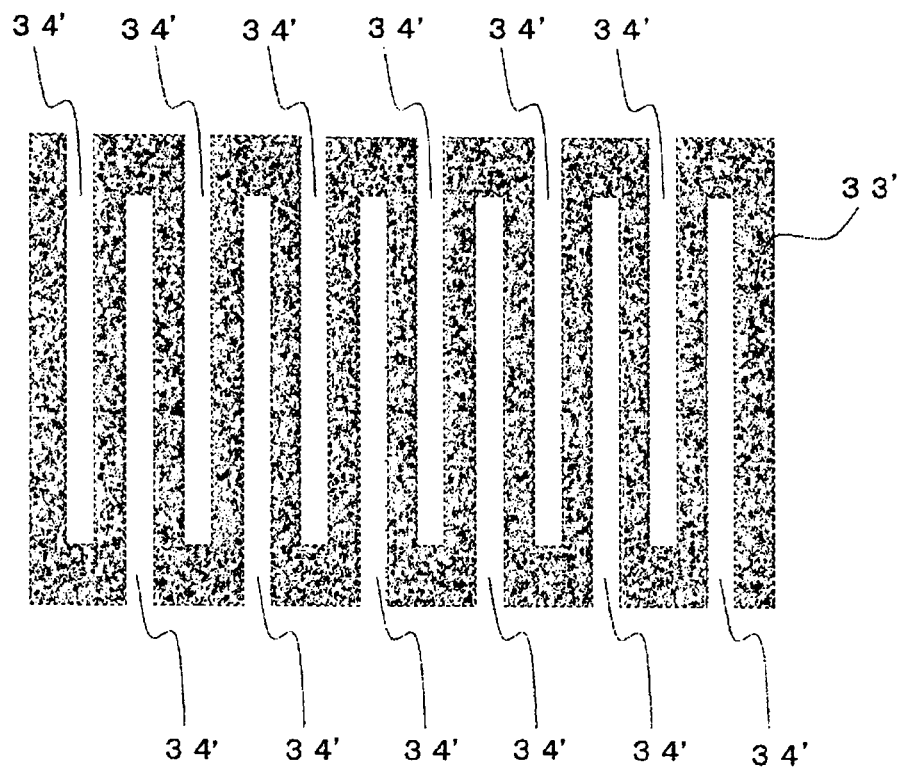

As previously mentioned, although the RFID tag in accordance with Embodiment 4 provides an advantage of preventing a bulge from occurring due to the mounting of the IC chip 6' and enabling mounting thereof not only on a plane but on a curved surface having a predetermined curvature, a structure for further improving the performance of the RFID tag will be explained with reference to FIGS. 22 to 24. FIG. 22 is a view showing the shape of the ground conductive pattern of the RFID tag in accordance with Embodiment 4, FIG. 22(*a*) is a view showing the shape of the ground conductive pattern in the shape of a grid, and FIG. 22(*b*) is a view showing the shape of the ground conductive pattern in the shape of a meander. FIG. 23 is a view showing the shape of a metal fiber sheet for the ground conductive pattern of the RFID tag in accordance with Embodiment 4, FIG. 23(*a*) is a view showing the front surface of the metal fiber sheet, FIG. 23(*b*) is a cross-sectional view of the metal fiber sheet taken along the A-A' line of FIG. 23(*a*), and FIG. 23(*c*) is a schematic diagram of the metal fiber sheet of FIG. 23(*b*) to which an external force is applied. FIG. 24 is a view showing the shape of a metal fiber sheet for the ground conductive pattern of the RFID tag in accordance with Embodiment 4, FIG. 24(*a*) is a view showing the shape of the ground conductive pattern in the shape of a grid, and FIG. 24(*a*) is a view showing the shape of the ground conductive pattern in the shape of a meander. The ground conductive pattern 26' has a grid-shaped pattern in which the conductor is cut into a grid shape. In each of cutout portions 27' of the ground conductive pattern 26', a corresponding part of the ground conductor is cut out from the ground conductor. The ground conductive pattern 28' has a meander pattern in which the conductor is cut into a meander shape with cutout portions 29'. The metal fiber sheet 30' is a sheet, such as a stainless steel fibrous sheet typically having a thickness of several micrometers, used for electromagnetic shielding and electrostatic prevention. The ground conductive pattern 31' has a grid-shaped pattern in which the metal fiber sheet 30' is cut into a grid shape. In each of cutout portions 32' of the ground conductive pattern 31', a corresponding part of the ground conductor is cut out from the ground conductor. The ground conductive pattern 33' has a meander pattern in which the metal fiber sheet 30' is cut into a meander shape. In each of cutout portions 34' of the ground conductive pattern 33', a corresponding part of the ground conductor is cut out from the ground conductor. In the figures, the same reference numerals denote the same components or like components, and therefore the detailed explanation about them will be omitted hereafter.

Previously, the reliability of the electric connection between the conductive pattern 3' (the electrical connecting portions 7'), which is the antenna pattern at the time when the RFID tag 10' is bent, and the IC chip 6' is explained. Not only a bend of the RFID tag 10' has an influence upon the electric connection between conductive pattern 3' (the electrical connecting portions 7' and 7') and the IC chip 6' is affected, but also a tensile stress occurring through a bend of the dielectric substrate 1' (the RFID tag) has a bad influence upon the bonding between the conductive pattern 3' and the dielectric substrate 1' and the bonding between the ground conductive pattern 8' and the dielectric substrate 1'. Particularly, a bend of the dielectric substrate has a bad influence on the ground conductive pattern 8' which is disposed over the whole other main surface (the rear surface) of the dielectric substrate 1' in many cases. For example, when the RFID tag is bent as if the side of the ground conductive pattern 8' (the side of the other main surface of the dielectric substrate 1') shows a valley, a large tensile stress acting in an outward direction from the edges of the dielectric substrate 1' to the outside of the dielectric substrate 1' is applied to the ground conductive pattern 8', the ground conductive pattern 8' at an edge of the dielectric substrate 1' maybe broken or the ground conductive pattern 8' may flake off from the dielectric substrate 1'.

In contrast, when the RFID tag is bent as if the side of the ground conductive pattern 8' (the side of the other main surface of the dielectric substrate 1') shows a mountain, a large tensile stress acting in an inward direction from the edges of the dielectric substrate 1' to the center of the dielectric substrate 1' is applied to the ground conductive pattern 8' and the ground conductive pattern 8' in the center of the dielectric substrate 1' slackens. Therefore, there is a possibility that the ground conductive pattern flakes off from the dielectric substrate 1'. Furthermore, according to a situation in which the ground conductive pattern 8' is bonded to the substrate, the ground conductive pattern 8' at an edge of the dielectric substrate 1' may be broken or the ground conductive pattern 8' may flake off from the dielectric substrate 1', as in the case in which the RFID tag is bent as if the side of the ground conductive pattern 8' shows a valley. Hereafter, an advantage of being able to reduce the occurrence of problems arising in the ground conductor of the RFID tag in the case of bending the RFID tag by using, instead of the above-mentioned ground conductive pattern 8', either of the ground conductive patterns 26' and 28', the metal fiber sheet 30', the ground conductive patterns 31' and 33' using the metal fiber sheet 30' as the ground conductor of the RFID tag will be explained.

The ground conductive pattern 26' in which the grid-shaped pattern as shown in FIG. 22(*a*) is formed, and the ground conductive pattern 28' in which the meander-shaped pattern as shown in FIG. 22(*b*) is formed have cutout portions 27' and 29' in each of which a part of the ground conductive patterns 8' is cut out respectively. In the case of having either of these cutout portions 27' and 29', the tensile stress applied all over the ground conductor is relieved by either of the cutout portions 27' and 29', and the possibility that the ground conductor is broken or flakes off from the dielectric substrate 1' due to slack of the ground conductor is reduced greatly. Furthermore, the shape of the cutout portions is not limited to the examples shown in FIGS. 22(*a*) and 22(*b*), and the cutout portions can be formed into any shape as long as the ground conductor is protected from the bad influence of the tensile stress and operates sufficiently as the ground conductor of the patch antenna of the RFID tag, that is, the ground conductor is electrically equivalent to the ground conductive pattern 8'. Furthermore, the plurality of cutout portions does not have to have the same shape. In consideration of trade-offs among the following factors: "arrangement of cutout portions having a large area at parts to each of which a large tensile stress is applied"; "gradual increase in the areas of the cutout portions with increase in the tensile stress applied to each of the cutout portions"; the degree of hardness of the dielectric substrate 1' such as a "roundish shape, like a circle, other than a rectangle"; the position and size of the IC chip 6'; and the curvature of a surface onto which the RFID tag is to be mounted (attached), the total area of the cutout portions and the shape of each of the cutout portions of the conductor forming the ground conductive pattern can be selectively determined. The following technical terms: "cutout" and "cutout portion" are used in order to specify their shapes, and the use of them is not limited to the cutout portions in each of which a part of the conductive pattern is actually cut out after the ground conductive pattern is formed. For example, various methods including a method of forming a pattern, such as the above-mentioned slot 4 of the conductive pattern 3, can be considered.

Furthermore, a metal fiber sheet 30' as shown in FIGS. 23(a) to 23(c) can be used instead of the ground conductive pattern 8' without forming the cutout portions. The metal fiber sheet 30' is a sheet shaped conductor in which metal fibers are woven. While the metal fiber sheet has a thin thickness (a short cross sectional length) and can be used as the ground conductor of the RFID tag, the metal fiber sheet has adequate flexibility against its deformation caused by an external force and can serve as a shock absorbing material for the tensile stress in place of the cutout portions, as shown in FIG. 23(c). In addition, because the metal fiber sheet is sheet shaped and its shape can be changed freely through molding or the like, cutout portions as shown in FIG. 22 can be formed in the metal fiber sheet, and an improvement in the performance of the shock absorbing material for absorbing the tensile stress can be achieved and a weight reduction of the metal fiber sheet can be achieved. Furthermore, the explanation of the metal fiber sheet 31' in which the grid-shaped pattern is formed, and the metal fiber sheet 33' in which the meander-shaped pattern is formed, which are shown in FIG. 24, will be omitted because the features of the ground conductive patterns except the metal fiber sheets are the same as those, as mentioned above, of the ground conductive pattern 26' in which the grid-shaped pattern is formed and the ground conductive pattern 28' in which the meander-shaped pattern is formed, which are shown in FIG. 22, and those described with reference to FIG. 18 (the description in paragraph number "0075"). Furthermore, because the shape of this metal fiber sheet 30' can be freely changed through molding or the like, as mentioned above, the metal fiber sheet can be used not only as the ground conductive pattern 8' but as the conductive pattern 3'. In addition, because it is easy to form holes at desired positions of a metal fiber sheet at the time of manufacturing the metal fiber sheet (weaving metal fibers), a plurality of holes whose shape and number enables the metal fiber sheet to serve as a shock absorbing material of absorbing the tensile stress can be formed by using this feature at the time when the metal fiber sheet is manufactured and can be used instead of the cutout portions.

Figure 25:
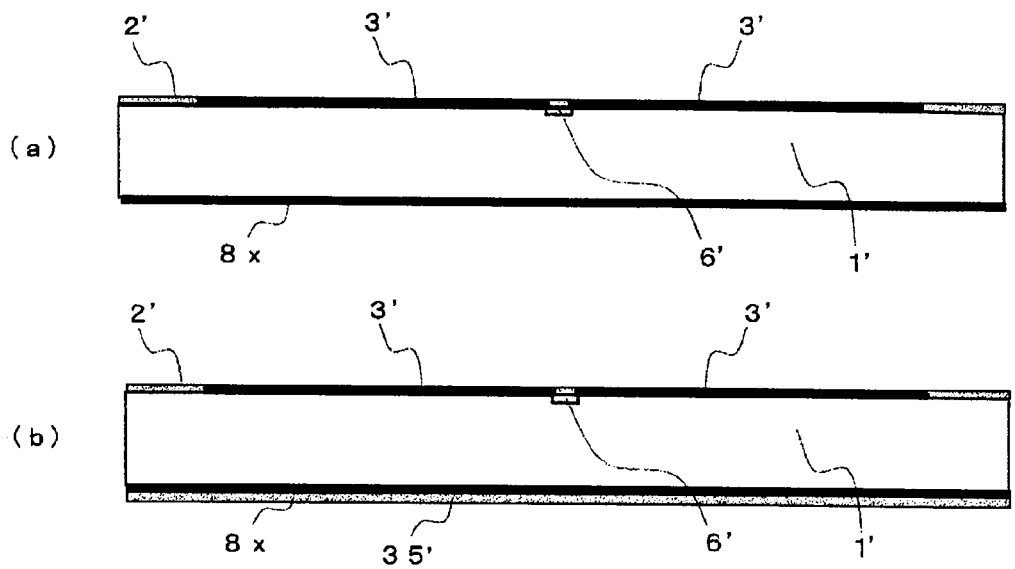
FIG. 25 is a configuration diagram of the RFID tag in accordance with Embodiment 4 of the present invention.

A process of actually attaching the RFID tag in accordance with this Embodiment 4 to a curved surface will be explained with reference to FIGS. 25 to 27. FIG. 25 is a configuration diagram of the RFID tag in accordance with this Embodiment 4. FIG. 25(a) is a cross-sectional view taken along the A-A' line of FIG. 11(a), and FIG. 25(b) shows the RFID tag as shown in FIG. 11(b) in which a double-sided tape is disposed on a ground conductive pattern. In FIG. 25, the ground conductive pattern 8x is a ground conductive pattern (a ground conductive layer) which is either of the ground conductive pattern 8', the ground conductive pattern (a grid-shaped pattern) 26', the ground conductive pattern (a meander-shaped pattern) 28', the metal fiber sheet 30', the ground conductive pattern (a grid-shaped pattern) 31', and the ground conductive pattern (a meander-shaped pattern) 33'. The double-sided tape 35' is disposed on a lower surface of the ground conductive pattern 8x. In the figures, the same reference numerals denote the same components or like components, and therefore the detailed explanation about them will be omitted hereafter. When the RFID tag in accordance with this Embodiment 4 is attached to an object to be managed, the one main surface of the dielectric substrate 1' on which the conductive pattern 3' which is the antenna pattern is formed is oriented outwardly in such a way that the RFID tag can easily receive an electric wave from the RFID reader/writer. It is therefore necessary to dispose a member (a bonding layer) to be fixed to a mounting surface of the object to be managed on the other main surface of the dielectric substrate 1' on which the ground conductive pattern 8x is formed. A commercial double-sided tape is fine for use as this member to be fixed to the mounting surface in many cases, depending upon the material of the mounting surface. As an alternative, the member to be fixed to the mounting surface can be an adhesive sheet other than the double-sided tape, or can be a fluid adhering resin. In addition, in a case in which a bonding layer having conductivity is used as the member and the conductive pattern 8x has cutout portions, the RFID tag operates while offering adequate performance after the RFID tag is mounted even if the total area of the cutout portions is large, and can be made to operate even if the conductive pattern 8x is not formed on the dielectric substrate 1' depending on the circumstances. However, in this case, the operation of the RFID tag is not guaranteed before the RFID tag is mounted.

Figure 26:
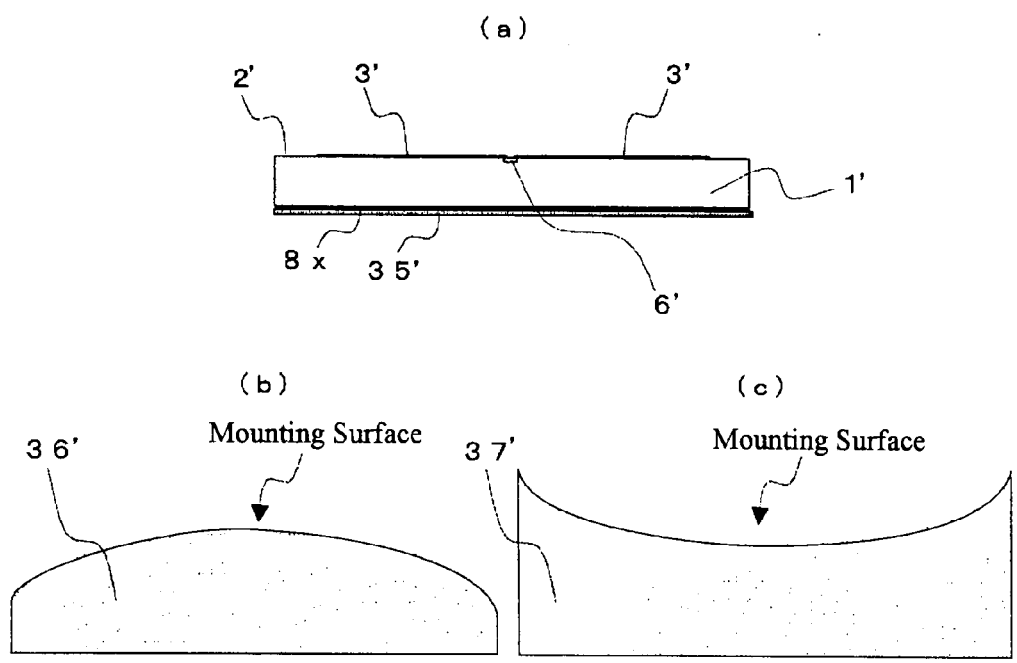
FIG. 26 is a configuration diagram of the RFID tag in accordance with Embodiment 4 of the present invention, and an object to which the RFID tag is to be mounted.
Figure 27:
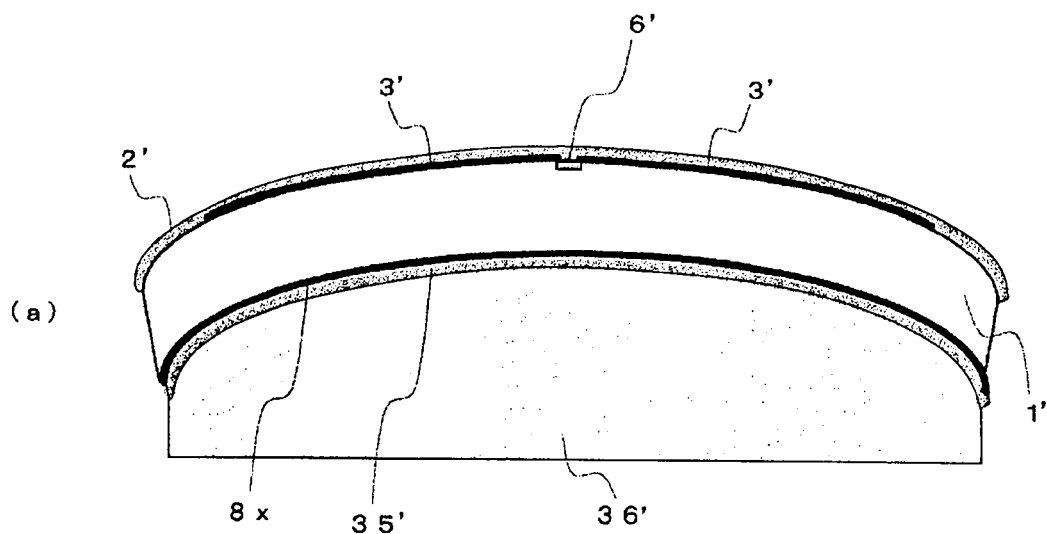
FIG. 27 is a configuration diagram of the RFID tag in accordance with Embodiment 4 of the present invention, and an object to which the RFID tag is to be mounted.
Figure 27:
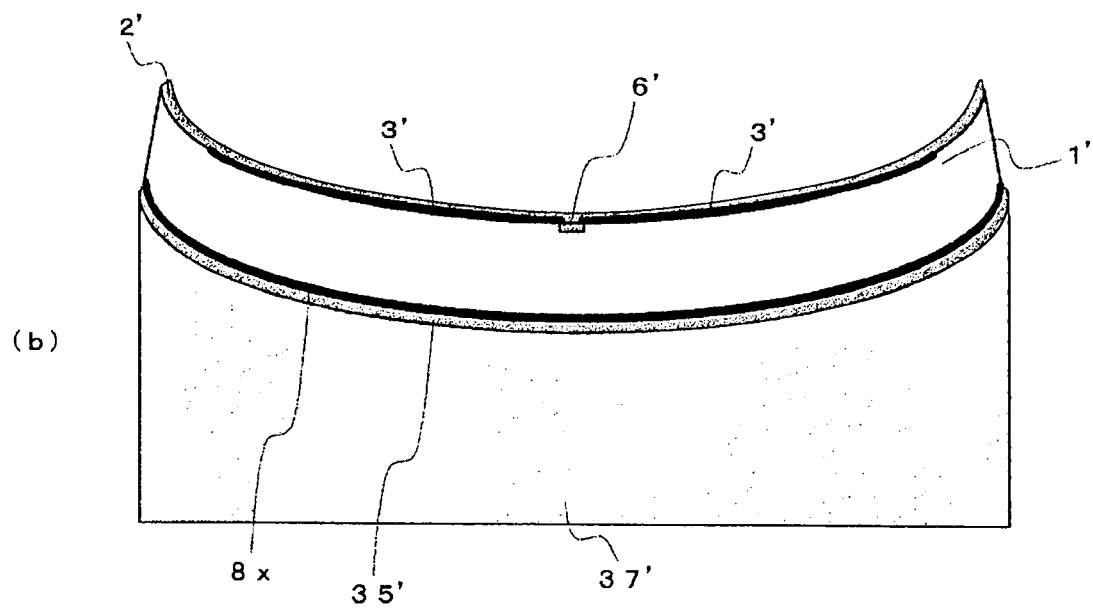

FIG. 26 is a configuration diagram of the RFID tag in accordance with this Embodiment 4 and an object onto which the RFID tag is to be mounted, and FIG. 26(a) shows the RFID tag shown in FIG. 25(b). FIG. 26(b) shows an object onto which the RFID tag is to be mounted (the mounting surface has a convex shape), and FIG. 26(c) shows an object onto which the RFID tag is to be mounted (the mounting surface has a concave shape). The objects are designated by reference characters 36' and 37' respectively. In the figures, the same reference numerals denote the same components or like components, and therefore the detailed explanation about them will be omitted hereafter. In view of the properties of the RFID tag in accordance with the present invention, the objects 36' and 37' onto each of which the RFID tag is to be mounted can be conductors or non-conductors. The surface of the double-sided tape 35' of the RFID tag shown in FIG. 26(a) which is opposite to the other surface of the double-sided tape 35' adhered to the RFID tag is brought into contact with the mounting surface of the object 36' or 37' to which the RFID tag is to be mounted, and the RFID tag is mounted to the object for mounting.

Next, a state in which the RFID tag is mounted to either of the objects 36' and 37' for mounting of the RFID tag will be explained with reference to FIG. 27. FIG. 27 is a configuration diagram of the RFID tag in accordance with this Embodiment 4 and the object for mounting of the RFID tag, FIG. 27(a) shows the RFID tag which is mounted to the object for mounting of the RFID tag (the mounting surface has a convex shape), and FIG. 27(b) shows the RFID tag which is mounted to the object for mounting of the RFID tag (the mounting surface has a concave shape). In the figures, the same reference numerals denote the same components or like components, and therefore the detailed explanation about them will be omitted hereafter. As shown in FIG. 27, even if the mounting surface has a convex or concave shape, the RFID tag in accordance with this Embodiment 4 can be mounted easily, as in the case in which the mounting surface is flat, and, because the electric length of the conductive pattern 3' does not vary even if the conductive pattern 3' is bent, the conductive pattern 3' operates as the electric wave radiating portion of the RFID tag without a hitch, though the radiation pattern becomes deformed slightly. Furthermore, even in a case in which the RFID tag is mounted to an object for mounting of the RFID tag, different from the objects for mounting as shown in FIGS. 27(a) and 27(b), in which both projections and depressions (undulations) exist on the mounting surface, the RFID tag can be mounted if the sizes of the projections and depressions (undulations) fall within certain limits.

As previously explained, because the dielectric substrate 1' is manufactured by using an olefin thermoplastic elastomer having a low degree of hardness (e.g., JIS-A55), or the like, the RFID tag in accordance with Embodiment 4 of the present invention can be manufactured to have flexibility which is provided by the dielectric substrate having flexibility, and can be mounted to a curved surface of an object such as a drum in such a way that the RFID tag's surface is bent along the curved surface. Furthermore, as compared with a multilayered dielectric substrate in which several printed circuit boards are bonded together, the cost (manufacturing cost) of the dielectric substrate which is injection molded by using a resin (a thermoplastic resin) can be reduced greatly. On the other hand, in a case in which the dielectric substrate used for the RFID tag is made from a dielectric substance, such as polytetrafluoroethylene (a fluororesin), ceramic, or glass epoxy, which is used for a general printed circuit board, it is difficult to manufacture the substrate in such a way as to have an arbitrary thickness, and it is therefore difficult to flexibly respond to a change in the required size according to the position where the RFID tag is to be mounted. In contrast with this, because the thickness and shape of the substrate formed with resin molding can be easily changed by simply changing the metallic mold, the RFID tag according to this embodiment can be manufactured easily in such a way as to have one of various shapes. Furthermore, by using an olefin polymer resin having a low dielectric dissipation factor, among resins (thermoplastic resins), as the material of the dielectric substrate of the RFID tag, the RFID tag can be manufactured in such a way as to have an improved radiation efficiency and a high gain.

In addition, the specific gravity of the olefin polymer resin is about one-half of that of a general printed circuit board, and therefore a weight reduction of the RFID tag can be achieved. Furthermore, in a case in which the IC chip 6' is mounted in a material which is hard and thick, such as a dielectric substrate made from polytetrafluoroethylene (a fluororesin), ceramic, or glass epoxy, which is used for a general printed circuit board, the IC chip has to be mounted one by one and it takes much time to perform the operation of mounting the IC chip because there is no facility intended for the mounting. In contrast, because many facilities used for mounting the IC chip 6' in the film base 2' have been already on the market, the substrate formed with resin molding can be mass-produced at one time, the manufacturing time and cost of the substrate including the formation of the hole 5' can be greatly reduced. The same features are also provided by following Embodiment 5.

Embodiment 5

In Embodiment 4, the RFID tag that can be attached to a curved surface by virtue of the position at which the IC chip 6' is mounted and the shape and material of the ground conductive pattern is explained previously. In this Embodiment 5, an RFID tag having further-improved reliability of electric connection between an IC chip and conductive patterns (a slot and electrical connecting portions) which can be attached to a curved surface will be explained with reference to FIGS. 28 to 35. In the figures, the same reference numerals denote the same components or like components, and therefore the detailed explanation about them will be omitted hereafter. According to Embodiment 5, while an area surrounding the IC chip 6' consists of a substrate having higher hardness than areas other than the area surrounding the IC chip 6' (a dielectric substrate 1' having a low degree of hardness shown in Embodiment 4), and the reliability of the electric connection between the IC chip and the conductive pattern is improved, parts of the substrate (edges of the RFID tag) in which a large bad influence of a tensile stress caused by a bend of the RFID tag is exerted upon the ground conductive pattern and so on are associated with the RFID tag which is more highly resistant to a bend thereof using the measure shown by Embodiment 4. In other words, a substrate having a low degree of hardness is used for a portion upon which a large influence is exerted due to a bend of the RFID tag and a substrate having a high degree of hardness is used for a portion upon which a small influence is exerted due to a bend of the RFID tag, and the electric connection parts relatively-low resistant to a bend of the RFID tag, at which the IC chip is connected with the conductive pattern, are placed on the substrate having a high degree of hardness.

Although a concrete structure of the RFID tag in accordance with Embodiment 5 will be explained hereafter, the RFID tag has the same size in visual appearance on the drawings (the outside shape of the RFID tag and the size of the slot) as the RFID tag in accordance with Embodiment 4. This is because priority is given to intelligibility when an explanation of the RFID tag in accordance with Embodiment 5 is made while a comparison between the RFID tag in accordance with Embodiment 5 and the RFID tag in accordance with Embodiment 4 is made. Actually, because the effective material constants (the dielectric constant, the dielectric dissipation factor, and so on) of the composite dielectric substrate (it uses the two types of substrates: the dielectric substrate 1' and the other dielectric substrate) in accordance with Embodiment 5 are not the same as the material constants of the dielectric substrate 1' in accordance with Embodiment 4, it is necessary to readjust the size of each component of the RFID tag (the sizes of the conductor and the substrate) in accordance with Embodiment 5 so that the RFID tag in accordance with Embodiment 5 has performance equivalent to the RFID tag in accordance with Embodiment 4. Of course, the predetermined distance d is changed. Therefore, the size of each component of the RFID tag in accordance with Embodiment 5 differs from that of the RFID tag in accordance with Embodiment 4 almost without exception. The same goes for among several types of RFID tags which will be explained in this Embodiment 5.

Figure 28:
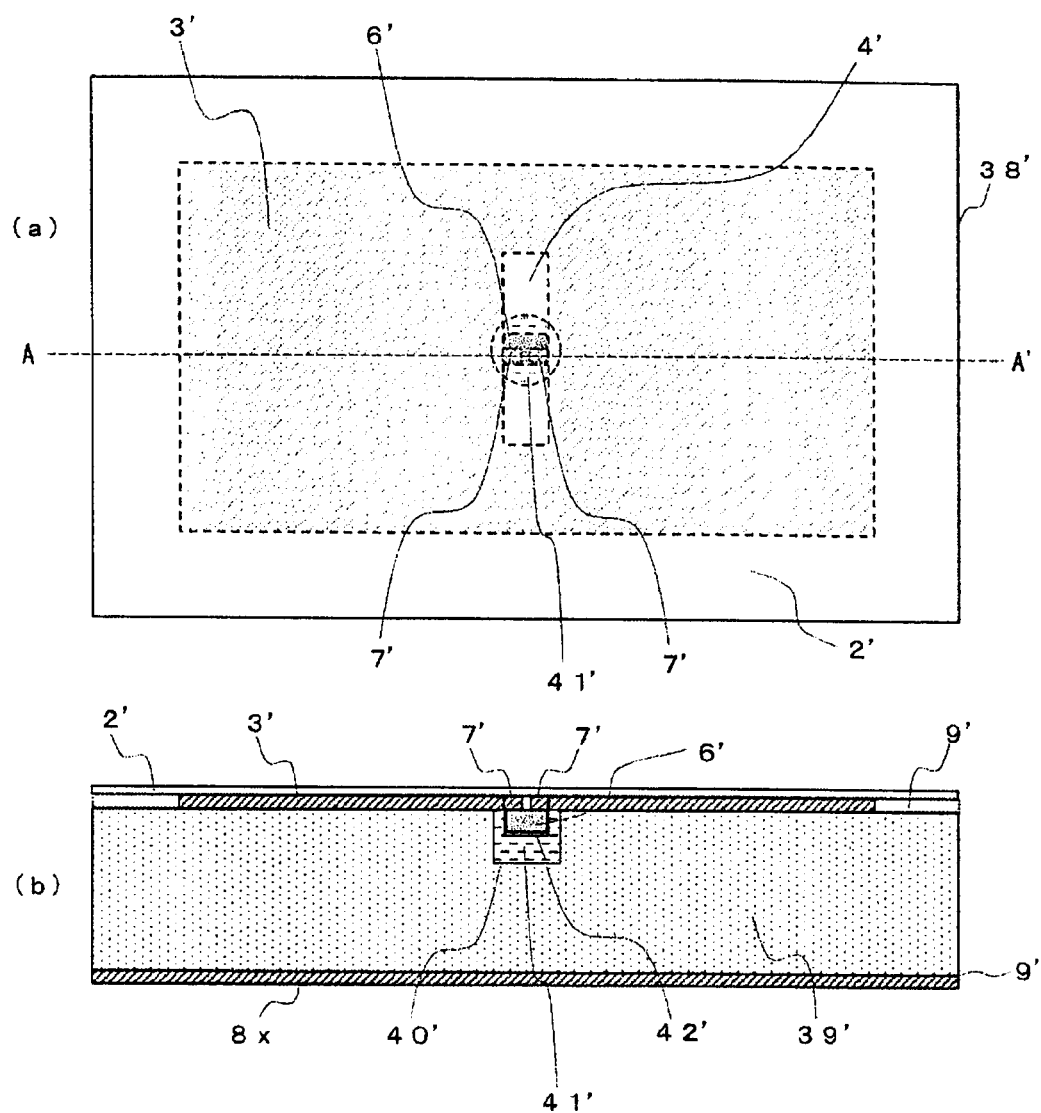
FIG. 28 is a configuration diagram of an RFID tag in accordance with Embodiment 5 of the present invention.
Figure 29:
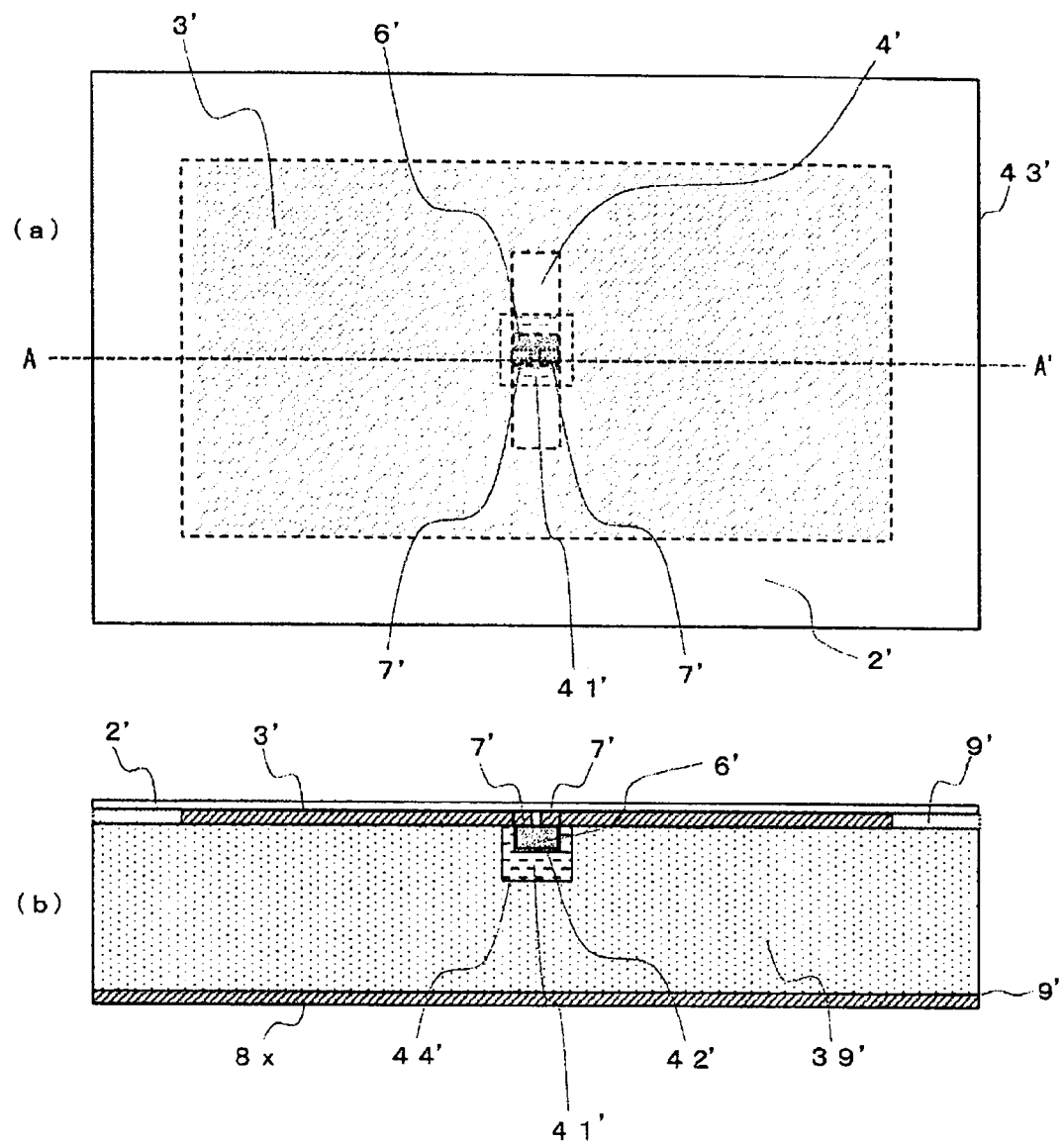
FIG. 29 is a configuration diagram of an RFID tag in accordance with Embodiment 5 of the present invention.

FIG. 28 is a configuration diagram of an RFID tag in accordance with this Embodiment 5, FIG. 28(a) is a plan view of the RFID tag, and FIG. 28(b) is a cross-sectional view taken along the A-A' line of FIG. 28(a). FIG. 29 is a configuration diagram of an RFID tag in accordance with this Embodiment 5, FIG. 29(a) is a plan view of the RFID tag, and FIG. 29(b) is a cross-sectional view taken along the A-A' line of FIG. 29(a). In the RFID tag 38' shown in FIG. 28, a first dielectric substrate 39' is made from the same material as that of the dielectric substrate 1', and a circular recessed portion 40' is disposed in one main surface of the first dielectric substrate 39'. A second dielectric substrate 41' is inserted in the recessed portion 40' (or a recessed portion 44', a recessed portion 46', a recessed portion 48', a penetrating hole 50', a penetrating hole 52', or a stepped portion 54' which will be mentioned below), and has having a higher degree of hardness than the first dielectric substrate 39'. A hole 42' is formed in the second dielectric substrate 41' on the side of the one main surface of the first dielectric substrate 39', and is equivalent to the hole 5' in accordance with Embodiment 4. In the RFID tag 43' shown in FIG. 29, the rectangular recessed portion 44' is formed in one main surface of a first dielectric substrate 39'.

Because the second dielectric substrate 41' in which the hole 42' in which IC chip 6' is placed is formed as shown in FIGS. 28 and 29 uses the substrate having a higher degree of hardness than the first dielectric substrate 39', the influence of a bend of the RFID tag 38' or 43' which is exerted upon the electric connection between the IC chip 6' and the conductive pattern 3' (electrical connecting portions 7' and 7') can be reduced. Furthermore, the cross-sectional shapes of the recessed portions 40' and 44' and the second dielectric substrate are limited to neither a circle shape nor a rectangle shape, and they can be shaped like an ellipse shape, a cross shape, a star shape, or a polygon shape. Because in a case in which the first dielectric substrate 39' and the second dielectric substrate 41' are manufactured with resin molding, they can be formed into arbitrary shapes, what is necessary is only to determine their shapes according to how to bend the RFID tag or the direction in which the RFID is bent. In addition, the recessed portions 40' and 44' and a rectangular solid portion extending from the top to the bottom of the second dielectric substrate do not have to have the same cross-sectional shape. For example, the recessed portions 40' and 44' and the second dielectric substrate can be shaped like a cone which becomes thinner in a tapered shape along a direction from its top to its bottom, instead of being shaped like a cylinder as shown in FIG. 28. In addition, because methods of manufacturing the RFID tags 38' and 44' respectively are the same as the manufacturing method of manufacturing the RFID tag 10' as explained in Embodiment 4 with the exception that the second dielectric substrate 41 is fitted into or bonded to the first dielectric substrate 39' after the first dielectric substrate 39' and the second dielectric substrate 41' are manufactured respectively, the explanation of the methods of manufacturing the RFID tags 38' and 44' respectively will be omitted hereafter. In Embodiment 4, the hole 5' in which the IC chip 6' is placed can be expanded, and a mold material, instead of the second dielectric substrate, can be poured into each of the recessed portion 40' and 44' so that each of the recessed portion 40' and 44' is formed to have a structure shown in the corresponding one of FIGS. 28 and 29.

Figure 30:
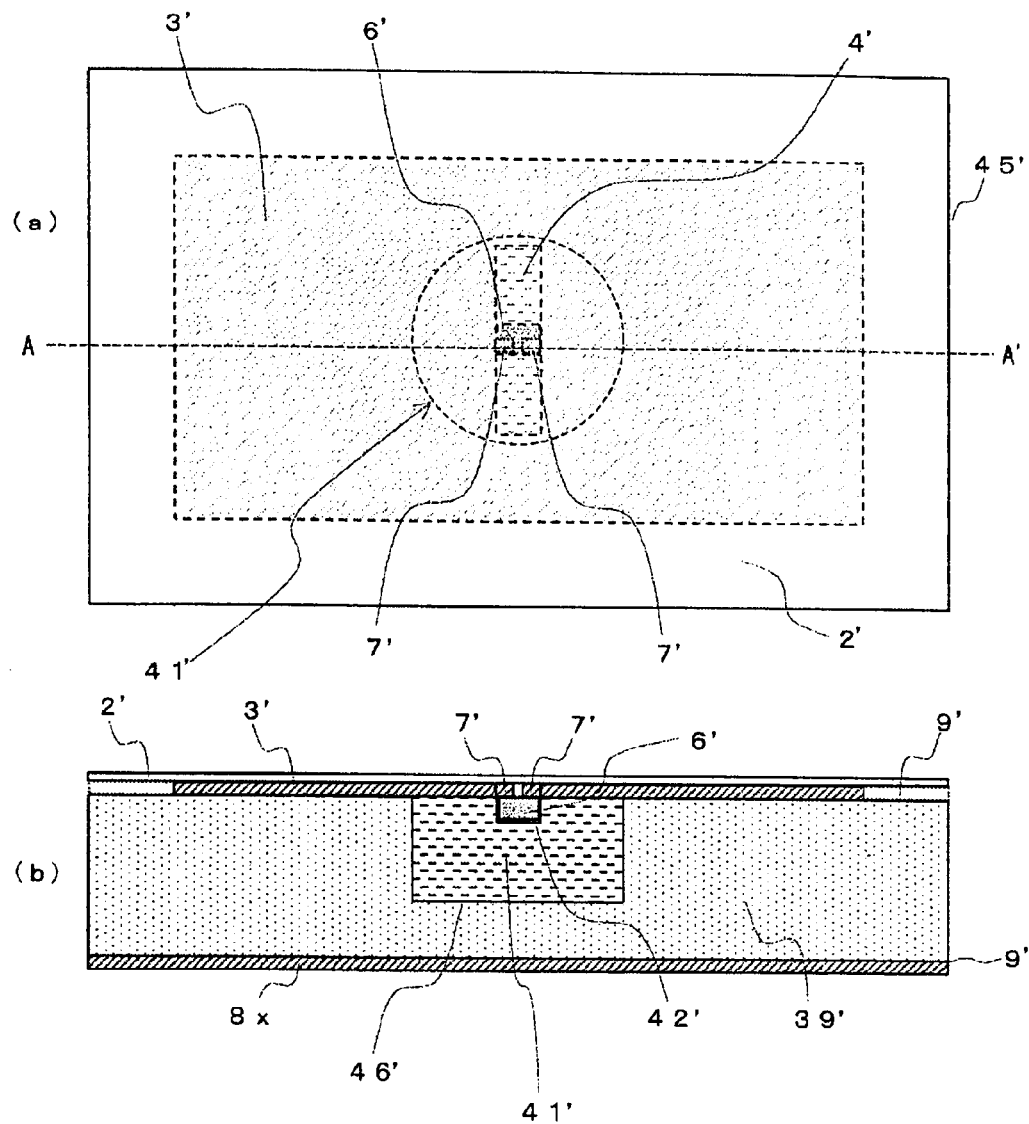
FIG. 30 is a configuration diagram of an RFID tag in accordance with Embodiment 5 of the present invention.
Figure 31:
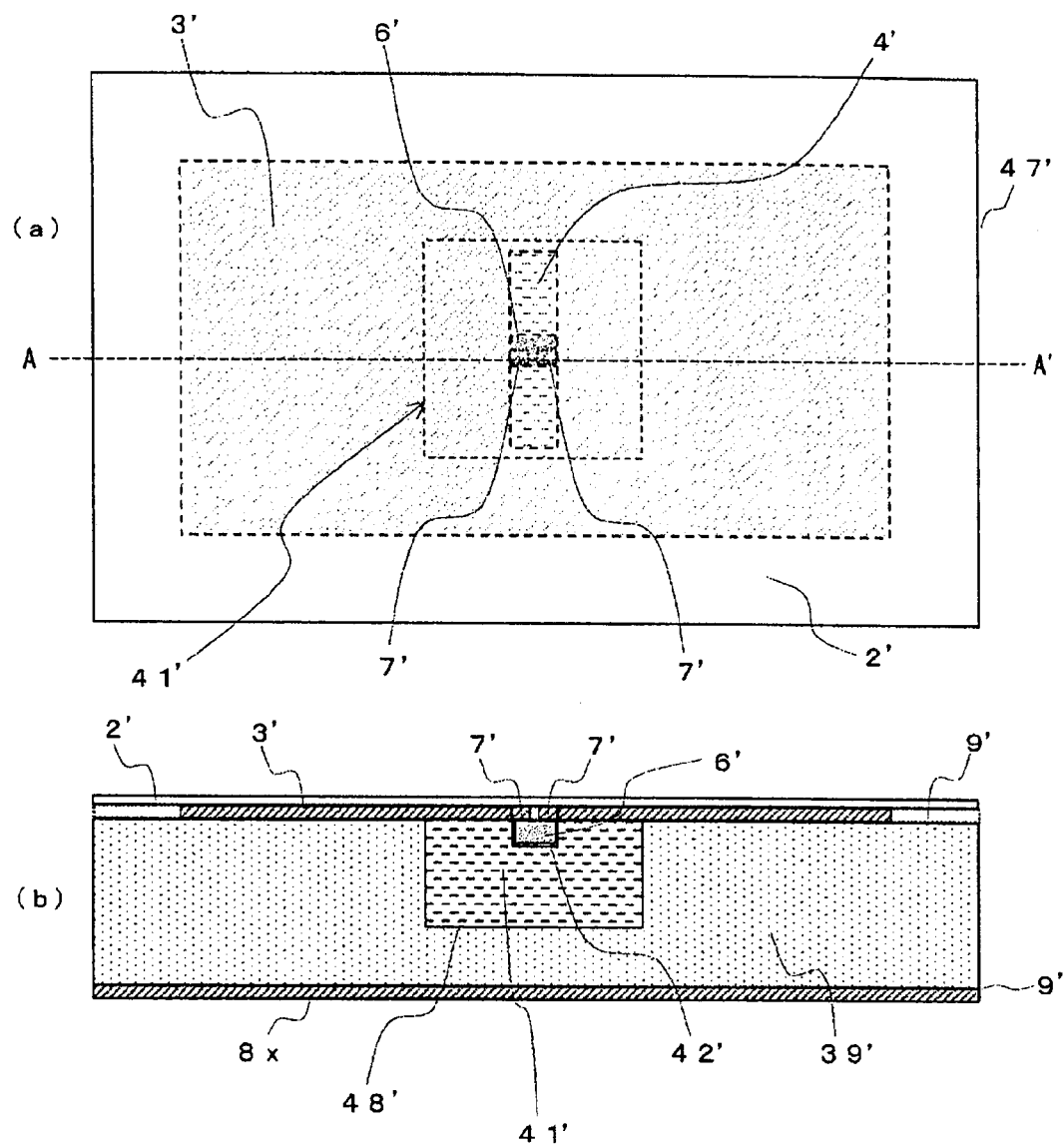
FIG. 31 is a configuration diagram of an RFID tag in accordance with Embodiment 5 of the present invention.

FIG. 30 is a configuration diagram of an RFID tag in accordance with this Embodiment 5. FIG. 30(*a*) is a plan view of the RFID tag, and FIG. 30(*b*) is a cross-sectional view taken along the A-A' line of FIG. 11(*a*). FIG. 31 is a configuration diagram of an RFID tag in accordance with this Embodiment 5. FIG. 31(*a*) is a plan view of the RFID tag, and FIG. 31(*b*) is a cross-sectional view taken along the A-A' line of FIG. 31(*a*). In the RFID tag 45' shown in FIG. 30, a recessed portion 46' is shaped like a circle in cross section whose diameter is longer than the longitudinal length of a slot 4'. In the RFID tag 47' shown in FIG. 31, a recessed portion 46' is shaped like a rectangle in cross section whose each side has a length longer than the longitudinal length of a slot 4'. Although the RFID tags shown in FIGS. 30 and 31 have the same basic configuration and the same function as the RFID tags shown in FIGS. 28 and 29, the slot 4' has a pattern only on a second dielectric substance 41' in the RFID tags shown in FIGS. 30 and 31. As a result, the load imposed on the contact surfaces (the fitting or adhesive surfaces) of a first dielectric substrate 39' and the second dielectric substrate 41' on which the first dielectric substrate 39' is contact with the second dielectric substrate 41' when the RFID tag is bent is not imposed on the edges of the slot 4', and the load is suppressed by not only a film base 2' but a conductive pattern 3' and the film base 2'. Therefore, the RFID tags shown in FIGS. 30 and 31 differ from those shown in FIGS. 28 and 29 in that they have an advantage of preventing the pattern of the slot 4' from flaking from the substrate due to a break or slack of the pattern more effectively.

Furthermore, the cross-sectional shapes of the recessed portions 46' and 48' and the second dielectric substrate are limited to neither a circle shape nor a rectangle shape, and they can be shaped like an ellipse shape, a cross shape, a star shape, or a polygon shape. Because in a case in which the first dielectric substrate 39' and the second dielectric substrate 41' are manufactured with resin molding, they can be formed into arbitrary shapes, what is necessary is only to determine their shapes according to how to bend the RFID tag or the direction in which the RFID is bent. In addition, the recessed portions 46' and 48' and a rectangular solid portion extending from the top to the bottom of the second dielectric substrate do not have to have the same cross-sectional shape. For example, the recessed portions 46' and 48' and the second dielectric substrate can be shaped like a cone which becomes thinner in a tapered shape along a direction from its top to its bottom, instead of being shaped like a cylinder as shown in FIG. 30. In addition, because methods of manufacturing the RFID tags 45' and 47' respectively are the same as the manufacturing method of manufacturing the RFID tag 10' as explained in Embodiment 4 with the exception that the second dielectric substrate 41' is fitted into or bonded to the first dielectric substrate 39' after the first dielectric substrate 39' and the second dielectric substrate 41' are manufactured respectively, the explanation of the methods of manufacturing the RFID tags 45' and 47' respectively will be omitted hereafter.

Figure 32:
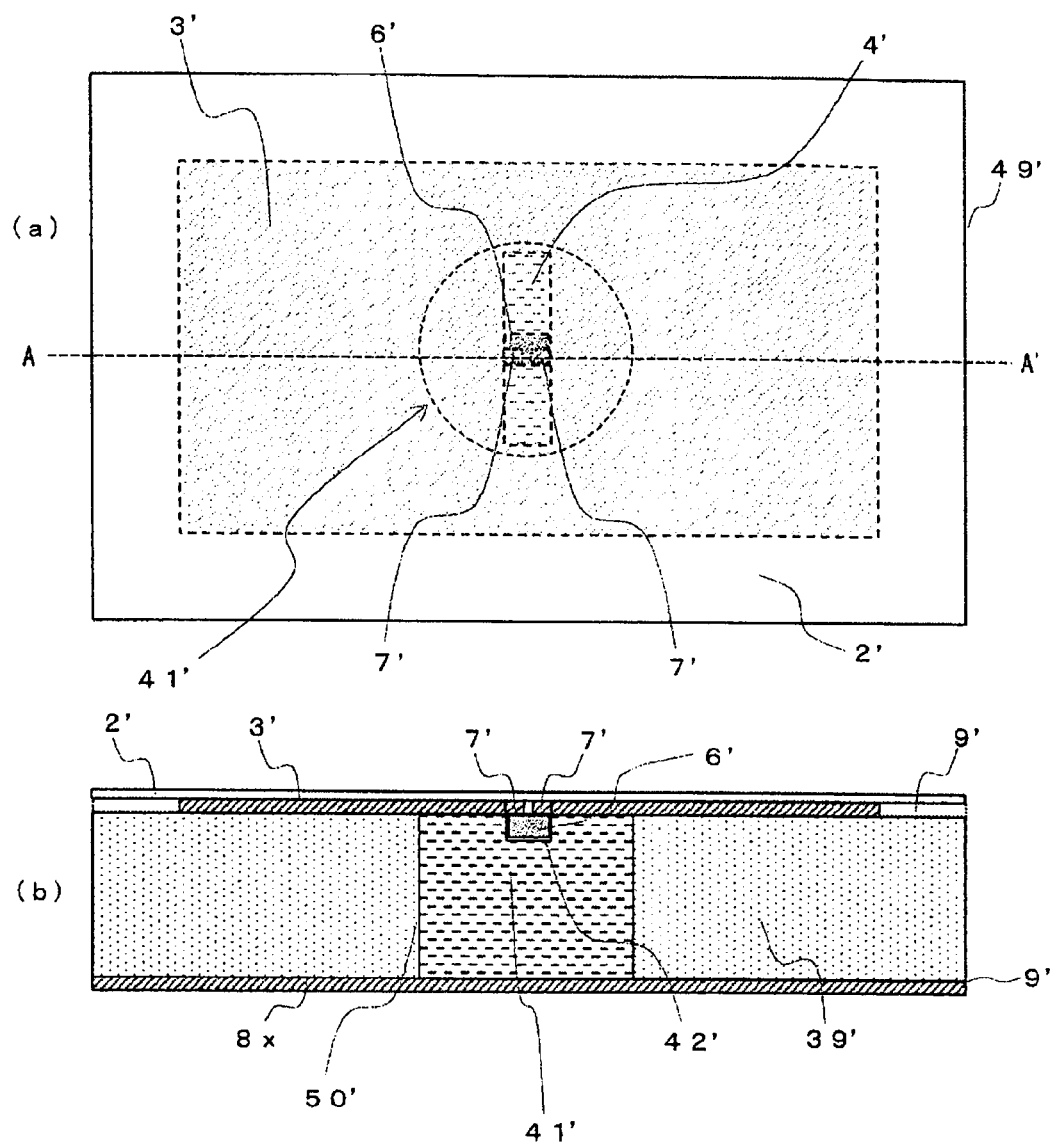
FIG. 32 is a configuration diagram of an RFID tag in accordance with Embodiment 5 of the present invention.
Figure 33:
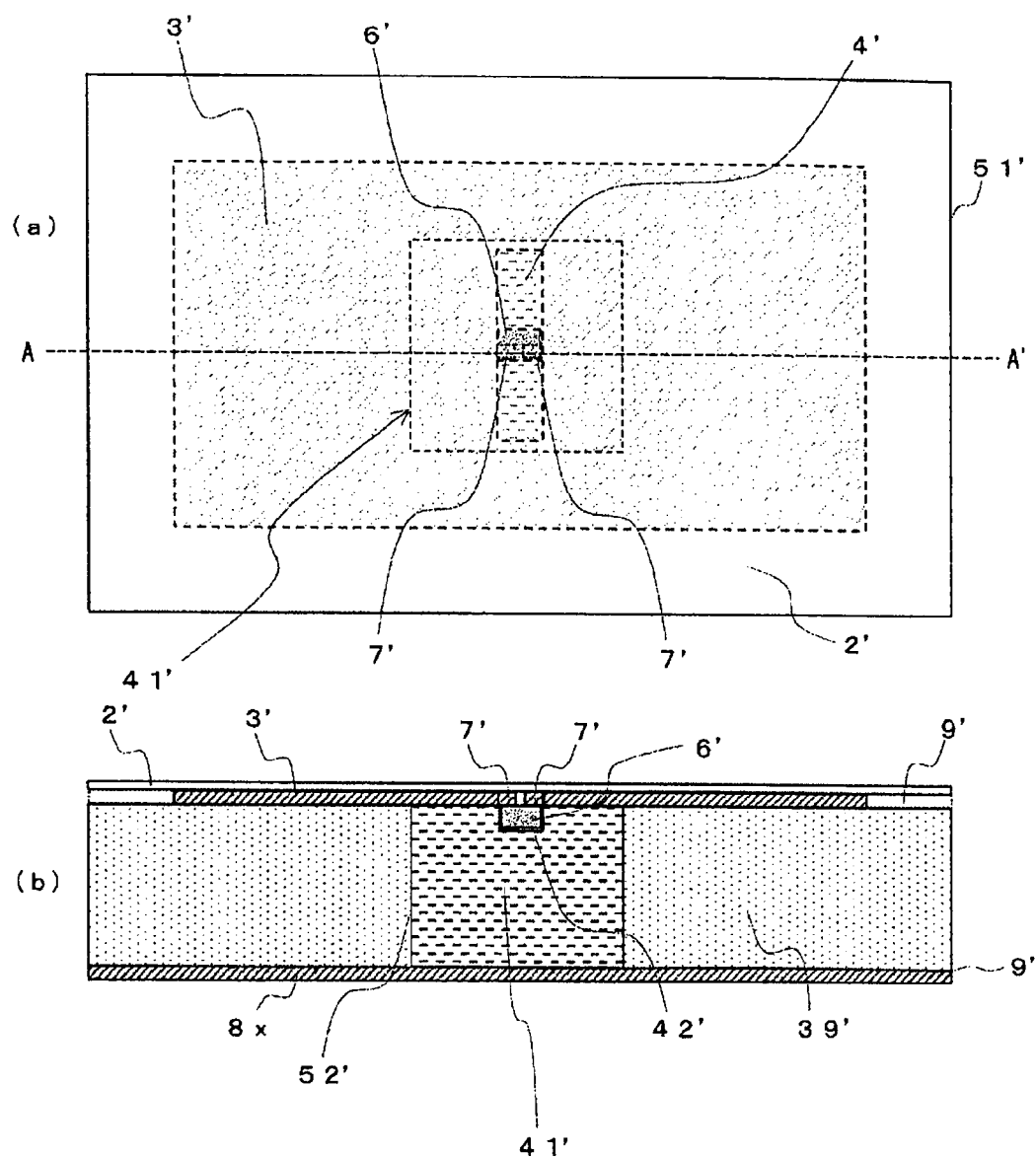
FIG. 33 is a configuration diagram of an RFID tag in accordance with Embodiment 5 of the present invention.

FIG. 32 is a configuration diagram of an RFID tag in accordance with this Embodiment 5. FIG. 32(*a*) is a plan view of the RFID tag, and FIG. 32(*b*) is a cross-sectional view taken along the A-A' line of FIG. 32(*a*). FIG. 33 is a configuration diagram of an RFID tag in accordance with this Embodiment 5. FIG. 33(*a*) is a plan view of the RFID tag, and FIG. 33(*b*) is a cross-sectional view taken along the A-A' line of FIG. 33(*a*). In the RFID tag 49' shown in FIG. 32, a penetrating hole 50' is shaped like a circle in cross section whose diameter is longer than the longitudinal length of a slot 4'. In the RFID tag 51' shown in FIG. 33, a penetrating hole 52' is shaped like a rectangle in cross section whose each side has a length longer than the longitudinal length of a slot 4'. Although the RFID tags shown in FIGS. 32 and 33 have the same basic configuration and the same function as the RFID tags shown in FIGS. 30 and 31, the second dielectric substrate 41' of each of the RFID tags shown in FIGS. 30 and 31 has a larger volume and a larger area as compared with the second dielectric substrate 41' of each of the RFID tags shown in FIGS. 28 and 29. As a result, because the contact surfaces (the fitting or adhesive surfaces) of a first dielectric substrate 39' and the second dielectric substrate 41' on which the first dielectric substrate 39' is contact with the second dielectric substrate 41' when the RFID tag is bent becomes closer to the edges of the RFID tag, there is a possibility that the load imposed on the contact surfaces increases and the first dielectric substrate 39' and the second dielectric substrate 41' separate from each other. In contrast, because in the RFID tags shown in FIGS. 32 and 33, the penetrating hole 50' or 52' is formed in the first dielectric substrate 39' and the second dielectric substrate 41' is inserted into and fixed to the penetrating hole, the contact surfaces of the first dielectric substrate 39' and the second dielectric substrate 41' become large and the possibility that the first dielectric substrate 39' and the second dielectric substrate 41' separate from each other can be reduced. It is needless to say that a penetrating hole can also be formed in the first dielectric substrate 39' of the RFID tag shown in FIG. 28 or 29 and the second dielectric substrate 41' having a shape corresponding to that of the penetrating hole can be inserted into and fixed to the penetrating hole.

Furthermore, the cross-sectional shapes of the penetrating holes 50' and 52' and the second dielectric substrate are limited to neither a circle shape nor a rectangle shape, and they can be shaped like an ellipse shape, a cross shape, a star shape, or a polygon shape. Because in a case in which the first dielectric substrate 39' and the second dielectric substrate 41' are manufactured with resin molding, they can be formed into arbitrary shapes, what is necessary is only to determine their shapes according to how to bend the RFID tag or the direction in which the RFID is bent. In addition, the penetrating holes 50' and 52' and a rectangular solid portion extending from the top to the bottom of the second dielectric substrate do not have to have the same cross-sectional shape. For example, the penetrating holes 50' and 52' and the second dielectric substrate can be shaped like a cone which becomes thinner in a tapered shape along a direction from its top to its bottom, instead of being shaped like a cylinder as shown in FIG. 32. In addition, because methods of manufacturing the RFID tags 49' and 51' respectively are the same as the manufacturing method of manufacturing the RFID tag 10' as explained in Embodiment 4 with the exception that the second dielectric substrate 41' is fitted into or bonded to the first dielectric substrate 39' after the first dielectric substrate 39' and the second dielectric substrate 41' are manufactured respectively, the explanation of the methods of manufacturing the RFID tags 49' and 51' respectively will be omitted hereafter. In addition, because the electric field in a vicinity of the IC chip 6' concentrates on an area surrounding the slot 4', as mentioned above (FIG. 18), it is not necessary to form the ground conductive pattern 8*x* on the second dielectric substrate 41' on the side of the other main surface of the first dielectric substrate 39' which is just under the area on which the electric field concentrates. That is, this means that the ground conductive pattern 8*x* does not have to be formed before the first dielectric substrate 39' are fixed (fitted and bonded) to the second dielectric substrate 41'. As a result, there is provided an advantage of increasing the variations of the manufacturing method which can be selected.

Figure 34:
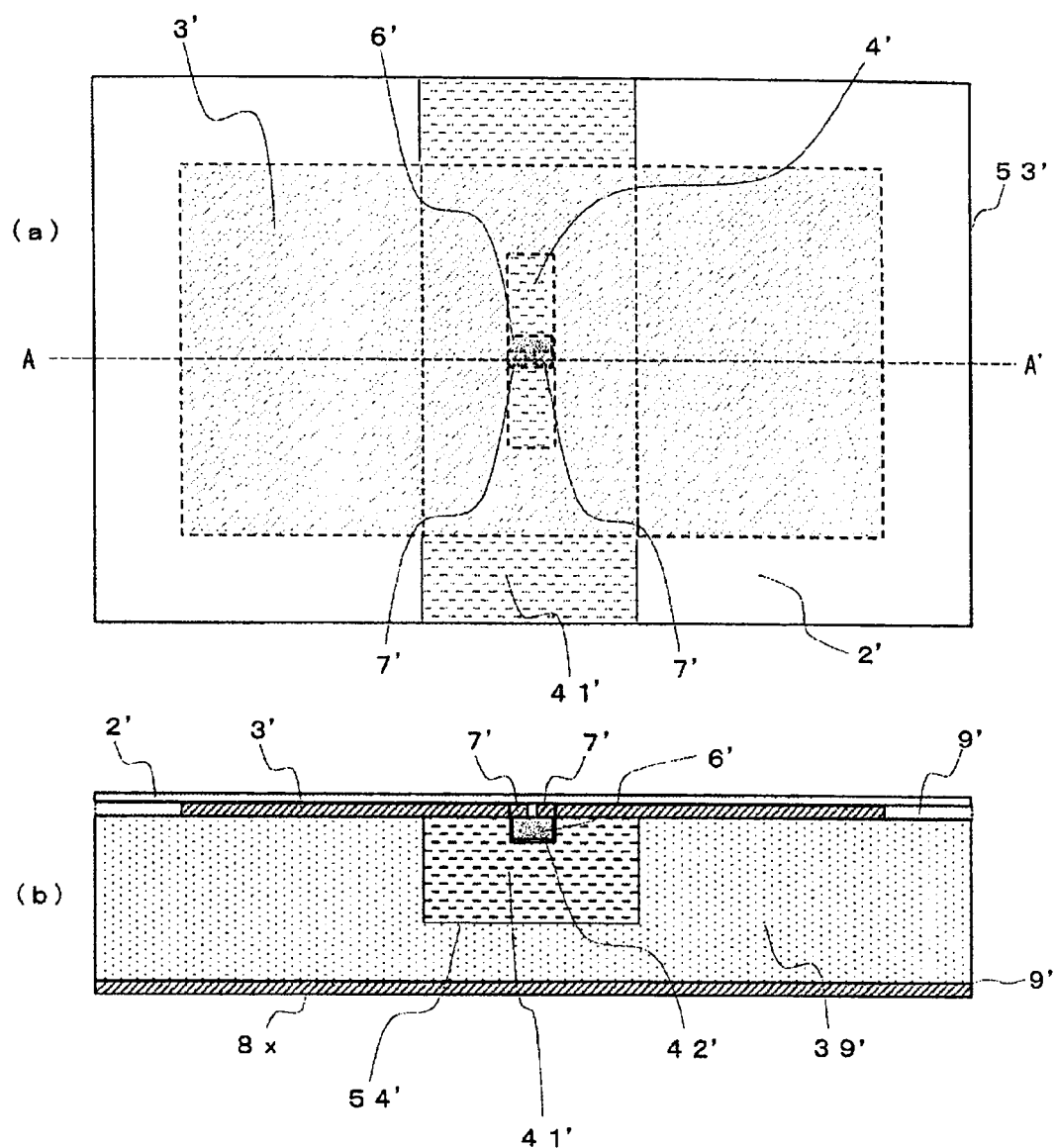
FIG. 34 is a configuration diagram of an RFID tag in accordance with Embodiment 5 of the present invention.

FIG. 34 is a configuration diagram of an RFID tag in accordance with this Embodiment 5. FIG. 34(*a*) is a plan view of the RFID tag, and FIG. 34(*b*) is a cross-sectional view taken along the A-A' line of FIG. 34(*a*). In the RFID tag 53' shown in FIG. 34, a stepped portion 54' is disposed in a central portion of a first dielectric substrate 39' in such a way as to extend from one of opposing sides of the first dielectric substrate 39' to the other one of them. The RFID tag 53' differs from the RFID tags shown in FIGS. 28 to 33 in that, instead of the openings, such as the recessed portion and the penetrating hole, being disposed in the one main surface of the first dielectric substrate 39', the RFID tag 53' has a structure in which the second dielectric substrate 41' is fitted in or bonded to the stepped portion 54' having a recessed shape whose openings are formed in the one main surface and side surfaces of the first dielectric substrate 39'. Because the RFID tag 53' is constructed in this way, there is provided an advantage of being able to easily perform alignment between the first dielectric substrate 39' and the second dielectric substrate 41' regardless of whether the second dielectric substrate 41' is inserted into the stepped portion from the one main surface side or one of the side surfaces of the first dielectric substrate 39'.

It is not necessary to flatten the surfaces of the stepped portion 54' and those of the second dielectric substrate 41', and a wavelike swelling portion or projections and depressions for fitting can be formed on those surfaces so that the strength of the connection between the first dielectric substrate 39' and the second dielectric substrate 41' can be improved. The stepped portion 54' does not have to be formed in parallel with the slot 4', and what is necessary is only to determine the direction along which the stepped portion is formed according to how to bend the RFID tag or the direction in which the RFID is bent. In addition, the stepped portion 54' and a rectangular solid portion extending from the top to the bottom of the second dielectric substrate do not have to have the same cross-sectional shape. For example, the stepped portion 54' and the second dielectric substrate can be shaped like a trapezoidal cone which becomes thinner in a tapered shape along a direction from its top to its bottom, instead of being shaped like a rectangular parallelepiped as shown in FIG. 34. In addition, because methods of manufacturing the RFID tags 49' and 51' respectively are the same as the manufacturing method of manufacturing the RFID tag 10' as explained in Embodiment 4 with the exception that the second dielectric substrate 41' is fitted into or bonded to the first dielectric substrate 39' after the first dielectric substrate 39' and the second dielectric substrate 41' are manufactured respectively, the explanation of the methods of manufacturing the RFID tags 49' and 51' respectively will be omitted hereafter.

Figure 35:
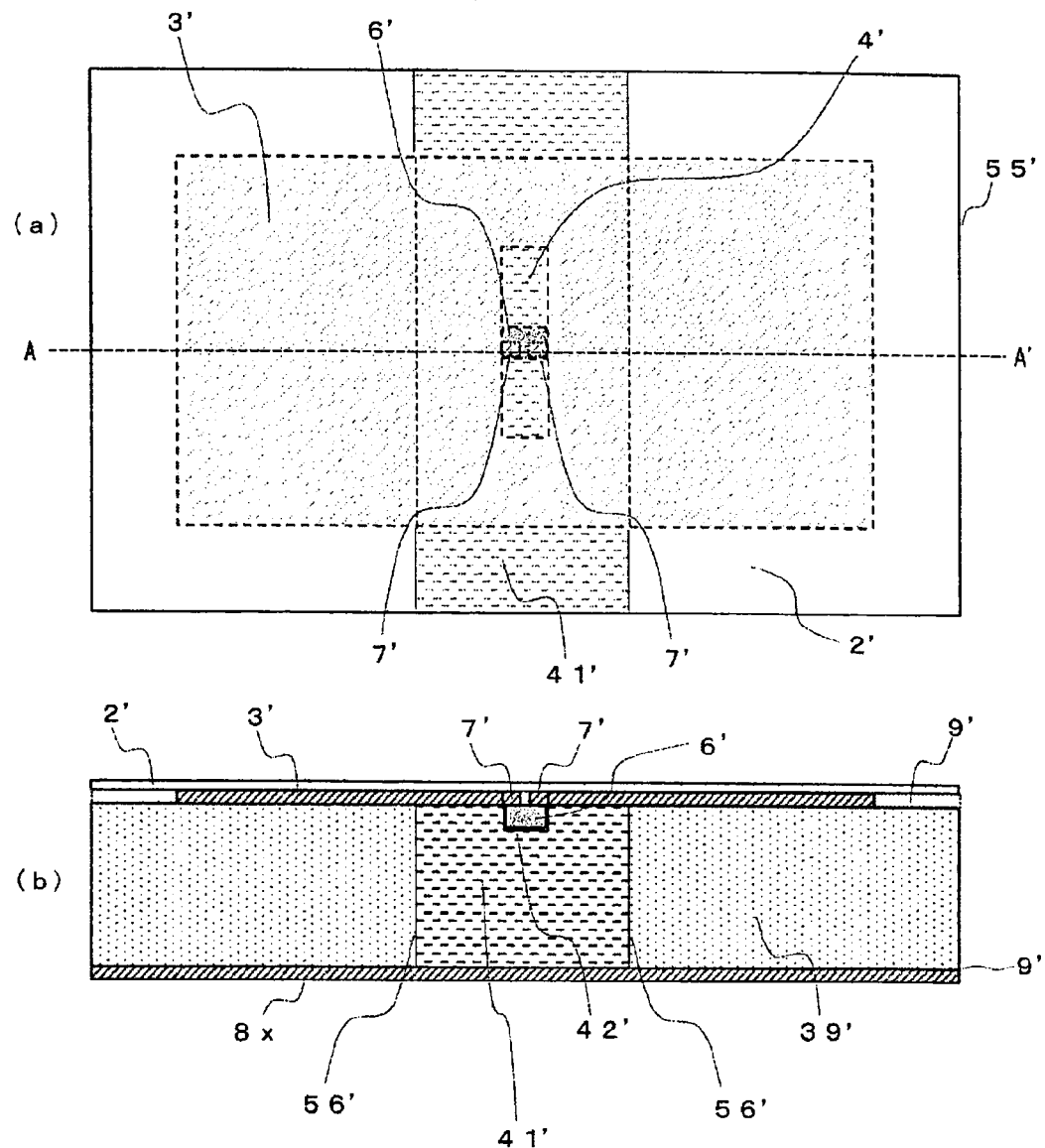
FIG. 35 is a configuration diagram of an RFID tag in accordance with Embodiment 5 of the present invention.

FIG. 35 is a configuration diagram of an RFID tag in accordance with this Embodiment 5. FIG. 35(*a*) is a plan view of the RFID tag, and FIG. 35(*b*) is a cross-sectional view taken along the A-A' line of FIG. 35(*a*). In the RFID tag 55', a connecting surface 56' connects a first dielectric substrate 39' and a second dielectric substrate 39'. In the RFID tag 55', instead of the stepped portion 54' of the RFID tag 53' shown in FIG. 34, the first dielectric substrate 39' is placed, via the connecting surface 56', on sides of the second dielectric substrate 41', and the first dielectric substrate 39' is bonded to the second dielectric substrate 41'. First, after the second dielectric substrate 41' is formed, the second dielectric substrate 41' is inserted into a metallic mold for injection molding and the RFID tag is then manufactured by inserting a resin which becomes the alternative dielectric substrate 39'. Simply, after the first dielectric substrate 39' and the second dielectric substrate 41' are manufactured independently, they can be bonded together via the connecting surfaces 56'.

It is not necessary to flatten the first dielectric substrate 39' and the second dielectric substrate 41' on the connecting surface 56', and a wavelike swelling portion or projections and depressions for fitting can be formed on those surfaces so that the strength of the connection between the first dielectric substrate 39' and the second dielectric substrate 41' can be improved. The connecting surface 56' does not have to be formed in parallel with the slot 4', and what is necessary is only to determine the direction along which the connecting surface is formed according to how to bend the RFID tag or the direction in which the RFID is bent. In addition, a rectangular solid portion extending from the top to the bottom (a rectangular solid portion extending from the one main surface of the first dielectric substrate to the other main surface) of each of the first and second dielectric substrates 39' and 41' at the connecting surface 56' do not have to have the same cross-sectional shape. For example, the portion defined by the connecting surface 56' can be formed in such a way as to be tapered as the rectangular solid portion extends from the side of the one main surface of the first dielectric substrate to the side of the other main surface, instead of being shaped like a rectangular solid as shown in FIG. 35. In addition, because steps after the first dielectric substrate 39' and the second dielectric substrate 41' are bonded to each other of a method of manufacturing the RFID tag 55' are the same as those of the method of manufacturing the RFID tag 10' as explained in Embodiment 4, the explanation of the steps will be omitted hereafter.

As previously explained, in the above-mentioned dielectric substrate of the RFID tag in accordance with Embodiment 5 of the present invention, an area surrounding the IC chip 6' is formed in such a way as to have a higher degree of hardness than areas other than the area surrounding the IC chip 6'. Therefore, in addition to the advantages provided by the RFID tag in accordance with Embodiment 4 of the present invention, there is provided an advantage of being able to provide a higher degree of reliability of electric connection between the IC chip 6' and the conductive pattern 3' (the electrical connecting portions 7' and 7') at the time of attaching the RFID tag onto a curved surface.

INDUSTRIAL APPLICABILITY

Because the RFID tag in accordance with the present invention can be mounted onto an object regardless of whether the object is a conductive one or a non-conductive one without shortening its communication range, the RFID tag in accordance with the present invention is suitable for entrance/exit control, physical distribution management, and so on of living bodies or products.

The invention claimed is:

1. An RFID tag comprising:
a dielectric substrate having a hole formed in one main surface thereof;
a ground conductive pattern disposed on another main surface of said dielectric substrate;
a conductive pattern disposed on an inner portion of the one main surface of said dielectric substrate in such a way as to be at a predetermined distance from each of edges of said dielectric substrate, a slot being formed in this conductive pattern; and
an IC chip electrically connected to said conductive pattern via this slot, and inserted into said hole of said dielectric substrate,
wherein an electric field is formed between the ground conductive pattern and the conductive pattern, an electric field runs between opposing sides of the slot, and a potential difference occurs between the opposing sides.

2. An RFID tag comprising:
a dielectric substrate having a hole formed in one main surface thereof;
a ground conductive pattern disposed on another main surface of said dielectric substrate;
a conductive pattern disposed on an inner portion of the one main surface of said dielectric substrate in such a way as to be at a predetermined distance from each of edges of said dielectric substrate, a long narrow slot being formed in this conductive pattern; and
an IC chip electrically connected to said conductive pattern via this slot, and inserted into said hole of said dielectric substrate,
wherein an electric field is formed between the ground conductive pattern and the conductive pattern, an electric field runs between opposing sides of short direction of the long narrow slot, and a potential difference occurs between the opposing sides.

3. An RFID tag comprising:
a dielectric substrate having a hole formed in one main surface thereof;
a ground conductive pattern disposed on another main surface of said dielectric substrate;
a conductive pattern disposed on an inner portion of the one main surface of said dielectric substrate in such a way as to be at a predetermined distance from each of edges of said dielectric substrate, a slot being formed in this conductive pattern;
electrical connecting portions extending respectively from both sides of this slot toward an inner portion of said slot; and
an IC chip electrically connected to these electrical connecting portions, and inserted into said hole of said dielectric substrate,
wherein an electric field is formed between the ground conductive pattern and the conductive pattern, an electric field runs between opposing sides of the slot, and a potential difference occurs between the opposing sides.

4. An RFID tag comprising:
a dielectric substrate having a hole formed in one main surface thereof;
a ground conductive pattern disposed on another main surface of said dielectric substrate;
a conductive pattern disposed on an inner portion of the one main surface of said dielectric substrate in such a way as to be at a predetermined distance from each of edges of said dielectric substrate, a long narrow slot being formed in this conductive pattern;
electrical connecting portions extending respectively from both sides of this slot which are opposite to each other in a direction of a width of the slot toward an inner portion of said slot; and
an IC chip electrically connected to these electrical connecting portions, and inserted into said hole of said dielectric substrate,
wherein an electric field is formed between the ground conductive pattern and the conductive pattern, an electric field runs between opposing sides of short direction of the long narrow slot, and a potential difference occurs between the opposing sides.

5. An RFID tag that can be mounted on a curved surface having a predetermined curvature, said RFID tag comprising:
a dielectric substrate having a hole formed in a central part of one main surface thereof, and having a degree of hardness which enables said dielectric substrate itself to bend with at least said predetermined curvature;
a ground conductive pattern disposed on another main surface of this dielectric substrate;
a conductive pattern disposed on an inner portion of said dielectric substrate in such a way as to be at a predetermined distance from each of edges of said dielectric substrate, a long narrow slot being formed in this conductive pattern; and
an IC chip electrically connected to said conductive pattern via this slot, and inserted into said hole of said dielectric substrate,
wherein an electric field is formed between the ground conductive pattern and the conductive pattern, an electric field runs between opposing sides of short direction of the long narrow slot, and a potential difference occurs between the opposing sides.

6. The RFID tag according to claim 5, wherein in said dielectric substrate, a portion in a vicinity of said IC chip has a higher degree of hardness than any other portion other than the portion in the vicinity of said IC chip.

7. The RFID tag according to claim 5, wherein at least one of said conductive pattern and said ground conductive pattern is made from a metal fiber sheet.

8. The RFID tag according to claim 5, wherein said ground conductive pattern has a cutout portion in which a part thereof is cut out.

9. The RFID tag according to claim 5, wherein said ground conductive pattern is shaped like a grid-shaped pattern or a meander pattern.

10. The RFID tag according to claim 5, wherein said IC chip is electrically connected to electrical connecting portions extending respectively from both sides of said slot in a direction of a width of said slot toward an inner side of said slot.

11. An RFID tag that can be mounted on a curved surface having a predetermined curvature, said RFID tag comprising:
a dielectric substrate having a hole formed in a central part of one main surface thereof, and having a degree of hardness which enables said dielectric substrate itself to bend with at least said predetermined curvature;
a ground conductive pattern disposed on another main surface of this dielectric substrate;
a film base;
a conductive pattern disposed on this film base in such a way as to be placed in an inner portion of said film base at a predetermined distance from an edge of said film base, a long narrow slot being formed in this conductive pattern; and
an IC chip electrically connected to said conductive pattern via this slot, and inserted into said hole of said dielectric substrate,
wherein an electric field is formed between the ground conductive pattern and the conductive pattern, an electric field runs between opposing sides of short direction of the long narrow slot, and a potential difference occurs between the opposing sides.

12. The RFID tag according to claim 11, wherein said RFID tag has a fixing means for fixing said conductive pattern formed on said film base to the one main surface of said dielectric substrate.

13. An RFID tag that can be mounted on a curved surface having a predetermined curvature, said RFID tag comprising:
a first dielectric substrate having a recessed portion formed in a central part of one main surface thereof, and having a degree of hardness which enables said first dielectric substrate itself to bend with at least said predetermined curvature;
a second dielectric substrate disposed inside said recessed portion, having a hole formed on a side of the one main surface of said first dielectric substrate, and having a degree of hardness higher than that of said first dielectric substrate;
a ground conductive pattern disposed on another main surface of this dielectric substrate;
a conductive pattern disposed on said first and second dielectric substrates in such a way as to be placed in an inner portion of said first dielectric substrate at a predetermined distance from each of edges of said first dielectric substrate, a long narrow slot being formed in this conductive pattern; and
an IC chip electrically connected to said conductive pattern via this slot, and inserted into said hole of said second dielectric substrate.

14. The RFID tag according to claim 13, wherein said recessed portion is shaped like a circle or a polygon.

15. The RFID tag according to claim 13, wherein said second dielectric substrate is made from a solidified mold material.

16. An RFID tag that can be mounted on a curved surface having a predetermined curvature, said RFID tag comprising:
a first dielectric substrate having a recessed portion formed in a central part of one main surface thereof, and having a degree of hardness which enables said first dielectric substrate itself to bend with at least said predetermined curvature;
a second dielectric substrate disposed inside said recessed portion, having a hole formed on a side of the one main surface of said first dielectric substrate, and having a degree of hardness higher than that of said first dielectric substrate;
a ground conductive pattern disposed on another main surface of this dielectric substrate;
a film base;
a conductive pattern disposed on this film base in such a way as to be placed in an inner portion of said film base at a predetermined distance from each of edges of said film base, a long narrow slot being formed in this conductive pattern; and
an IC chip electrically connected to said conductive pattern via this slot, and inserted into said hole of said second dielectric substrate,
wherein an electric field is formed between the ground conductive pattern and the conductive pattern, an electric field runs between opposing sides of short direction of the long narrow slot, and a potential difference occurs between the opposing sides.

17. An RFID tag that can be mounted on a curved surface having a predetermined curvature, said RFID tag comprising:
a first dielectric substrate having a penetrating hole formed in a central part thereof and penetrating from one main surface thereof to another main surface thereof, and having a degree of hardness which enables said first dielectric substrate itself to bend with at least said predetermined curvature;
a second dielectric substrate disposed inside said penetrating hole, having a hole formed on a side of the one main surface of said first dielectric substrate, and having a degree of hardness higher than that of said first dielectric substrate;
a ground conductive pattern disposed on the other main surface of this dielectric substrate;
a conductive pattern disposed on said first and second dielectric substrates in such a way as to be placed in an inner portion of said first dielectric substrate at a predetermined distance from each of edges of said first dielectric substrate, a long narrow slot being formed in this conductive pattern; and
an IC chip electrically connected to said conductive pattern via this slot, and inserted into said hole of said second dielectric substrate.

18. The RFID tag according to claim 17, wherein said penetrating hole is shaped like a circle or a polygon.

19. An RFID tag that can be mounted on a curved surface having a predetermined curvature, said RFID tag comprising:
a first dielectric substrate having a penetrating hole formed in a central part thereof and penetrating from one main surface thereof to another main surface thereof, and having a degree of hardness which enables said first dielectric substrate itself to bend with at least said predetermined curvature;
a second dielectric substrate disposed inside said penetrating hole, having a hole formed on a side of the one main surface of said first dielectric substrate, and having a degree of hardness higher than that of said first dielectric substrate;
a ground conductive pattern disposed on the other main surface of said first dielectric substrate;
a film base;
a conductive pattern disposed on this film base in such a way as to be placed in an inner portion of said film base at a predetermined distance from each of edges of said film base, a long narrow slot being formed in this conductive pattern; and
an IC chip electrically connected to said conductive pattern via this slot, and inserted into said hole of said second dielectric substrate.

20. An RFID tag that can be mounted on a curved surface having a predetermined curvature, said RFID tag comprising:
a first dielectric substrate having a penetrating hole formed in a central part thereof and penetrating from one main surface thereof to another main surface thereof, and having a degree of hardness which enables said first dielectric substrate itself to bend with at least said predetermined curvature;
a second dielectric substrate disposed inside said penetrating hole, having a hole formed on a side of the one main surface of said first dielectric substrate, and having a degree of hardness higher than that of said first dielectric substrate;
a ground conductive pattern disposed on the other main surface of said first dielectric substrate, and a ground conductive pattern disposed on said second dielectric substrate on a side of the other main surface of said first dielectric substrate;
a conductive pattern disposed on said first and second dielectric substrates in such a way as to be placed in an inner portion of said first dielectric substrate at a predetermined distance from each of edges of said first dielectric substrate, a long narrow slot being formed in this conductive pattern; and
an IC chip electrically connected to said conductive pattern via this slot, and inserted into said hole of said second dielectric substrate.

21. An RFID tag that can be mounted on a curved surface having a predetermined curvature, said RFID tag comprising:
a first dielectric substrate having a penetrating hole formed in a central part thereof and penetrating from one main surface thereof to another main surface thereof, and having a degree of hardness which enables said first dielectric substrate itself to bend with at least said predetermined curvature;
a second dielectric substrate disposed inside said penetrating hole, having a hole formed on a side of the one main surface of said first dielectric substrate, and having a degree of hardness higher than that of said first dielectric substrate;
a ground conductive pattern disposed on the other main surface of said first dielectric substrate, and a ground conductive pattern disposed on said second dielectric substrate on a side of the other main surface of said first dielectric substrate;
a film base;
a conductive pattern disposed on this film base in such a way as to be placed in an inner portion of said film base at a predetermined distance from each of edges of said film base, a long narrow slot being formed in this conductive pattern; and
an IC chip electrically connected to said conductive pattern via this slot, and inserted into said hole of said second dielectric substrate.

\* \* \* \* \*